US006861494B2

(12) United States Patent
Debruin

(10) Patent No.: US 6,861,494 B2
(45) Date of Patent: Mar. 1, 2005

(54) POLYESTER PROCESS USING A PIPE REACTOR

(75) Inventor: Bruce Roger Debruin, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 73 days.

(21) Appl. No.: 10/013,318

(22) Filed: Dec. 7, 2001

(65) Prior Publication Data

US 2002/0137877 A1 Sep. 26, 2002

Related U.S. Application Data

(60) Provisional application No. 60/254,040, filed on Dec. 7, 2000.

(51) Int. Cl.[7] .............................................. C08G 63/02
(52) U.S. Cl. ...................... 528/272; 528/176; 528/300; 528/301; 528/302; 528/307; 528/308; 528/308.6; 526/64; 526/65; 526/67; 526/71; 524/81
(58) Field of Search ................................ 528/176, 272, 528/300, 301, 302, 307, 308, 308.6; 526/64, 65, 67, 71; 524/81

(56) References Cited

U.S. PATENT DOCUMENTS

| 2,361,717 | A | 10/1944 | Taylor |
| 2,709,642 | A | 5/1955 | Mann, Jr. et al. |

(List continued on next page.)

FOREIGN PATENT DOCUMENTS

| BE | 780142 | 3/1972 |
| DE | 2200832 | 1/1972 |
| DE | 229 415 A1 | 11/1973 |

(List continued on next page.)

OTHER PUBLICATIONS

Stahl, Wegmann, Von Rohr;Tubular reactor for liquid reactions with gas release; Catalysis Today 79–80; 2003; pp. 89–95.
U.S. Appl. No. 10/456,212, filed May 6, 2003, DeBruin.
U.S. Appl. No. 10/456,309, filed May 6, 2003, DeBruin.
U.S. Appl. No. 10/456,448, filed May 6, 2003, DeBruin.
Perry, Robert H. and Green, Don, "*Flow in Pipes and Channels*", Perry's Chemical Engineer's Handbook, (1984), pp. 5–23, 6th Edition, McGraw–Hill, United States.
Perry, Robert H. and Green, Don, "*Fluid and Particle Mechanics*", Perry's Chemical Engineer's Handbook, (1984), 5–40 to 5–41, 6th Edition, McGraw–Hill, United States.
Nauman, E. B., "*Enhancement of Heat Transfer and Thermal Homogenity with Motionless Mixers*", American Institute of Chemical Engineer's Journal, (1979), pp. 246–258, vol. 25, No. 2.
Brodkey, Robert S., "*Multiphase Phenomena I: Pipe Flow*", The Phenomena of Fluid Motions, (1967), pp. 456–538, Addison–Wesley Publishing Company, United States.
Gupta, S.K. and Kumar, Anil, "*Polyester Reactors*", Plenum Chemical Engineering Series, (1987), pp. 241–318, Chapter 8, Plenum Press, New York.

*Primary Examiner*—Samuel A. Acquah
(74) *Attorney, Agent, or Firm*—Steven A. Owen; Bernard J. Graves, Jr.; Dennis V. Carmen

(57) ABSTRACT

The invention is directed to polyester processes that utilizes a pipe reactor in the esterification, polycondensation, or both esterification and polycondensation processes. Pipe reactor processes of the present invention have a multitude of advantages over prior art processes including improved heat transfer, volume control, agitation and disengagement functions. The pipe reactor processes and apparatus of the present invention are built and operated at a much lower cost than conventional polyester processes.

67 Claims, 27 Drawing Sheets

POLYESTER REACTION TEMPERATURE & PRESSURE PROFILES

- - - PRESSURE
——— TEMPERATURE

U.S. PATENT DOCUMENTS

| | | |
|---|---|---|
| 2,753,249 A | 7/1956 | Idenden et al. |
| 2,829,153 A | 4/1958 | Vodonik |
| 2,905,707 A | 9/1959 | Hurt et al. |
| 2,973,341 A | 2/1961 | Hippe et al. |
| 3,044,993 A | 7/1962 | Tiemersma |
| 3,052,711 A | 9/1962 | Glogau et al. |
| 3,054,776 A | 9/1962 | Higgins |
| 3,110,547 A | 11/1963 | Emmert |
| 3,113,843 A | 12/1963 | Li |
| 3,161,710 A | 12/1964 | Turner |
| 3,185,668 A | 5/1965 | Meyer et al. |
| 3,192,184 A | 6/1965 | Brill et al. |
| 3,241,926 A | 3/1966 | Parker et al. |
| 3,254,965 A | 6/1966 | Ogie |
| 3,376,353 A | 4/1968 | Tate |
| 3,385,881 A | 5/1968 | Bachmann et al. |
| 3,402,023 A | 9/1968 | Dobo |
| 3,427,287 A | 2/1969 | Pengilly |
| 3,442,868 A | 5/1969 | Ogata et al. |
| 3,458,467 A | 7/1969 | Herrle et al. |
| 3,468,849 A | 9/1969 | Rothert |
| 3,480,587 A | 11/1969 | Porter |
| 3,487,049 A | 12/1969 | Busot |
| 3,496,146 A | 2/1970 | Mellichamp, Jr. |
| 3,496,220 A | 2/1970 | McCarty et al. |
| 3,507,905 A | 4/1970 | Girantet et al. |
| 3,522,214 A | 7/1970 | Crawford et al. |
| 3,551,396 A | 12/1970 | Lanthier |
| 3,582,244 A | 6/1971 | Siclari et al. |
| 3,590,070 A | 6/1971 | Martin et al. |
| 3,590,072 A | 6/1971 | Leybourne, III |
| 3,595,846 A | 7/1971 | Rouzier |
| 3,600,137 A | 8/1971 | Girantet et al. |
| 3,609,125 A | 9/1971 | Fujimoto et al. |
| 3,639,448 A | 2/1972 | Matsuzawa et al. |
| 3,644,096 A | 2/1972 | Lewis et al. |
| 3,644,294 A | 2/1972 | Siclari et al. |
| 3,644,483 A | 2/1972 | Griehl et al. |
| 3,646,102 A | 2/1972 | Kobayashi et al. |
| 3,647,758 A | 3/1972 | Ryffel et al. |
| 3,651,125 A | 3/1972 | Lewis et al. |
| 3,684,459 A | 8/1972 | Tate et al. |
| 3,689,461 A | 9/1972 | Balint et al. |
| 3,697,579 A | 10/1972 | Balint et al. |
| 3,723,391 A | 3/1973 | Beer et al. |
| 3,740,267 A | 6/1973 | Haylock et al. |
| 3,781,213 A | 12/1973 | Siclari et al. |
| 3,819,585 A | 6/1974 | Funk et al. |
| 3,849,379 A | 11/1974 | Jeurissen et al. |
| 3,867,349 A | 2/1975 | Heeg et al. |
| 3,892,798 A | 7/1975 | Heeg et al. |
| 3,927,983 A | 12/1975 | Gordon et al. |
| 3,960,820 A | 6/1976 | Pinney |
| 3,988,301 A | 10/1976 | Jeurissen et al. |
| 4,001,187 A | 1/1977 | Itabashi et al. |
| 4,008,048 A | 2/1977 | Hellemans et al. |
| 4,020,049 A | 4/1977 | Rinehart |
| 4,028,307 A | 6/1977 | Ure |
| 4,046,718 A | 9/1977 | Mass et al. |
| 4,049,638 A | 9/1977 | Doerfel et al. |
| 4,056,514 A | 11/1977 | Strehler et al. |
| 4,064,112 A | 12/1977 | Rothe et al. |
| 4,077,945 A | 3/1978 | Heinze et al. |
| 4,079,046 A | 3/1978 | Brignac et al. |
| 4,089,888 A | 5/1978 | Tokumitsu et al. |
| 4,097,468 A | 6/1978 | James et al. |
| 4,100,142 A | 7/1978 | Schaefer et al. |
| 4,110,316 A | 8/1978 | Edging et al. |
| 4,118,582 A | 10/1978 | Walker |
| 4,122,112 A | 10/1978 | Koda et al. |
| 4,146,729 A | 3/1979 | Goodley et al. |
| 4,204,070 A | 5/1980 | Suzuki et al. |
| 4,212,963 A | 7/1980 | Lehr et al. |
| 4,223,124 A | 9/1980 | Broughton et al. |
| 4,230,818 A | 10/1980 | Broughton, Jr. et al. |
| 4,235,844 A | 11/1980 | Sterzel et al. |
| 4,238,593 A | 12/1980 | Duh |
| 4,254,246 A | 3/1981 | Dicoi et al. |
| 4,289,871 A | 9/1981 | Rowan et al. |
| 4,289,895 A | 9/1981 | Burkhardt et al. |
| 4,339,570 A | 7/1982 | Muschelknautz et al. |
| 4,346,193 A | 8/1982 | Warfel |
| 4,361,462 A | 11/1982 | Fujii et al. |
| 4,365,078 A | 12/1982 | Shelley |
| 4,382,139 A | 5/1983 | Kapteina et al. |
| 4,383,093 A | 5/1983 | Shiraki et al. |
| 4,410,750 A | 10/1983 | Langer, Jr. |
| 4,440,924 A | 4/1984 | Kuze et al. |
| 4,452,956 A | 6/1984 | Moked et al. |
| 4,472,558 A | 9/1984 | Casper et al. |
| 4,499,226 A | 2/1985 | Massey et al. |
| 4,542,196 A | 9/1985 | Morris et al. |
| 4,548,788 A | 10/1985 | Morris et al. |
| 4,550,149 A | 10/1985 | Morris et al. |
| 4,551,309 A | 11/1985 | Morris et al. |
| 4,551,510 A | 11/1985 | Morris et al. |
| 4,554,343 A | 11/1985 | Jackson, Jr. et al. |
| 4,555,384 A | 11/1985 | Morris et al. |
| 4,612,363 A | 9/1986 | Sasaki et al. |
| 4,670,580 A | 6/1987 | Maurer |
| 4,675,377 A | 6/1987 | Mobley et al. |
| 4,680,376 A | 7/1987 | Heinze et al. |
| 4,721,575 A | 1/1988 | Binning et al. |
| 4,952,627 A | 8/1990 | Morita et al. |
| 4,973,655 A | 11/1990 | Pipper et al. |
| 5,041,525 A | 8/1991 | Jackson |
| 5,064,935 A | 11/1991 | Jackson et al. |
| 5,162,488 A | 11/1992 | Mason |
| 5,185,426 A | 2/1993 | Verheijen et al. |
| 5,194,525 A | 3/1993 | Miura et al. |
| 5,243,022 A | 9/1993 | Kim et al. |
| 5,254,288 A | 10/1993 | Verheijen et al. |
| 5,294,305 A | 3/1994 | Craft, Sr. et al. |
| 5,300,626 A | 4/1994 | Jehl et al. |
| 5,340,906 A | 8/1994 | Shirokura et al. |
| 5,340,907 A | 8/1994 | Yau et al. |
| 5,384,389 A | 1/1995 | Alewelt et al. |
| 5,385,773 A | 1/1995 | Yau et al. |
| 5,413,861 A | 5/1995 | Gallo |
| 5,464,590 A | 11/1995 | Yount et al. |
| 5,466,419 A | 11/1995 | Yount et al. |
| 5,466,765 A | 11/1995 | Haseltine et al. |
| 5,466,776 A | 11/1995 | Krautstrunk et al. |
| 5,478,909 A | 12/1995 | Jehl et al. |
| 5,480,616 A | 1/1996 | Richardson et al. |
| 5,484,882 A | 1/1996 | Takada et al. |
| 5,496,469 A * | 3/1996 | Scraggs et al. ............. 210/177 |
| 5,519,112 A | 5/1996 | Harazoe et al. |
| 5,573,820 A | 11/1996 | Harazoe et al. |
| 5,594,077 A | 1/1997 | Groth et al. |
| 5,602,216 A | 2/1997 | Juvet |
| 5,648,437 A | 7/1997 | Fischer et al. |
| 5,681,918 A | 10/1997 | Adams et al. |
| 5,688,895 A | 11/1997 | Bhatia |
| 5,739,219 A | 4/1998 | Fischer et al. |
| 5,753,190 A | 5/1998 | Haseltine et al. |
| 5,753,784 A | 5/1998 | Fischer et al. |
| 5,786,443 A | 7/1998 | Lowe |
| 5,811,496 A | 9/1998 | Iwasyk et al. |
| 5,830,981 A | 11/1998 | Koreishi et al. |
| 5,849,849 A | 12/1998 | Bhatia |

| | | | | | | |
|---|---|---|---|---|---|---|
| 5,898,058 | A | 4/1999 | Nichols et al. | JP | 51 29460 A | 3/1976 |
| 5,902,865 | A | 5/1999 | Gausepohl et al. | JP | 52 78845 A | 7/1977 |
| 5,905,096 | A | 5/1999 | Lay et al. | JP | 52 87133 A | 7/1977 |
| 5,922,828 | A | 7/1999 | Schiraldi | JP | 53 31793 A | 3/1978 |
| 5,932,105 | A | 8/1999 | Kelly | JP | 53 34894 A | 3/1978 |
| 6,069,228 | A | 5/2000 | Alsop et al. | JP | 54 41833 A | 4/1979 |
| 6,096,838 | A | 8/2000 | Nakamoto et al. | JP | 54 76535 A | 6/1979 |
| 6,100,369 | A | 8/2000 | Miyajima et al. | JP | 54 79242 A | 6/1979 |
| 6,103,859 | A | 8/2000 | Jernigan et al. | JP | 54 100494 A | 8/1979 |
| 6,111,035 | A | 8/2000 | Sakamoto et al. | JP | 54 157536 A | 12/1979 |
| 6,111,064 | A | 8/2000 | Maurer et al. | JP | 55 43128 A | 3/1980 |
| 6,113,997 | A | 9/2000 | Massey et al. | JP | 55 108422 A | 8/1980 |
| 6,127,493 | A | 10/2000 | Maurer et al. | JP | 55-135133 A | 10/1980 |
| 6,174,970 | B1 | 1/2001 | Braune | JP | 59 47226 A | 3/1984 |
| 6,355,738 | B2 | 3/2002 | Nakamachi | JP | 59 68326 A | 4/1984 |
| 6,359,106 | B1 | 3/2002 | Nakamoto et al. | JP | 59 71326 A | 4/1984 |
| 6,623,643 | B2 * | 9/2003 | Chisholm et al. ........... 210/620 | JP | 60 15421 A | 1/1985 |
| 2002/0086969 | A1 | 7/2002 | Debruin | JP | 60 115551 A | 6/1985 |
| 2002/0091227 | A1 | 7/2002 | Debruin | JP | 60 226846 A | 11/1985 |
| 2002/0128399 | A1 | 9/2002 | Nakamoto et al. | JP | 62 207325 A | 9/1987 |
| 2002/0137877 | A1 | 9/2002 | Debruin | JP | 62-292831 A | 12/1987 |
| 2002/0180099 | A1 | 12/2002 | Keillor, III | JP | 1 102044 A | 4/1989 |
| 2003/0037910 | A1 | 2/2003 | Smymov | JP | 3 192118 A | 8/1991 |
| 2003/0133856 | A1 | 7/2003 | Le | JP | 5-78402 | 3/1993 |
| | | | | JP | 7 118208 A | 5/1995 |
| | | FOREIGN PATENT DOCUMENTS | | JP | 7 238151 A | 9/1995 |
| | | | | JP | 8 198960 A | 8/1996 |
| DE | | 125 798 | 5/1977 | JP | 8 283398 A | 10/1996 |
| DE | | 126 073 | 6/1977 | JP | 1998/259244 A | 9/1998 |
| DE | | 206 558 | 2/1984 | JP | 11 106489 A | 4/1999 |
| DE | | 4235785 A1 | 5/1994 | JP | 1999/092555 A | 4/1999 |
| EP | | 0 070 707 A1 | 1/1983 | JP | 2000/095851 A | 4/2000 |
| EP | | 0 850 962 A2 | 7/1998 | KR | 1993-0005144 B1 | 6/1993 |
| EP | | 0 999 228 A2 | 5/2000 | KR | 1994-0011540 B1 | 3/1994 |
| EP | | 1 065 193 A1 | 1/2001 | NL | 1001787 | 8/1965 |
| FR | | 2302778 A1 | 3/1975 | NL | 6704303 | 9/1967 |
| GB | | 101334 | 12/1965 | PL | 136188 | 8/1987 |
| GB | | 1154538 | 6/1969 | SU | 973552 | 11/1982 |
| GB | | 2010294 | 6/1979 | WO | WO 96/22318 | 7/1996 |
| GB | | 2052535 A | 1/1981 | WO | WO 98/08602 | 3/1998 |
| JP | | 424993 B | 3/1967 | WO | WO 98/10007 | 3/1998 |
| JP | | 4218353 B | 9/1967 | WO | WO 99/16537 | 4/1999 |
| JP | | 4739043 A | 4/1971 | WO | WO 02/26841 A1 | 4/2002 |
| JP | | 48 94795 A | 12/1973 | WO | WO 03/006526 A1 | 1/2003 |
| JP | | 49 28698 A | 3/1974 | | | |
| JP | | 49 34593 A | 3/1974 | * cited by examiner | | |
| JP | | 50 82197 A | 7/1975 | | | |

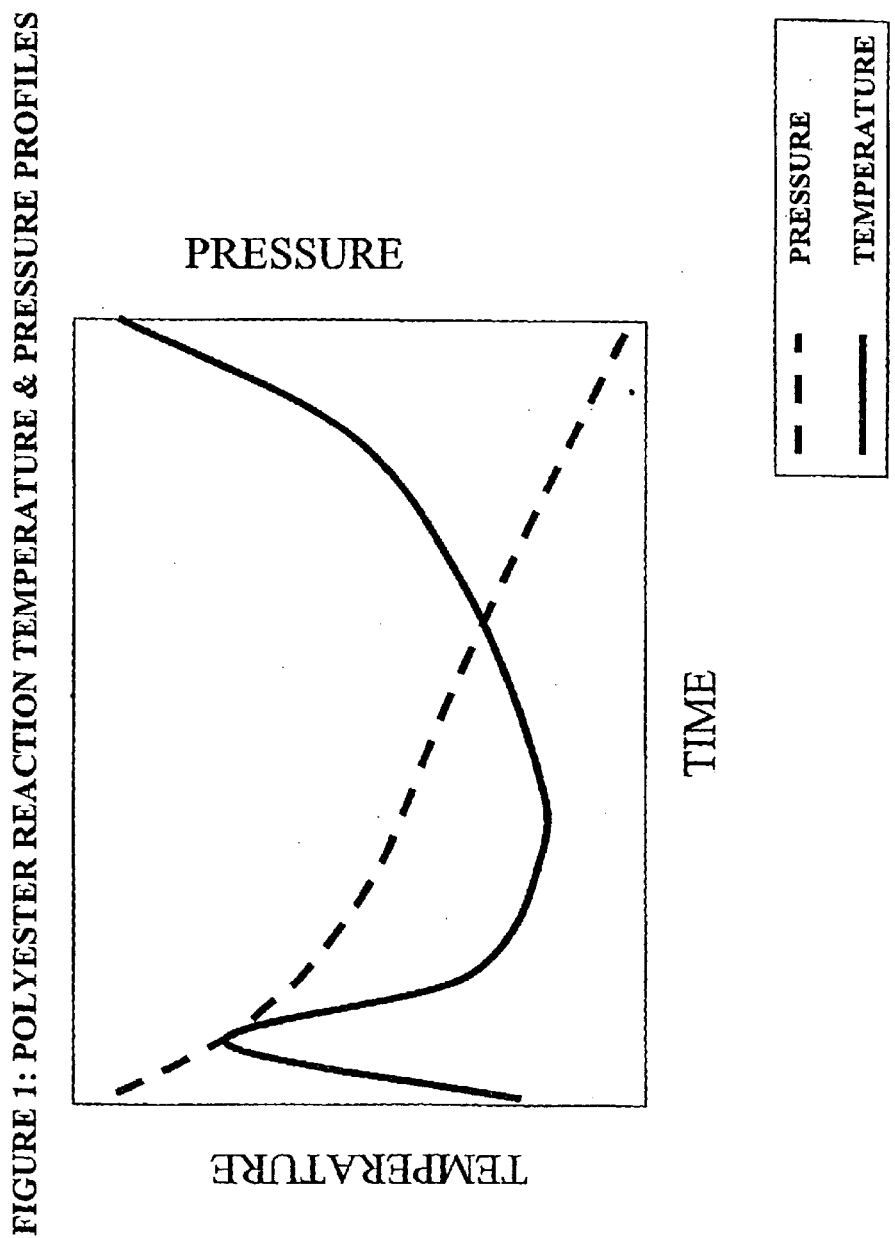
FIGURE 1: POLYESTER REACTION TEMPERATURE & PRESSURE PROFILES

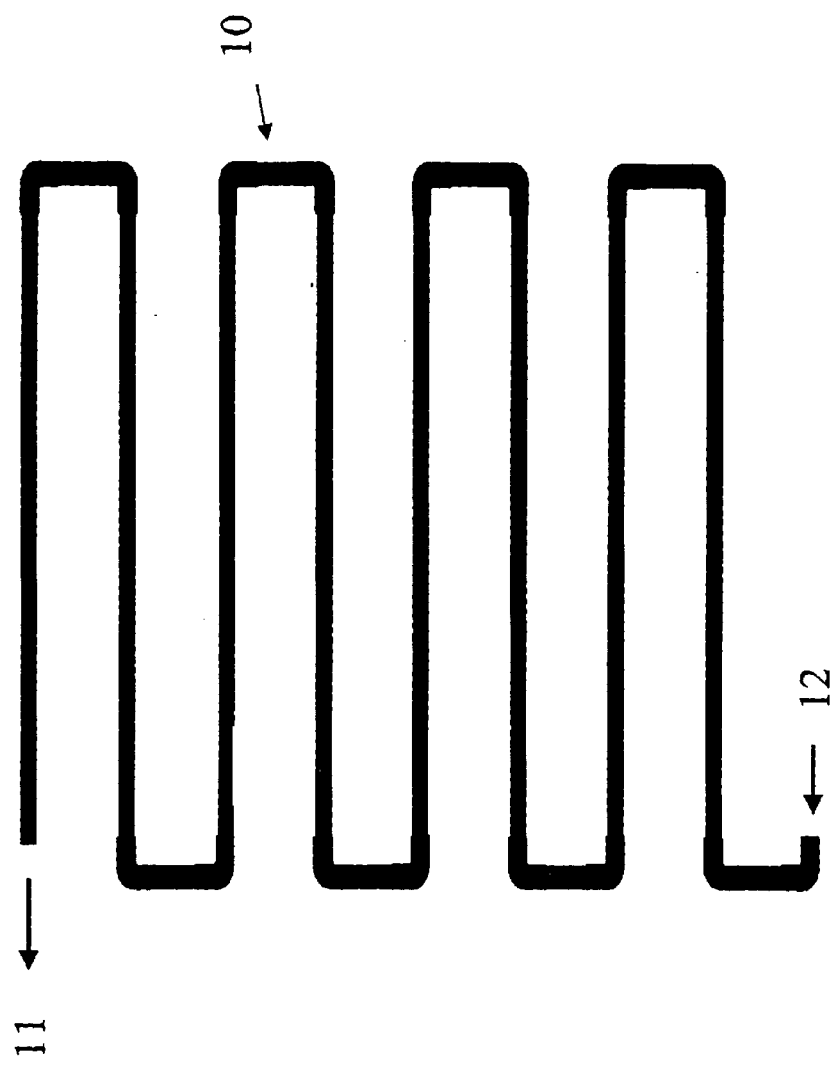
Figure 2: Esterification or Polycondensation Pipe Reactor

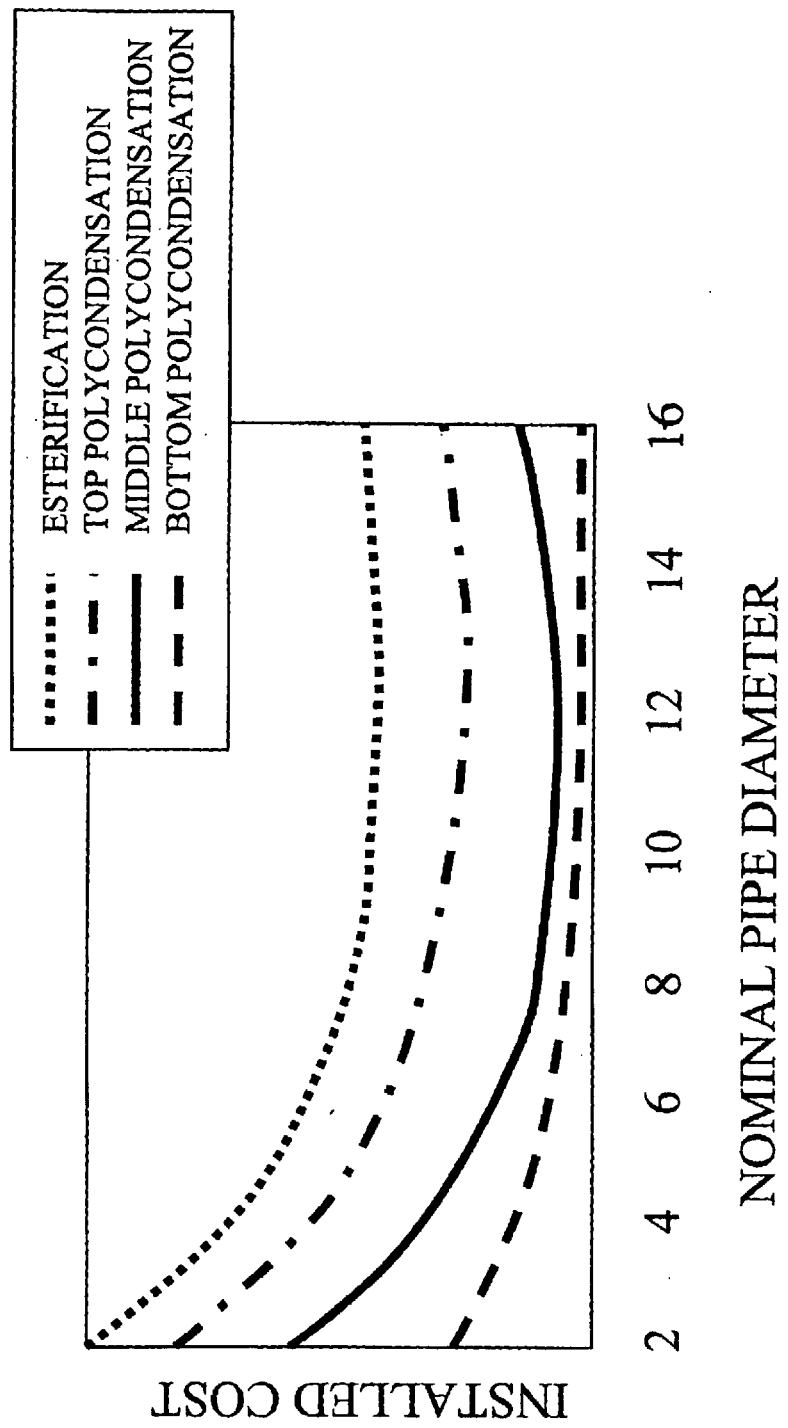

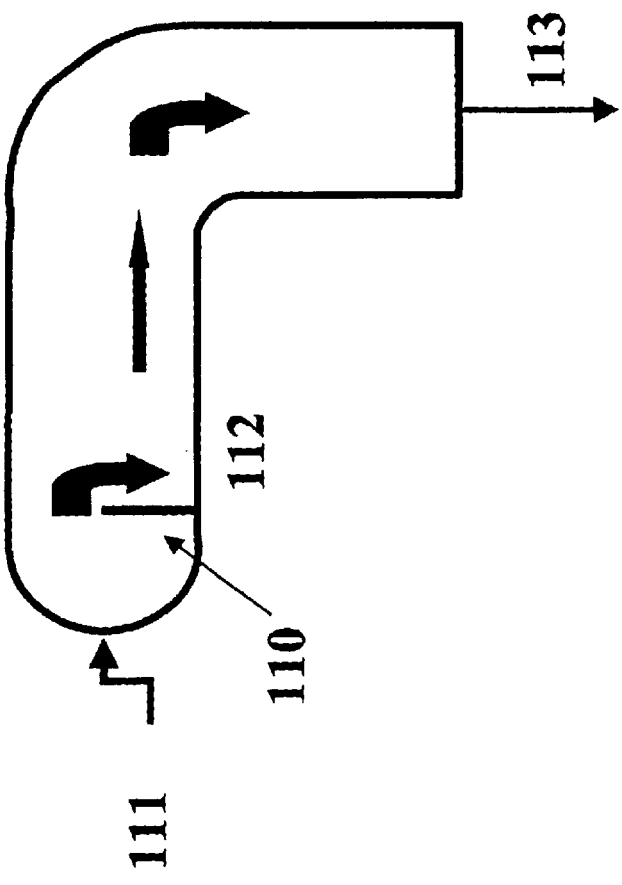
Figure 4: Top of Ester Exchange or Esterification Reactor where Level control occurs Via a weir into the Polycondensation Reactor

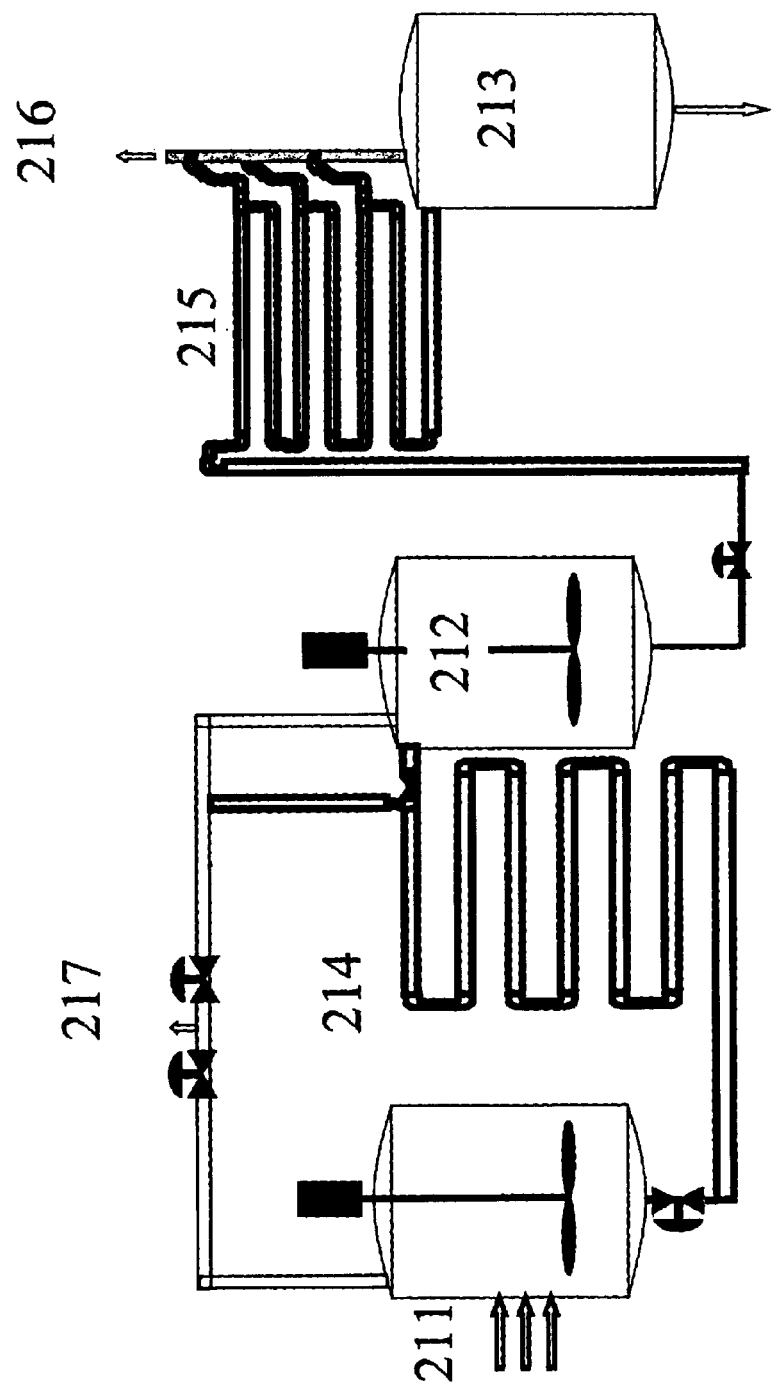
Figure 5: Modifying Existing Lines with Pipe Reactor

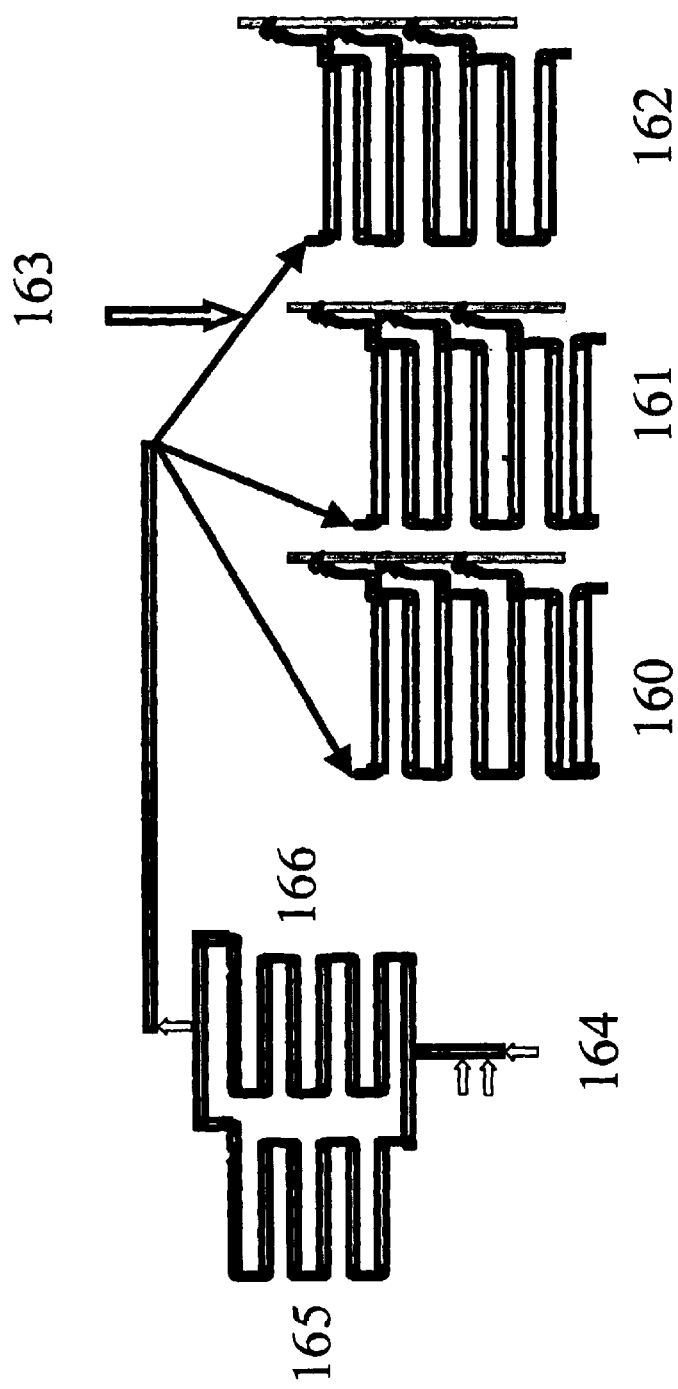
Figure 6: Larger Plants & Multiple Products

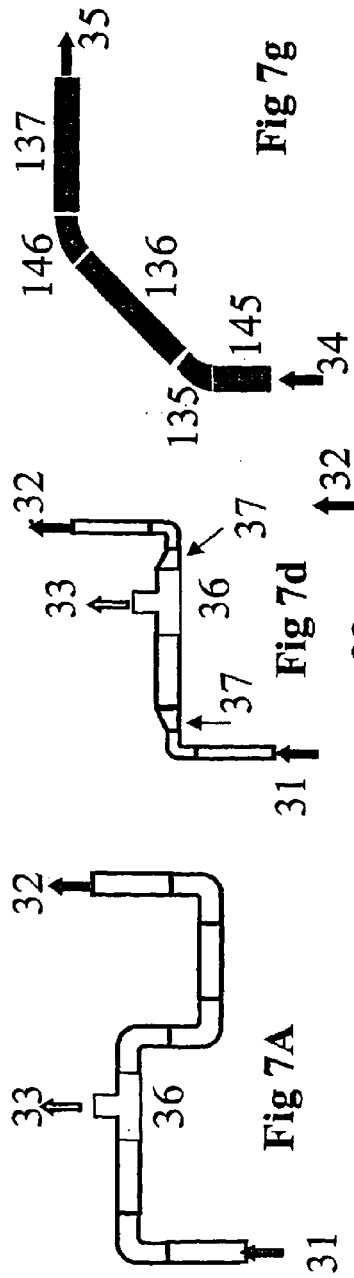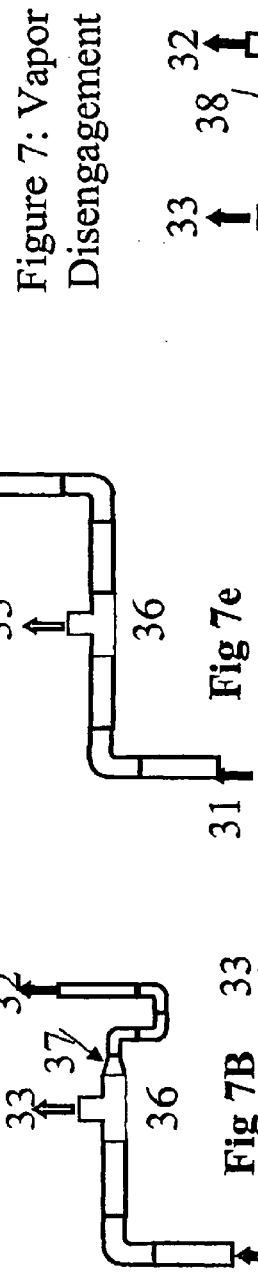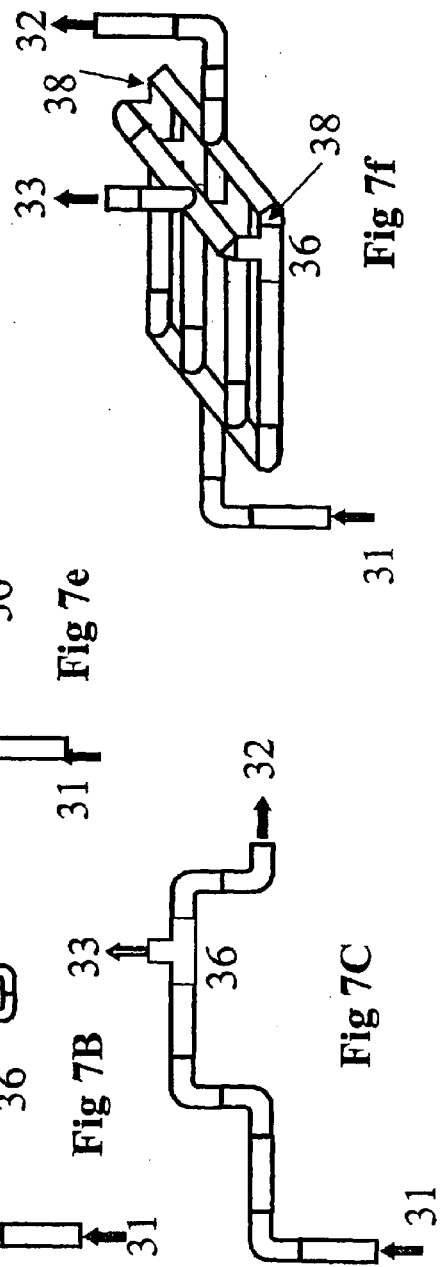
Figure 7: Vapor Disengagement

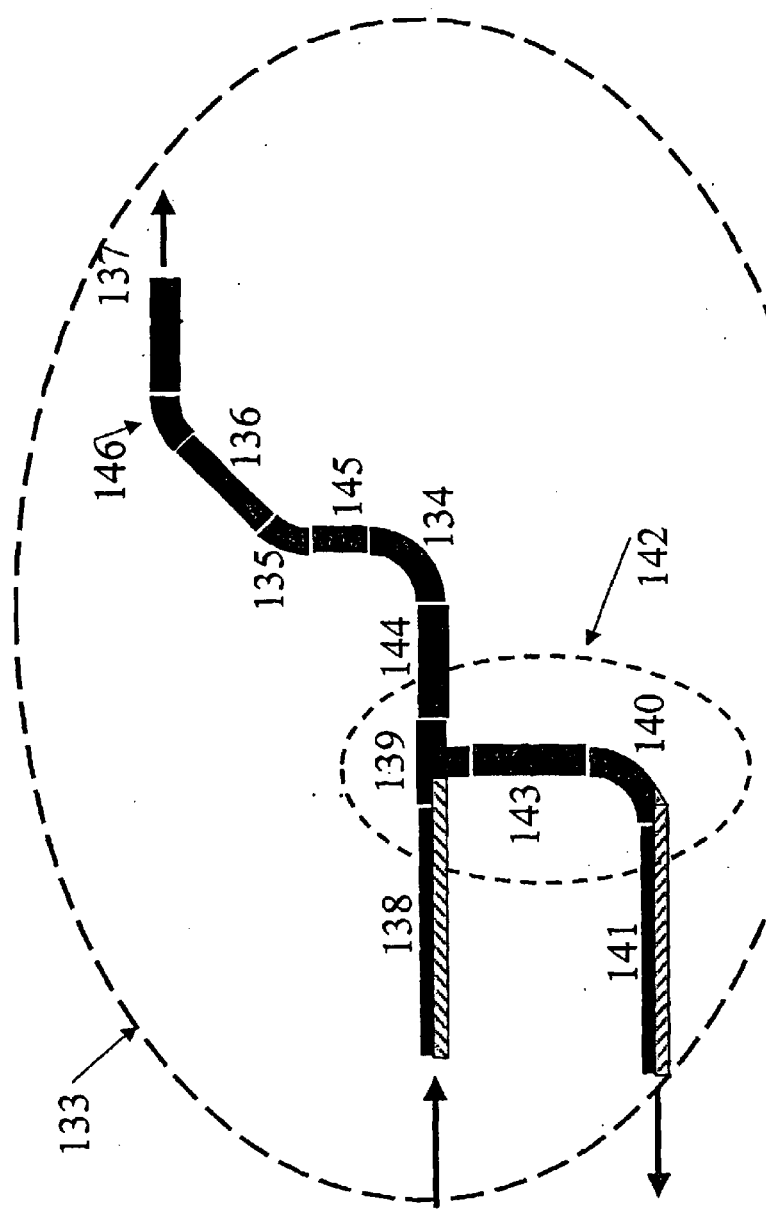

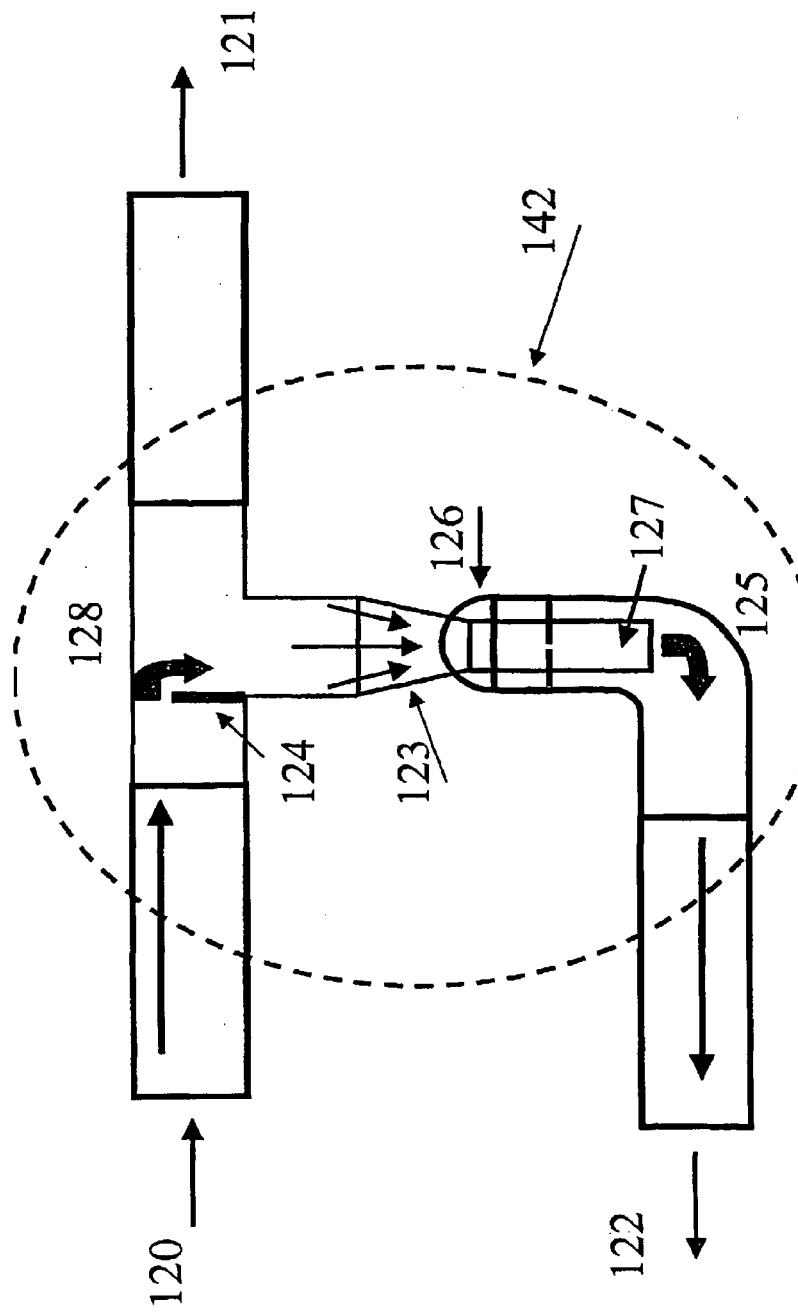
Figure 9: Laminar Mixing in Polycondensation Zones

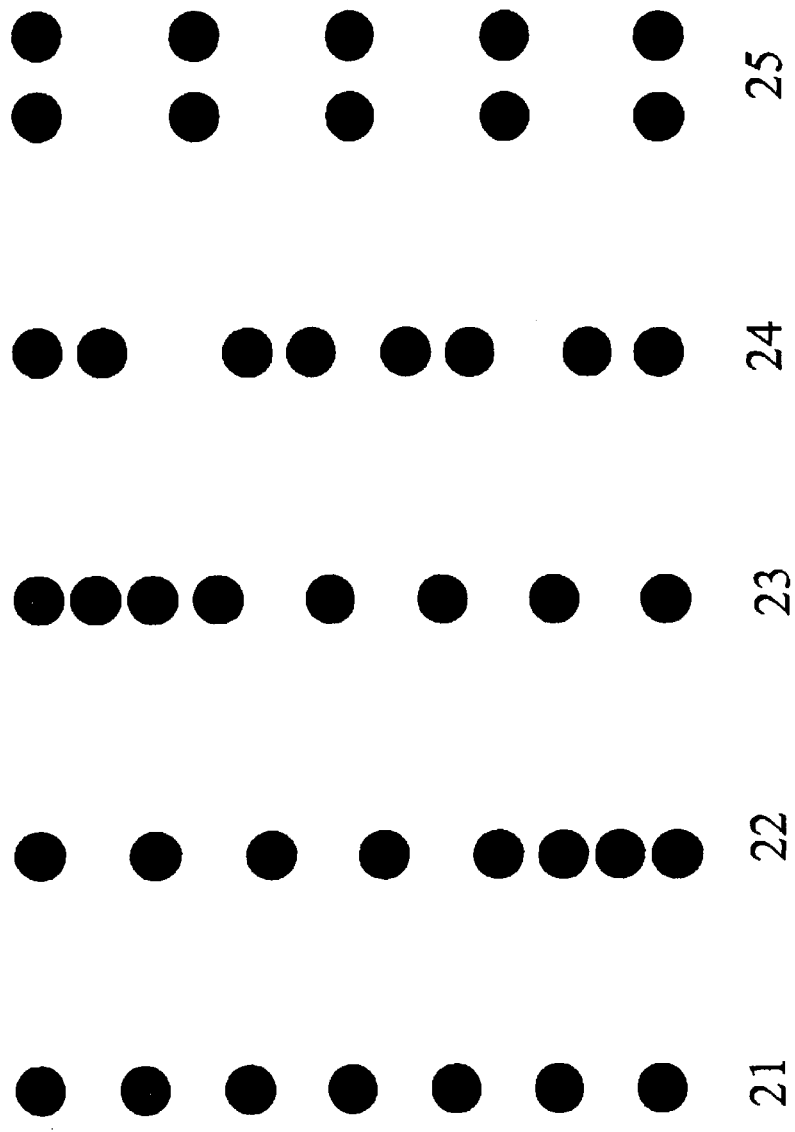
Figure 10: Altering Esterification & Ester Exchange Reactor Pressure Profile

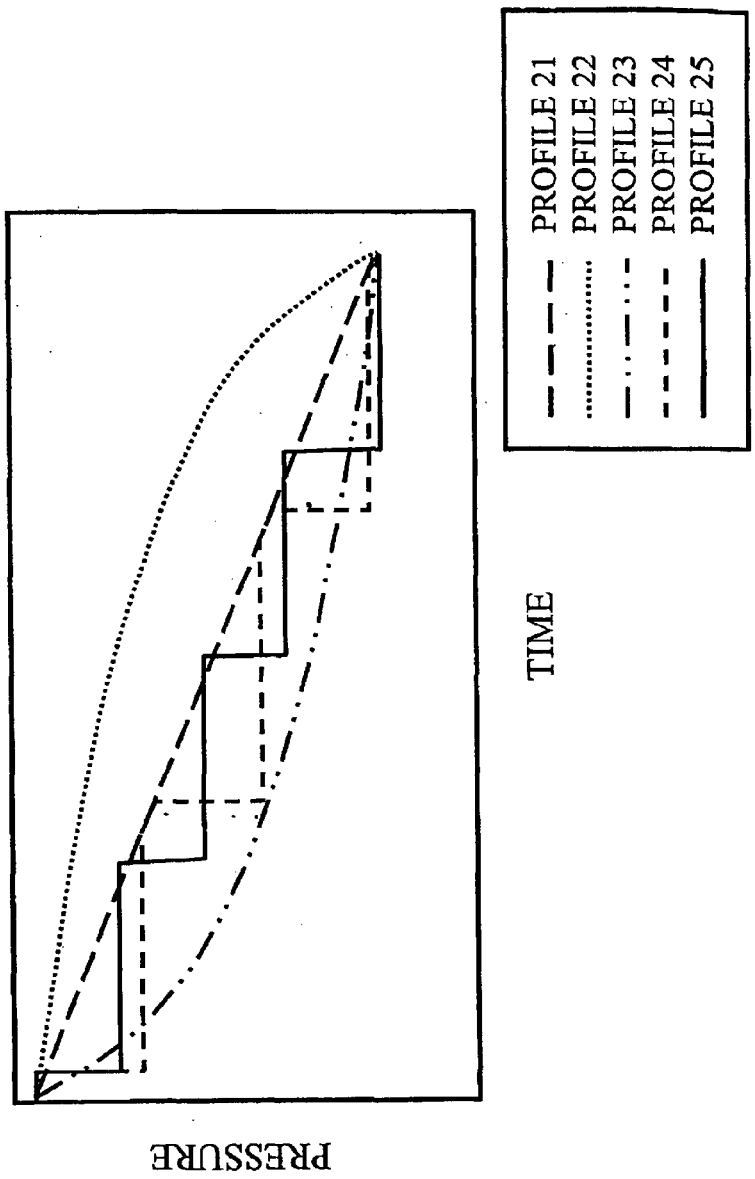

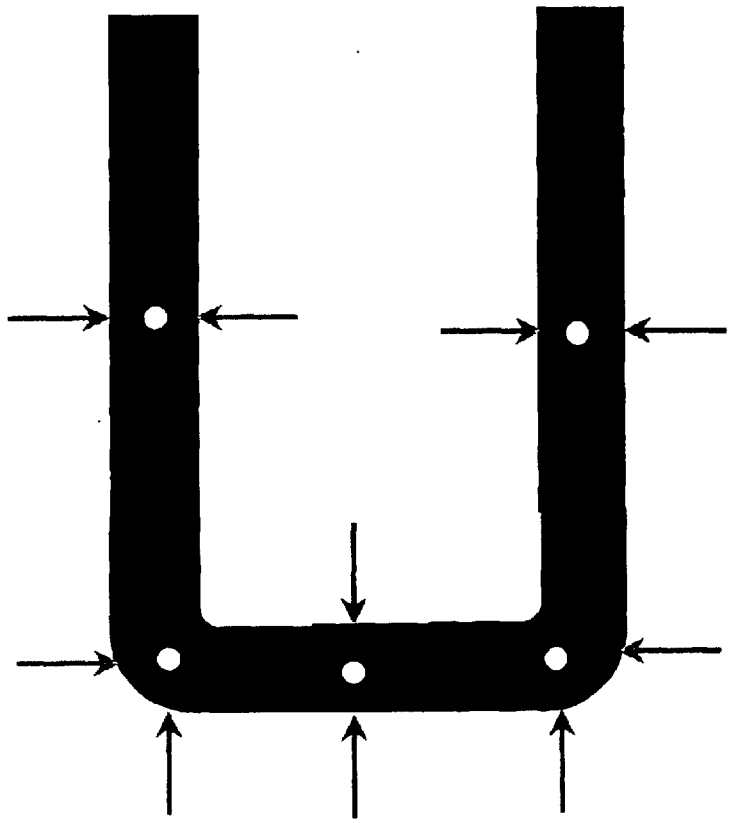
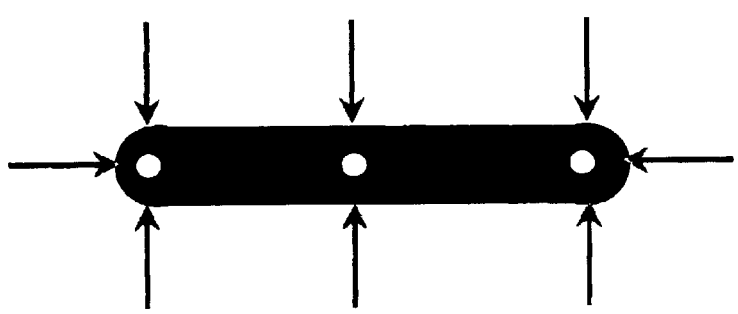
FIGURE 12a
FIGURE 12b
FIGURE 12: ADDITIVE LOCATIONS

Figure 13: Elimination of Paste Tank

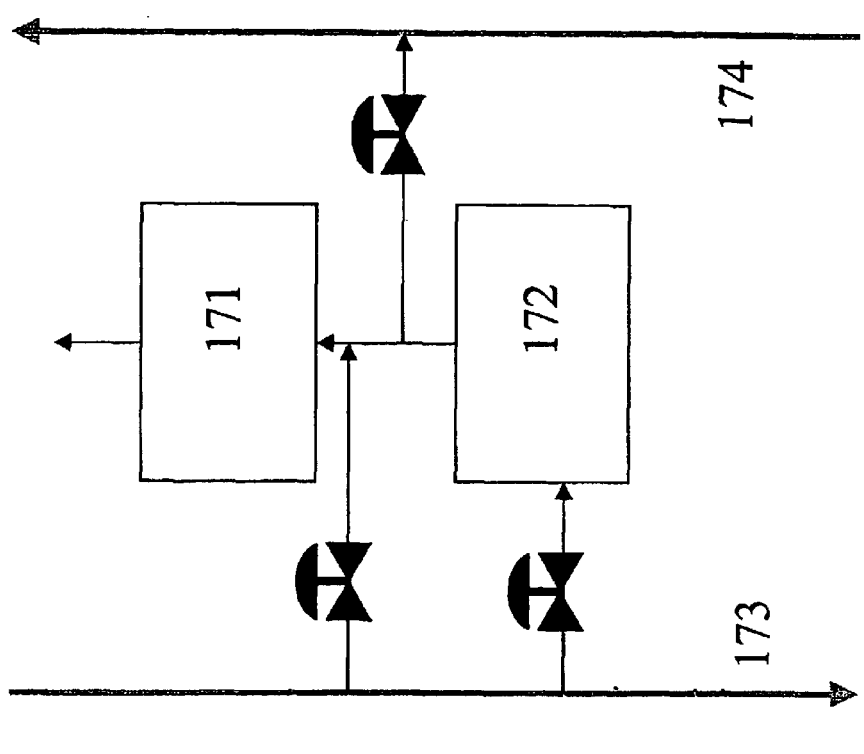
Figure 14: Elimination of Subloop Pumps

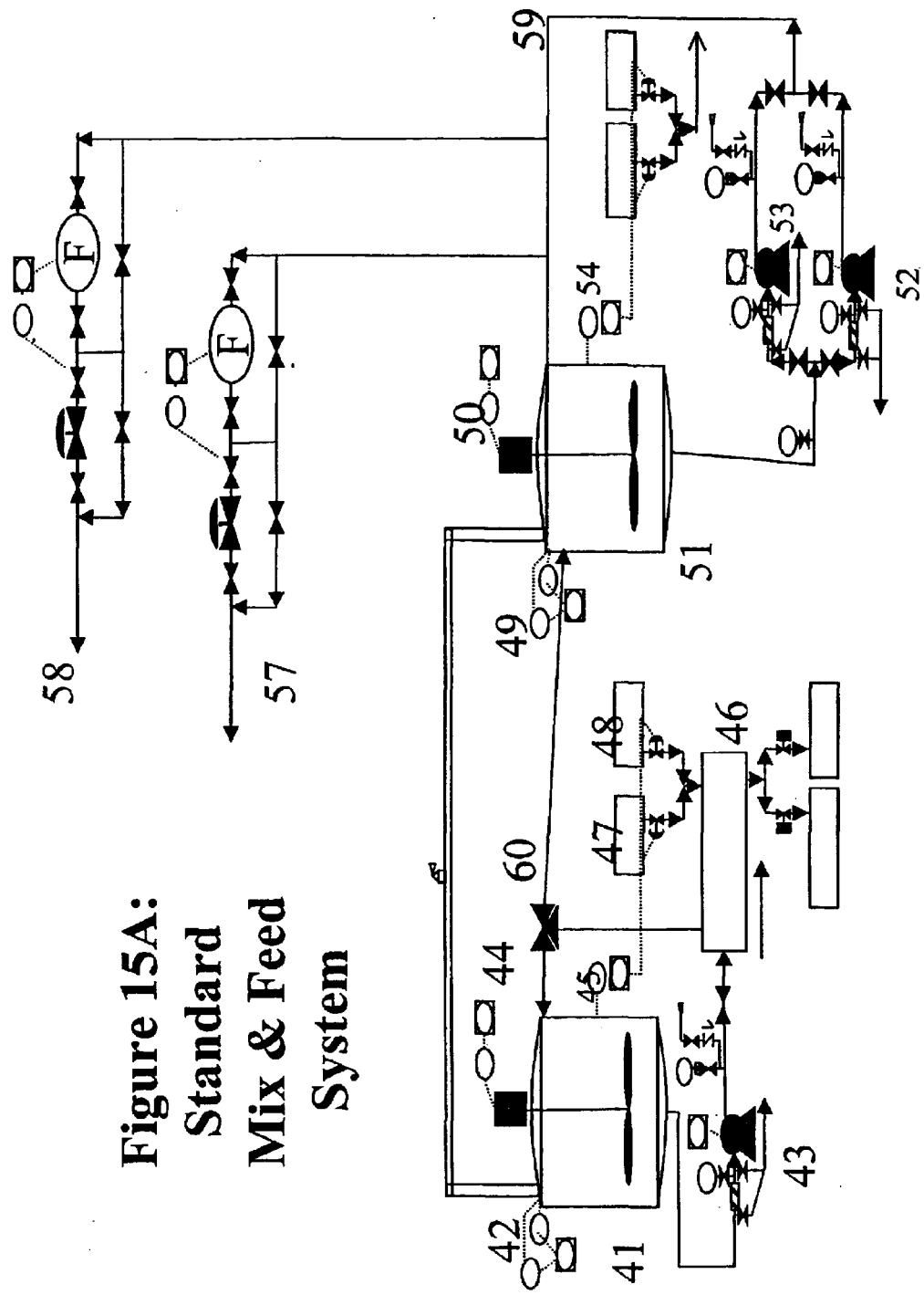
Figure 15A: Standard Mix & Feed System

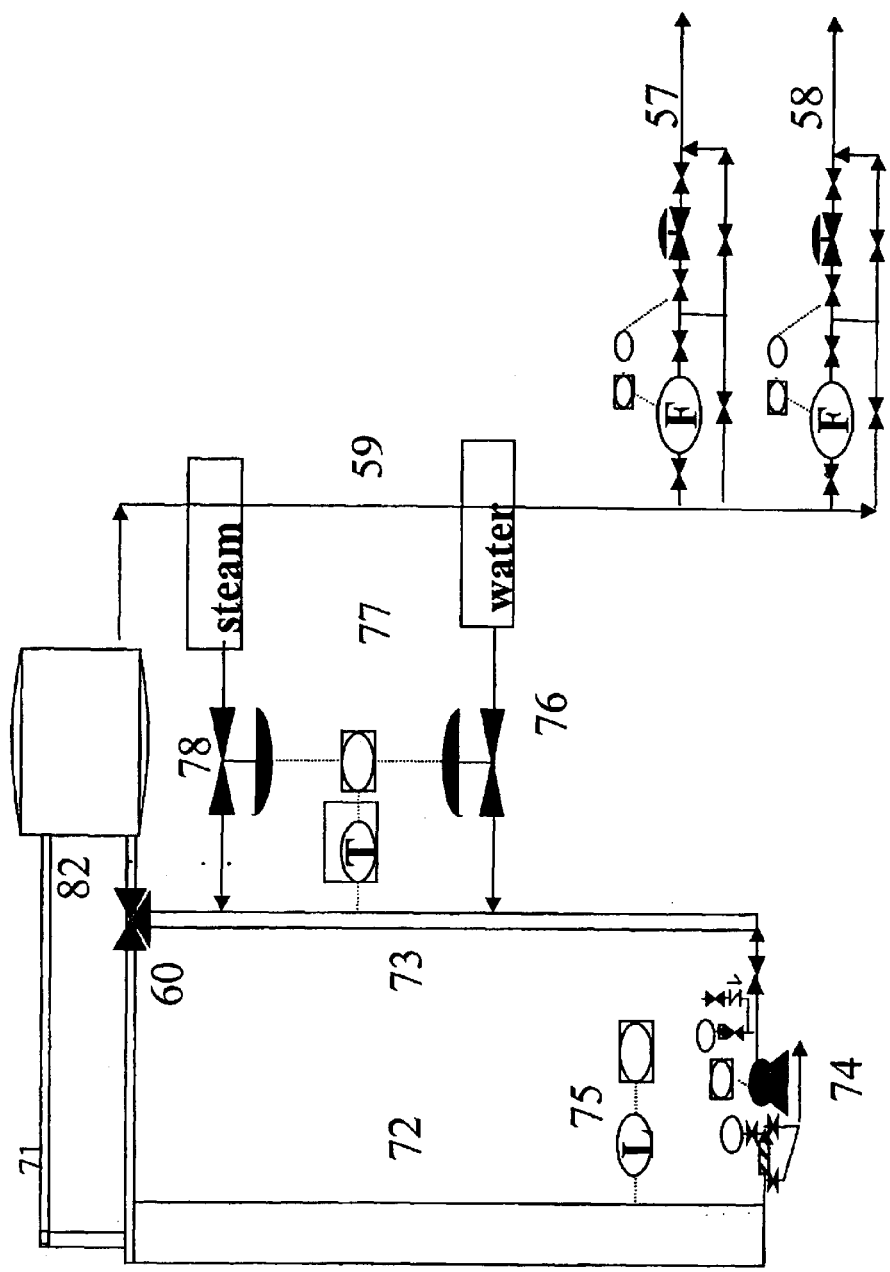
Figure 15B: Mix & Feed System

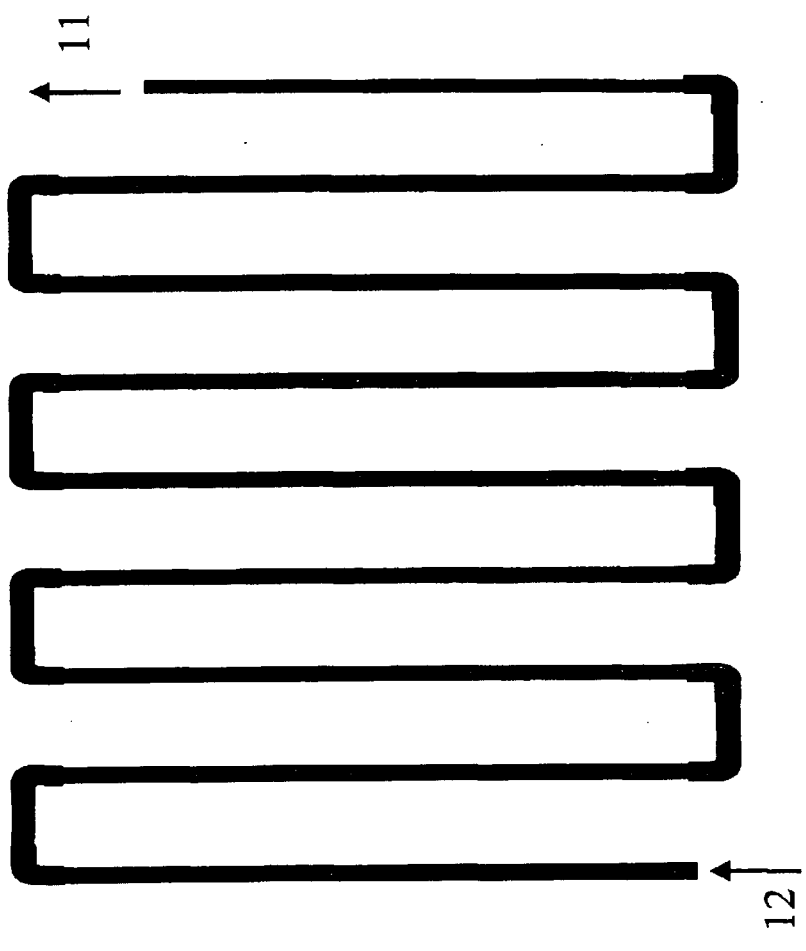
Figure 16: Alternating Low and High Pressure Configuration: Ester Exchange or Polycondensation Pipe Reactor

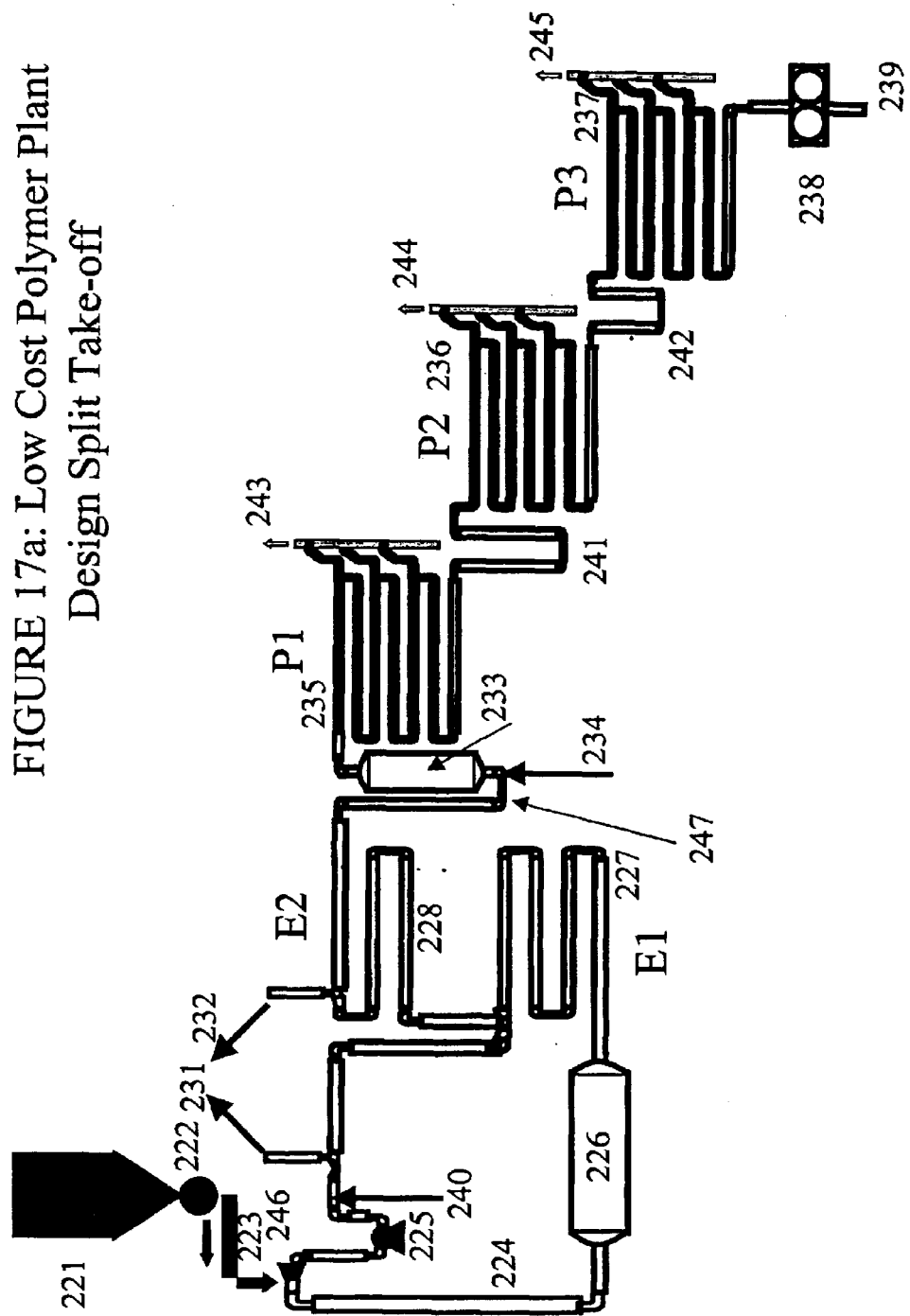
FIGURE 17a: Low Cost Polymer Plant Design Split Take-off

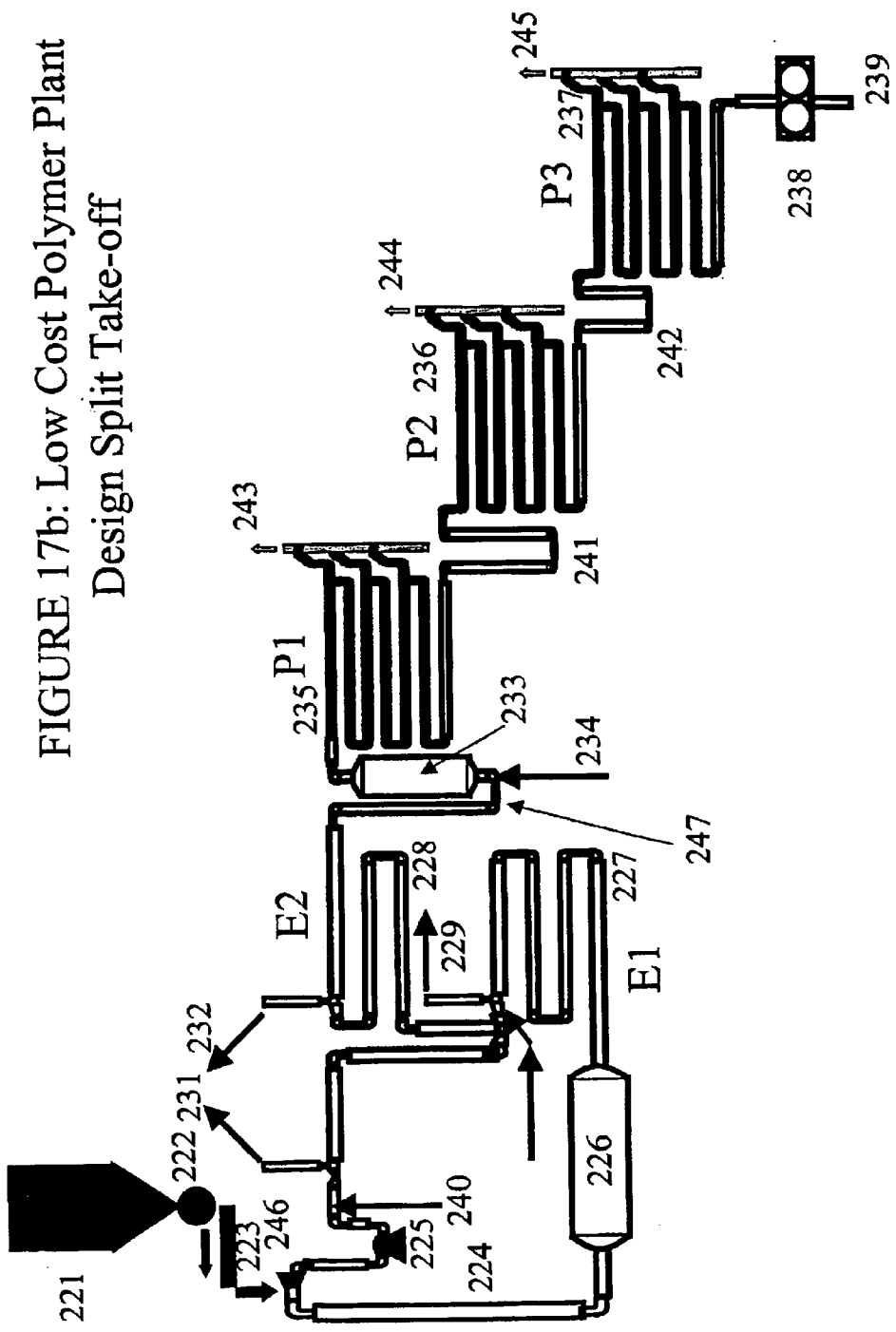
FIGURE 17b: Low Cost Polymer Plant Design Split Take-off

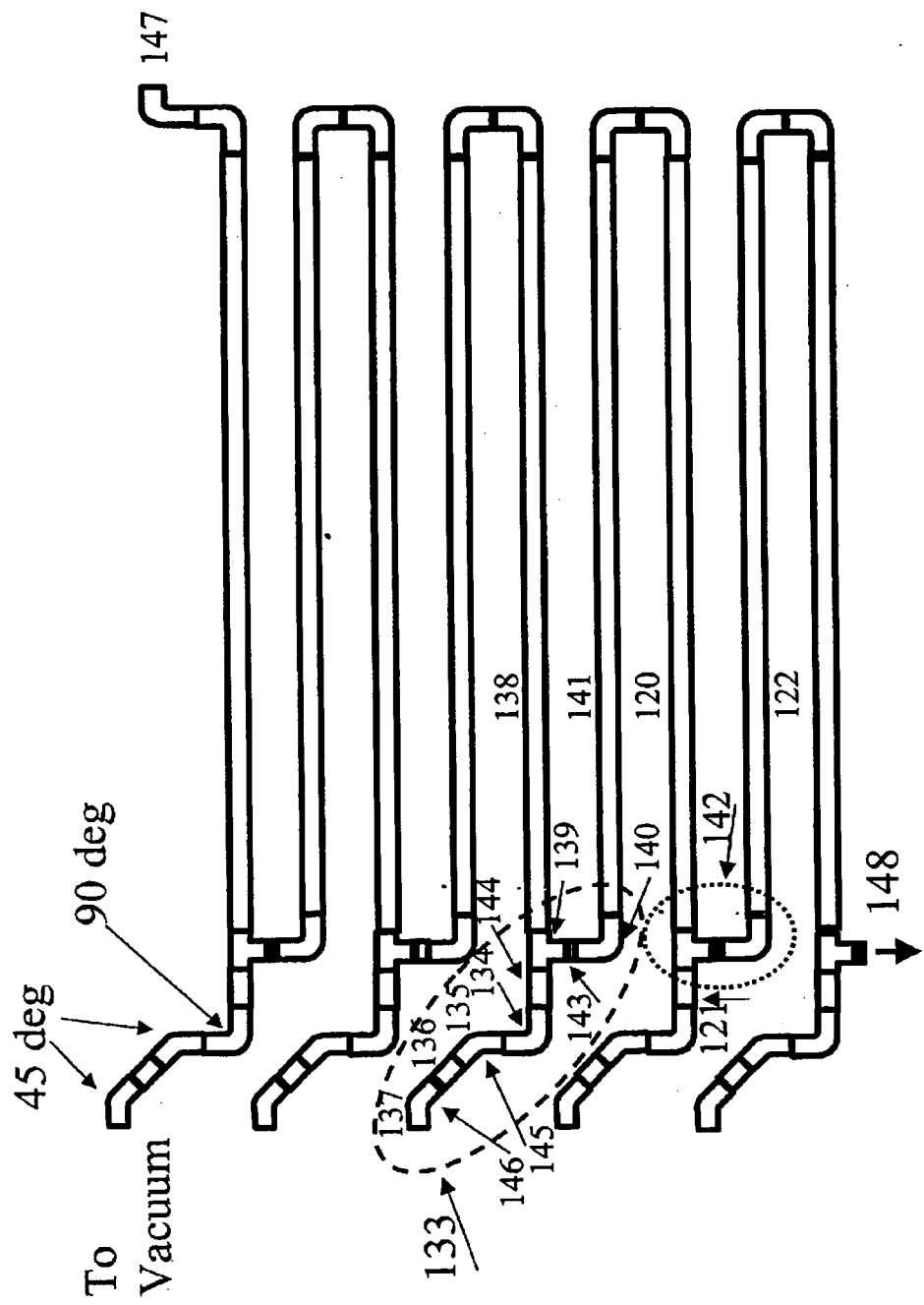
Figure 18: Polycondensation

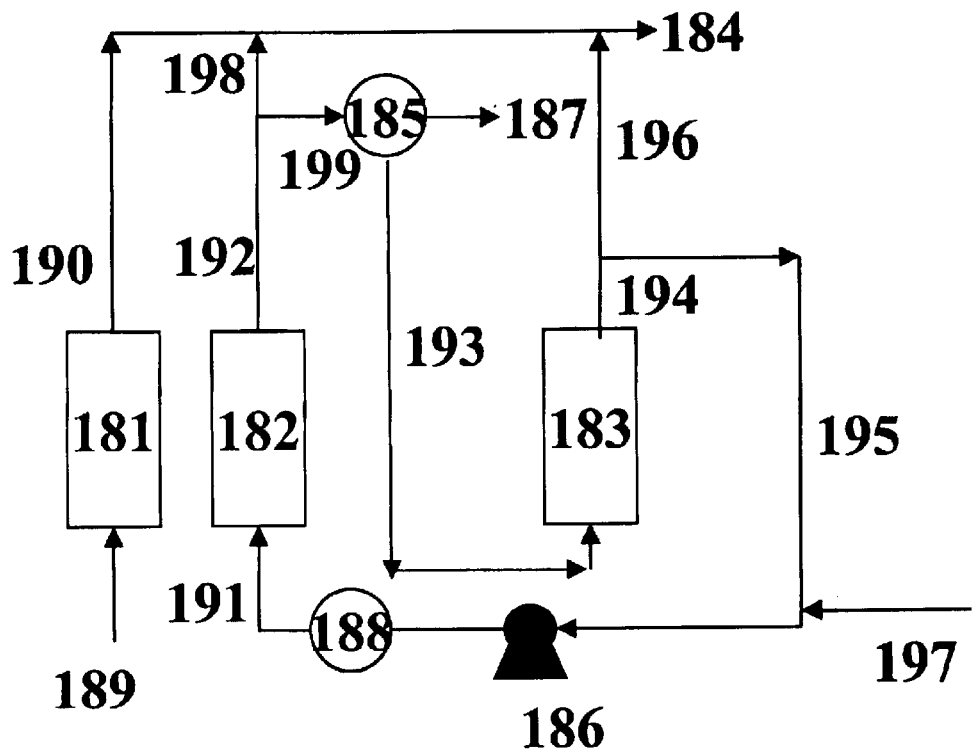
Figure 19: Replacing Distillation with Adsorption

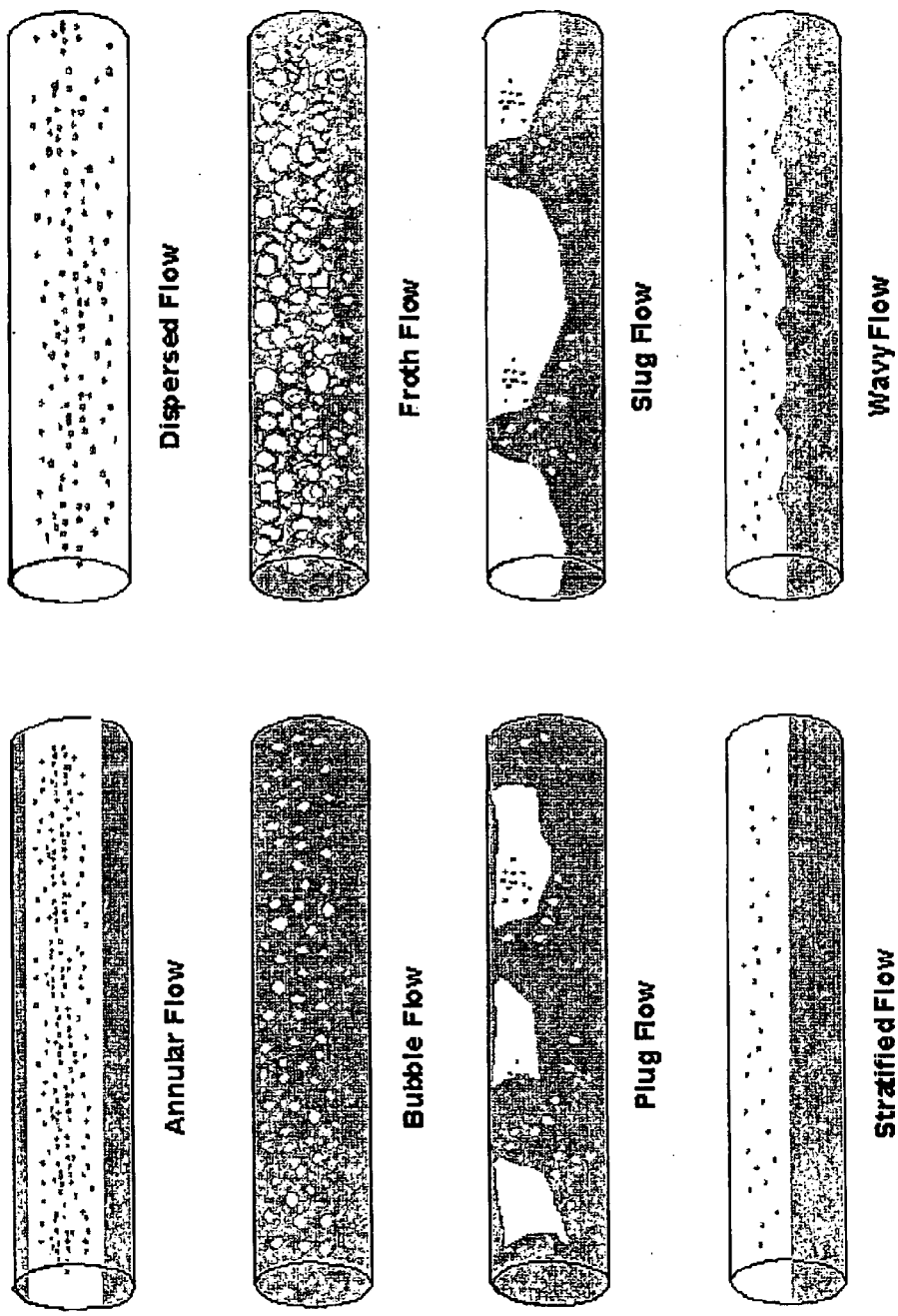
Figure 20A: Flow Regimes of Two-Phase Flow in Horizontal Pipes

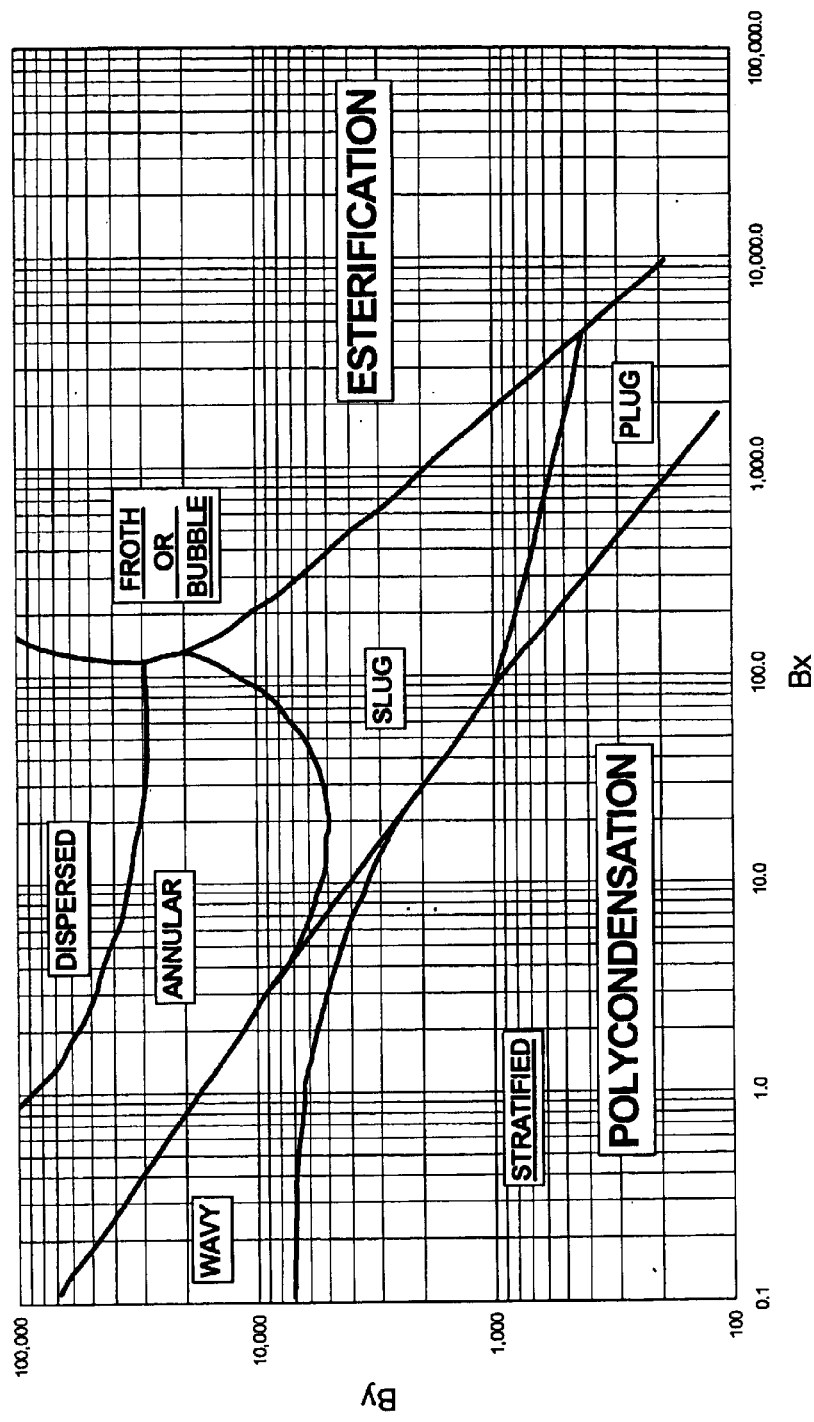
FIGURE 20B: TWO PHASE FLOW DIAGRAM

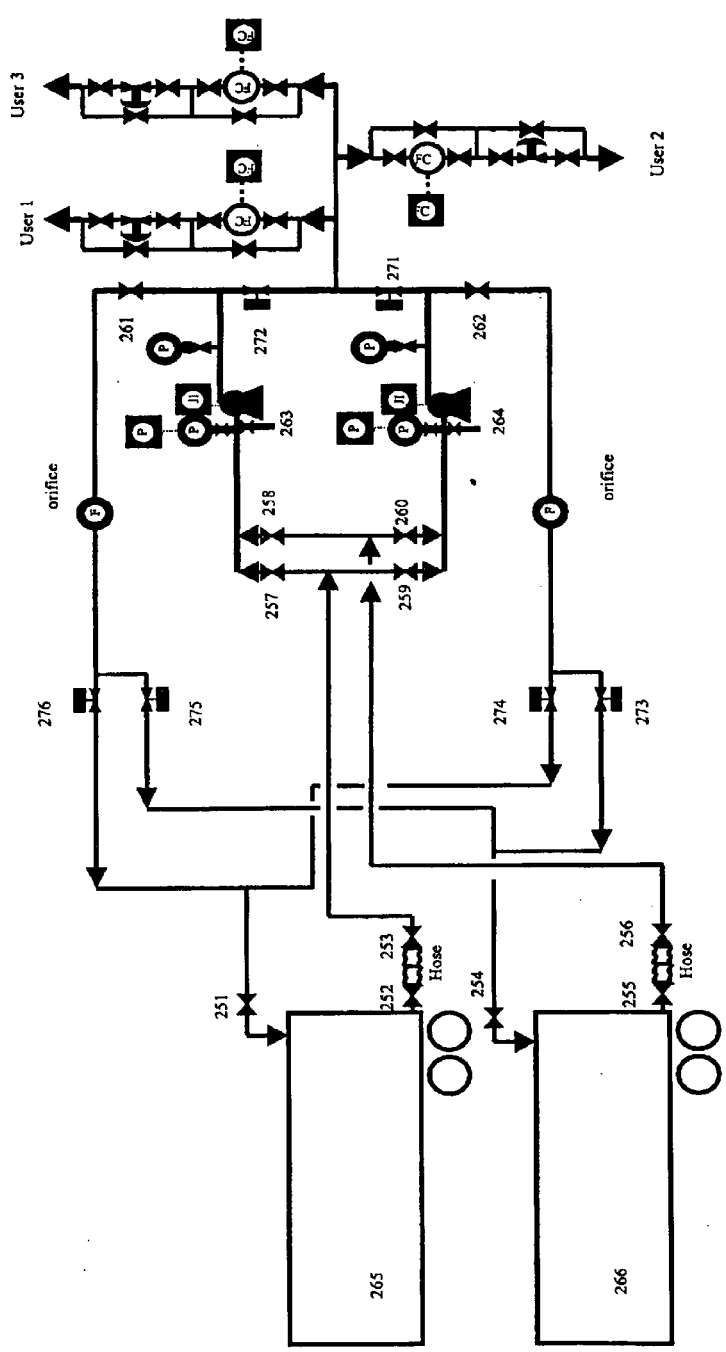
Figure 21: Truck Unloading Without Tanks

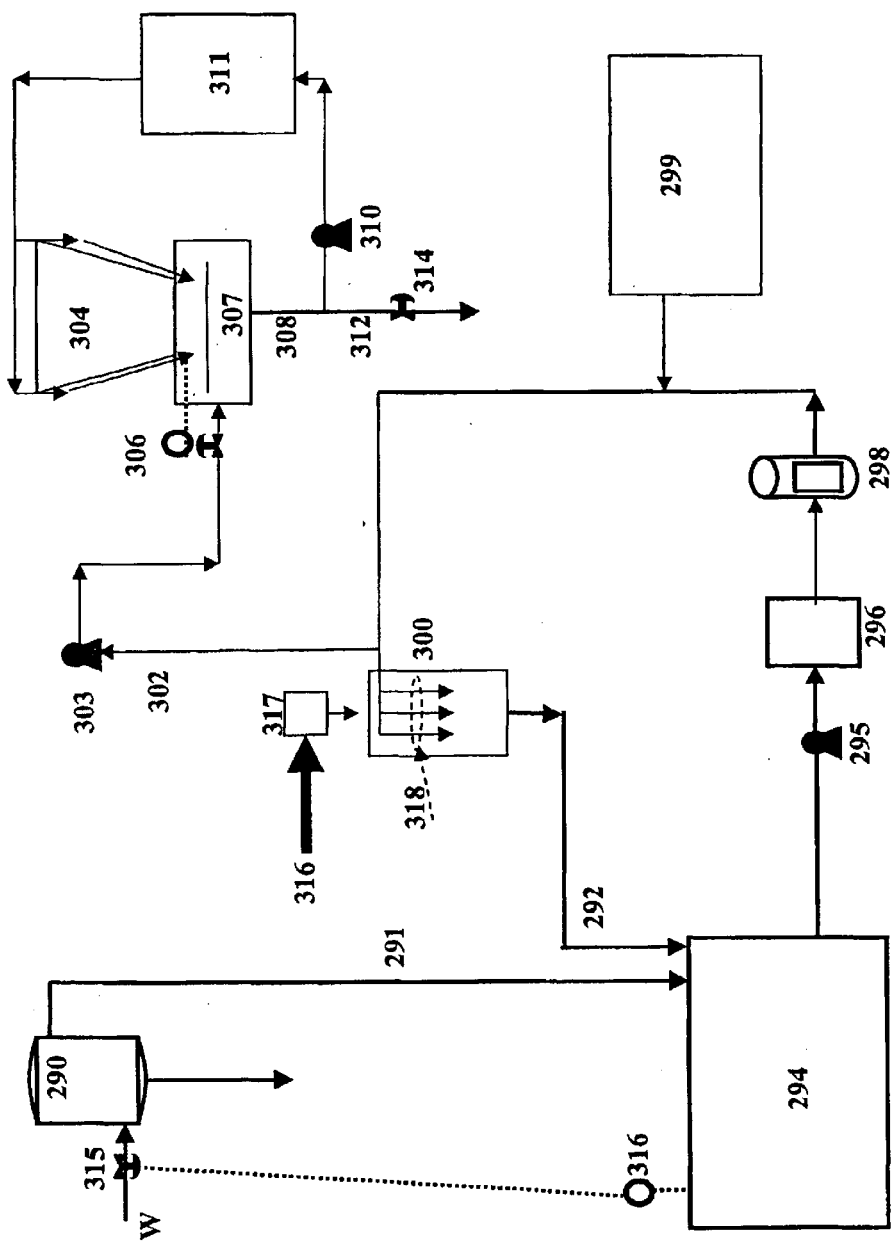
Figure 22: Combining Safety shower, Cooling Tower, Cutter Water, & HTM Pump coolers

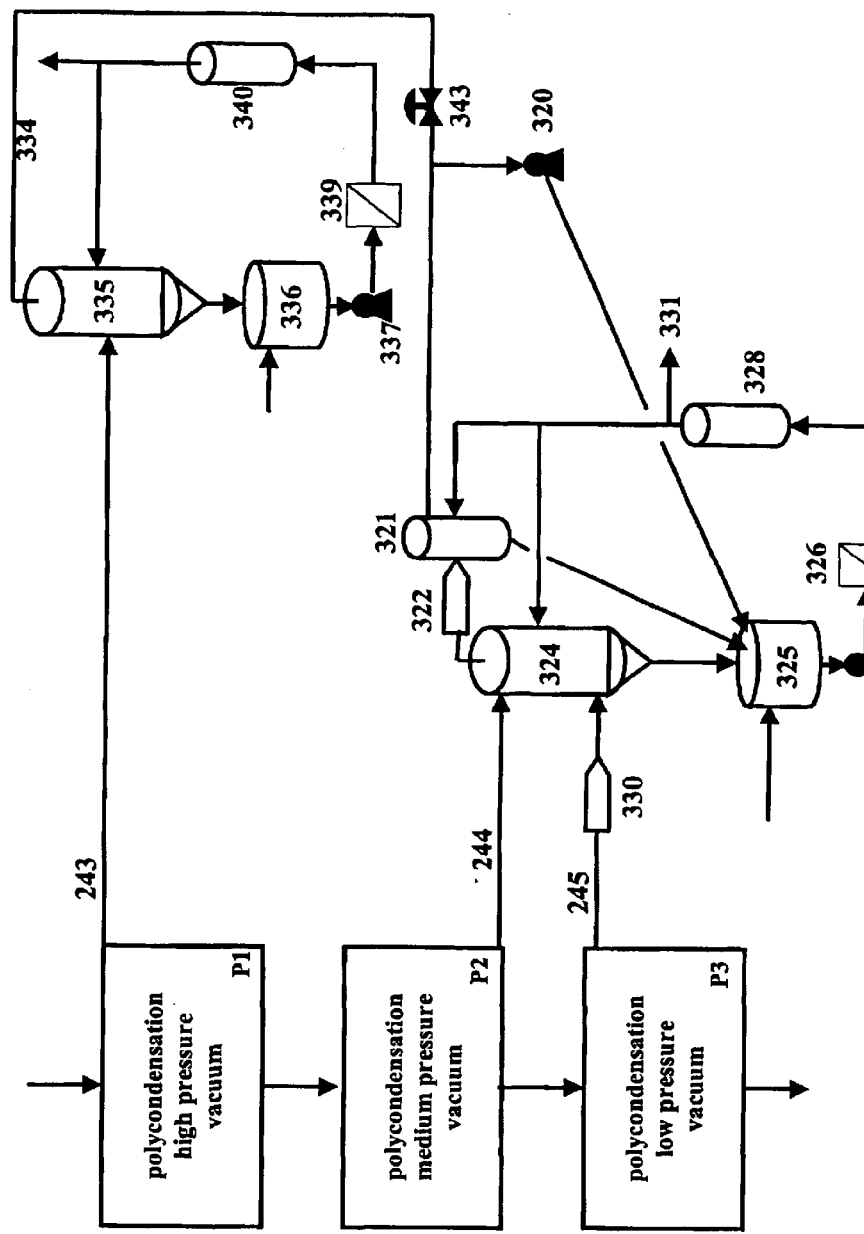
FIGURE 23. Integrated Vacuum system reducing EG Jets & eliminating Chilled Water System

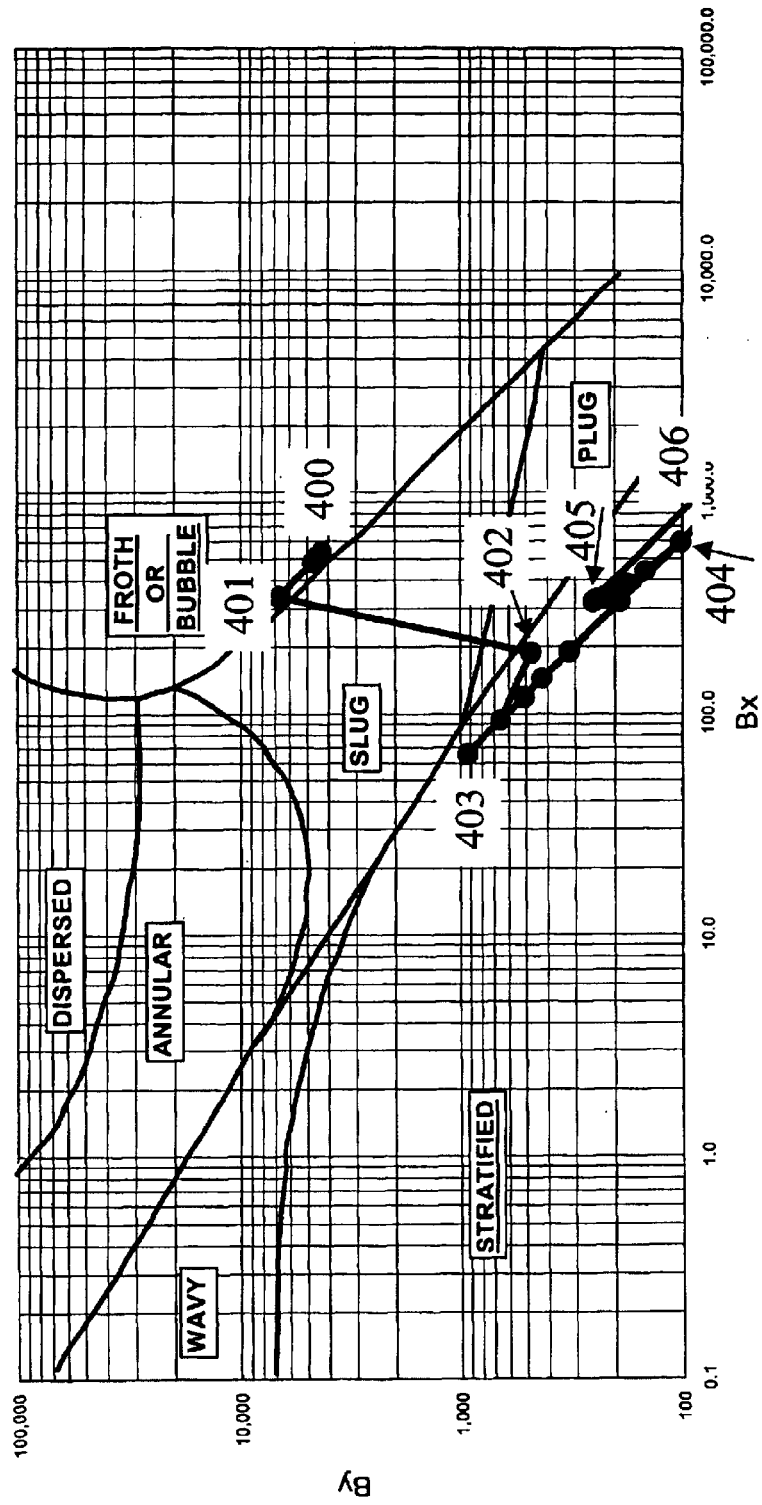
FIGURE 24: PIPE REACTOR TWO-PHASE FLOW PATTERN

POLYESTER PROCESS USING A PIPE REACTOR

CROSS REFERENCE TO RELATED APPLICATIONS

This application claims priority to U.S. Provisional Application Ser. No. 60/254,040, filed Dec. 7, 2000, which application is hereby incorporated by this reference in its entirety.

BACKGROUND OF THE INVENTION

Field of the Invention

This invention relates generally to polyester processes and apparatuses, wherein the esterification, polycondensation, or both esterification and polycondensation process is performed in a pipe reactor.

As the business of manufacturing polyesters becomes more competitive, alternative lower cost manufacturing processes have become highly desirable. A variety of processes have been developed. Early efforts used reactive distillation (U.S. Pat. No. 2,905,707) with ethylene glycol ("EG") vapor as reactants (U.S. Pat. No. 2,829,153). Multiple stirred pots have been disclosed to gain additional control of the reaction (U.S. Pat. No. 4,110,316 and WO 98/10007). U.S. Pat. No. 3,054,776 discloses the use of lower pressure drops between reactors, while U.S. Pat. No. 3,385,881 discloses multiple reactor stages within one reactor shell. These designs were improved to solve problems with entrainment or plugging, heat integration, heat transfer, reaction time, the number of reactors, etc., as described in U.S. Pat. Nos. 3,118,843; 3,582,244; 3,600,137; 3,644,096; 3,689,461; 3,819,585; 4,235,844; 4,230,818; and 4,289,895. Unfortunately, the reactors and plants are extremely complex. The stirred polycondensation reactors have complex designs, which require detailed calculations and craftsmanship. The reactor must operate under a vacuum and, whether heated or cooled, maintain its shape so the agitator does not scrape the walls, and a close tolerance is maintained to provide effective mass transfer. These complex designs cannot be built or installed quickly. They also require expertise to maintain and operate.

Conventional cylindrical esterification or ester exchange reactors, such as a continuous stirred tank reactor ("CSTR") have many internals, such as baffles, pipe coils for heating, large overflow weirs, trays, packing, agitators, and draft tubes, etc. Esterification or ester exchange reactors can also be reactive distillation, stripper, or rectification columns with their associated internal trays, packing, downcomers, reboilers, condensers, internal heat exchangers, reflux systems, pumps, etc. Conventional polycondensation reactors, which are typically a psuedo, plug flow device, which tries to maintain an average residence time with a narrow time distribution, are typically a (1) CSTR, typically of the wipe film or thin film reactor type, or (2) reactive distillation device. Such conventional condensation reactors commonly have a means of enhancing the surface renewal, usually by making thin films of the polymer. Such conventional polycondensation devices contain trays, internal heating coils, weirs, baffles, wipe films, internal agitators, and large agitators with seals or magnetic drives, etc. These reactors normally have scrapers or other highly complicated devices for keeping the vapor lines from plugging. Many polycondensation reactors also have very tight tolerance requirements and must maintain their shape over a range of temperatures. These cylindrical reactors require a large amount of engineering, drafting, and skilled craftsmanship to construct. The cylindrical reactor also has a specially fabricated jacket having multiple partial pipe jackets and weld lines connecting the pipe jackets to each other and the reactor. The cylindrical reactor has additional external components such as gearboxes, agitators, seal systems, motors, and the like. The extra complexity, materials, and skill required to construct the cylindrical reactors leads to the higher cost.

A pipe has been disclosed in prior art patents that is integrated into the process or equipment. U.S. Pat. No. 3,192,184, for example, discloses an internally baffled pipe within the reactor, and U.S. Pat. No. 3,644,483 discloses the use of a pipe for paste addition. As other examples, Patent Application WO 96/22318 and U.S. Pat. No. 5,811,496 disclose two pipe reactors between the esterification and polymerization reactors, and U.S. Pat. No. 5,786,443 discloses a pipe reactor between an esterification reactor and a heater leading to a staged reactor. Each of these reactor trains incorporates a pipe reactor into the other complex reactors and equipment.

While it has been theorized that optimum ester exchange or esterification would occur in a continuum of continuous pressure reduction and continuous temperature increase (see FIG. 1, Santosh K. Gupta and Anil Kumar, Reaction Engineering of Step Growth Polymerization, The Plenum Chemical Engineering Series, Chapter 8, Plenum Press, 1987), the cost of doing so with existing conventional equipment is prohibitive, because it requires numerous small reactors, each with their own associated instruments and valves for level, pressure, and temperature control and pumps. Thus, in conventional polyester plant designs the number of pressure reduction stages (cylindrical reactors) is minimized to minimize cost. The tradeoff is that if the number of reactors were instead increased, then the pressure drop would be minimized.

There is a need in the art for lower cost, simpler apparatuses and processes for making polyesters.

SUMMARY OF THE INVENTION

The present invention relates to equipment and processes for the manufacture of polyesters. More specifically, the present invention relates to pipe reactors and associated equipment and processes for use in both new and existing (retrofitted) polyester plants. The starting materials, or the reactants, can be liquid, gas, or solid feedstocks using any components for the polyester or modifiers. The present pipe reactor invention has many advantages over conventional polyester processes and apparatuses.

This pipe reactor process of the present invention allows the designer to decouple from each other the reactor heat transfer, volume (i.e. residence time), agitation, and disengagement functions. With respect to heat transfer, the pipe reactors of the present invention do not require internal heating coils of a continuous stirred tank reactor, but instead can use various heating means such as a heat exchanger or jacketed pipe. Among many limitations of CSTRs, the amount of heating coils is limited due to the need to maintain agitation of the fluids. Too many heating coils do not allow enough space between coils for agitation. Because the heat transfer function and agitation function are decoupled in a pipe reactor system, this limitation of CSTRs, among others, is not present in the pipe reactor system of the present invention.

Pipe reactors are not limited to the volume of a vessel for kinetic considerations as is the case with a CSTR; pipe reactors utilize the length of pipe for kinetics, which can be varied in a simple manner. As to mass transfer or agitation, pipe reactors do not require a propeller or impeller of a CSTR; instead, a pump or gravity flow can be used to move fluid around.

Finally, with respect to disengagement, which is the separation of the gas from the liquid interface, a CSTR process controls the liquid/gas interface by reactor volume. Controlling the interface by controlling the reactive volume is a difficult way to control the velocity of the fluids. If the CSTR is made tall and skinny, the level control becomes difficult, agitator shaft deflections and seal problems increase, vapor velocities increase with increased entrainment, and reactor costs increase with the increased surface area. On the other hand, if the CSTR is made short and fat, not enough heating coils can be introduced into the reactor, agitation is more difficult with the larger diameter, and for large scale plants, shipping the vessel becomes an issue. Thus, there are optimum dimensions for the length, width and height of a CSTR, which thereby makes it difficult to modify the CSTR to control to the velocity of the fluids. As such, in a CSTR operation, more vapor removal operations are required to control the vapor velocity. However, additional vapor removal operations lead to the problems of entrained liquid being removed by the vapor and loss of yield. Conversely, in a pipe reactor system of the invention herein, to control the liquid/gas interface, additional pipes (pipe reactors) in parallel can be added to control the total fluid velocity and gas velocity leaving the surface. Thus, with a pipe reactor system of the present invention, the disengagement functions are simpler and much easier to control than that of a conventional CSTR system. Similar disadvantages can be found in other conventional reactor systems for making polyesters found in the art, such as reactive distillation, stripper, or rectification columns, or tank with internals, screw, or kneader reactors in comparison to the above stated advantages of the pipe reactor design of the present invention.

Surprisingly, the pipe reactors of the present invention can be used for polyester processes, which typically have long residence times. Generally, pipe reactors are used for processes having only very short residence times. However, it has been found herein that the pipe reactors of the present invention can be used for a longer residence time polyester production processes.

Accordingly, in one embodiment, the invention is directed to a process for making a polyester polymer from a plurality of reactants, comprising:

a. providing an esterification pipe reactor having an inlet, an outlet, and an interior surface, the esterification pipe reactor comprising a substantially empty pipe;

b. adding at least one reactant into the pipe reactor proximal the inlet so that the reactants flow through the pipe reactor and react with each other to form a polyester monomer within the pipe reactor and the polyester monomer exits from the outlet thereof, wherein the reactants and the polyester monomer flowing through the esterification pipe reactor are each an esterification fluid;

c. providing a polycondensation pipe reactor formed separately of the esterification pipe reactor, the polycondensation pipe reactor in fluid communication with the esterification pipe reactor, the polycondensation pipe reactor having a first end, a second end, and an inside surface, the polycondensation pipe reactor comprising a substantially empty pipe; and d. directing the fluid polyester monomer into the first end of the polycondensation pipe reactor so that the monomer flows through the polycondensation reactor, the monomer reacting to form an oligomer and then the oligomer reacting to form the polymer within the polycondensation pipe reactor, and the polymer exits from the second end of the reactor, wherein the monomer, the oligomer, and the polymer flowing through the polycondensation pipe reactor are each a polycondensation fluid.

In another embodiment, the invention is directed to a process for making a polyester polymer from a plurality of reactants, comprising:

a. providing an esterification pipe reactor having an inlet, an outlet, and an interior surface;

b. adding at least one reactant into the pipe reactor proximal the inlet so that the reactants flow through the pipe reactor and react with each other to form a polyester monomer within the pipe reactor and the polyester monomer exits from the outlet thereof, wherein the reactants and the polyester monomer flowing through the esterification pipe reactor are each an esterification fluid, wherein the reactants comprise terephthalic acid or dimethylterephthalate;

c. providing a polycondensation pipe reactor formed separately of the esterification pipe reactor, the polycondensation pipe reactor in fluid communication with the esterification pipe reactor, the polycondensation pipe reactor having a first end, a second end, and an inside surface; and d. directing the fluid polyester monomer into the first end of the polycondensation pipe reactor so that the monomer flows through the polycondensation reactor, the monomer reacting to form an oligomer and then the oligomer reacting to form the polymer within the polycondensation pipe reactor, and the polymer exits from the second end of the reactor, wherein the monomer, the oligomer, and the polymer flowing through the polycondensation pipe reactor are each a polycondensation fluid.

In another embodiment, the invention is directed to a process for making a polyester polymer from a plurality of reactants, comprising:

a. providing an esterification pipe reactor having an inlet, an outlet, and an interior surface;

b. adding at least one reactant into the pipe reactor proximal the inlet so that the reactants flow through the pipe reactor and react with each other to form a polyester monomer within the pipe reactor and the polyester monomer exits from the outlet thereof, wherein the reactants and the polyester monomer flowing through the esterification pipe reactor are each an esterification fluid;

c. providing a polycondensation pipe reactor formed separately of the esterification pipe reactor, the polycondensation pipe reactor in fluid communication with the esterification pipe reactor, the polycondensation pipe reactor having a first end, a second end, and an inside surface; and d. directing the fluid polyester monomer into the first end of the polycondensation pipe reactor so that the monomer flows through the polycondensation reactor, the monomer reacting to form an oligomer and then the oligomer reacting to form the polymer within the polycondensation pipe reactor, and the polymer exits from the second end of the reactor, wherein the monomer, the oligomer, and the polymer flowing through the polycondensation pipe reactor are each a polycondensation fluid.

In another embodiment, the invention is directed to a process for making a polyester polymer from a plurality of reactants, comprising:

a. providing a combined esterification and prepolymer polycondensation pipe reactor having an inlet, an outlet, and an interior surface;

b. adding at least one reactant into the pipe reactor proximal the inlet so that the reactants flow through the pipe reactor and react with each other to form a polyester oligomer within the pipe reactor and the polyester oligomer exits from the outlet thereof, wherein the reactants and the polyester oligomer flowing through the esterification pipe reactor are each an esterification fluid;

c. providing a polycondensation pipe reactor formed separately of the combined esterification prepolymer pipe reactor, the polycondensation pipe reactor in fluid communication with the esterification/prepolymer pipe reactor, the polycondensation pipe reactor having a first end, a second end, and an inside surface; and d. directing the fluid polyester oligomer into the first end of the polycondensation pipe reactor so that the oligomer flows through the polycondensation reactor, the oligomer reacting to form the polymer within the polycondensation pipe reactor, and the polymer exits from the second end of the reactor, wherein the oligomer and the polymer flowing through the polycondensation pipe reactor are each a polycondensation fluid.

In another embodiment, the invention is directed to a process for making a polyester polymer from a plurality of reactants, comprising:

a. providing an esterification pipe reactor having an inlet, an outlet, and an interior surface;

b. adding at least one reactant into the pipe reactor proximal the inlet so that the reactants flow through the pipe reactor and react with each other to form a polyester monomer within the pipe reactor and the polyester monomer exits from the outlet thereof, wherein the reactants and the polyester monomer flowing through the esterification pipe reactor are each an esterification fluid;

c. providing a polycondensation pipe reactor integrally combined with the esterification pipe reactor, the polycondensation pipe reactor in fluid communication with the esterification pipe reactor, the polycondensation pipe reactor having a first end, a second end, and an inside surface; and d. directing the fluid polyester monomer into the first end of the polycondensation pipe reactor so that the monomer flows through the polycondensation reactor, the monomer reacting to form an oligomer and then the oligomer reacting to form the polymer within the polycondensation pipe reactor, and the polymer exits from the second end of the reactor, wherein the monomer, the oligomer, and the polymer flowing through the polycondensation pipe reactor are each a polycondensation fluid.

In another embodiment, the invention is directed to a process for making a polyester oligomer from a plurality of reactants, comprising:

a. providing an esterification pipe reactor having an inlet, an outlet, and an interior surface;

b. adding at least one reactant into the pipe reactor proximal the inlet so that the reactants flow through the pipe reactor and react with each other to form a polyester monomer within the pipe reactor and the polyester monomer exits from the outlet thereof, wherein the reactants and the polyester monomer flowing through the esterification pipe reactor are each an esterification fluid;

c. providing a prepolymer polycondensation pipe reactor formed separately of the esterification pipe reactor, the polycondensation pipe reactor in fluid communication with the esterification pipe reactor, the polycondensation pipe reactor having a first end, a second end, and an inside surface; and d. directing the fluid polyester monomer into the first end of the polycondensation pipe reactor so that the monomer flows through the polycondensation reactor, the monomer reacting to form the oligomer within the polycondensation pipe reactor, and the oligomer exits from the second end of the reactor, wherein the monomer and the oligomer flowing through the polycondensation pipe reactor are each a polycondensation fluid.

In another embodiment, the invention is directed to a process for making a polyester oligomer from a plurality of reactants, comprising:

a. providing an esterification pipe reactor having an inlet, an outlet, and an interior surface;

b. adding at least one reactant into the pipe reactor proximal the inlet so that the reactants flow through the pipe reactor and react with each other to form a polyester monomer within the pipe reactor and the polyester monomer exits from the outlet thereof, wherein the reactants and the polyester monomer flowing through the esterification pipe reactor are each an esterification fluid;

c. providing a prepolymer polycondensation pipe reactor integrally combined with the esterification pipe reactor, the polycondensation pipe reactor in fluid communication with the esterification pipe reactor, the polycondensation pipe reactor having a first end, a second end, and an inside surface; and d. directing the fluid polyester monomer into the first end of the polycondensation pipe reactor so that the monomer flows through the polycondensation reactor, the monomer reacting to form the oligomer within the polycondensation pipe reactor, and the oligomer exits from the second end of the reactor, wherein the monomer and the oligomer flowing through the polycondensation pipe reactor are each a polycondensation fluid.

In another embodiment, the invention is directed to a process for making a polyester monomer from a plurality of reactants, comprising:

a. providing an esterification pipe reactor having an inlet, an outlet, an interior surface, and at least one weir attached to the interior surface thereof; and b. adding at least one reactant into the pipe reactor proximal the inlet so that the reactants flow through the pipe reactor, the reactants reacting with each other to form the polyester monomer within the pipe reactor and the polyester monomer exits from the outlet thereof, wherein the reactants and the polyester monomer flowing through the esterification pipe reactor are each an esterification fluid, and wherein the esterification fluids flow over the weir.

In another embodiment, the invention is directed to a process for making a polyester monomer from a plurality of reactants, comprising:

a. providing an esterification pipe reactor having an inlet, an outlet, and an interior surface;

b. adding at least one reactant into the pipe reactor proximal the inlet so that the reactants flow through the pipe reactor, the reactants reacting with each other to form the polyester monomer within the pipe reactor and the polyester monomer exits from the outlet thereof, and wherein the reactants and the polyester monomer flowing through the esterification pipe reactor are each an esterification fluid; and c. recirculating a portion of the process fluids and directing the recirculation effluent back to and therethrough the esterification reactor proximate the inlet of the esterification reactor or between the inlet and outlet of the esterification reactor.

In another embodiment, the invention is directed to a process for making a polyester monomer from a plurality of reactants, comprising:

a. providing an esterification pipe reactor having an inlet, an outlet, and an interior surface;

b. adding at least one reactant into the pipe reactor proximal the inlet so that the reactants flow through the pipe reactor, the reactants reacting with each other to form the polyester monomer within the pipe reactor and the polyester monomer exits from the outlet thereof, wherein the reactants and the polyester monomer flowing through the esterification pipe reactor are each an esterification fluid; and c. removing vapors from the pipe reactor intermediate its inlet and its outlet and/or proximate its outlet through a vent of empty pipe.

In another embodiment, the invention is directed to a process for making a polyester monomer from a plurality of reactants, comprising:

a. providing an esterification pipe reactor having an inlet, an outlet, and an interior surface, the inlet being positioned at least 20 vertical feet below the outlet;

b. adding at least one reactant into the pipe reactor proximal the inlet so that the reactants flow through the pipe reactor, the reactants reacting with each other to form the polyester monomer within the pipe reactor and the polyester monomer exits from the outlet thereof, and wherein the reactants and the polyester monomer flowing through the esterification pipe reactor are each an esterification fluid.

In another embodiment, the invention is directed to a process for making a polyester monomer from a plurality of reactants, comprising:

a. providing an esterification pipe reactor having an inlet, an outlet, and an interior surface;

b. adding at least one reactant into the pipe reactor proximal the inlet so that the reactants flow through the pipe reactor, the reactants reacting with each other to form the polyester monomer within the pipe reactor and the polyester monomer exits from the outlet thereof, wherein the reactants and the polyester monomer flowing through the esterification pipe reactor are each an esterification fluid, and wherein the fluids present in the pipe reactor are in a bubble or froth flow regime.

In another embodiment, the invention is directed to a process for making a polyester monomer from a plurality of reactants, comprising:

a. providing an esterification pipe reactor having an inlet, an outlet, and an interior surface, wherein the pipe reactor has alternating linear and non-linear sections extending in its lengthwise direction between the inlet and outlet thereof;

b. adding at least one reactant into the pipe reactor proximal the inlet so that the reactants flow through the pipe reactor, the reactants reacting with each other to form the polyester monomer within the pipe reactor and the polyester monomer exits from the outlet thereof, wherein the reactants and the polyester monomer flowing through the esterification pipe reactor are each an esterification fluid.

In another embodiment, the invention is directed to a process for making a polyester monomer from a plurality of reactants, comprising:

a. providing an esterification pipe reactor having an inlet, an outlet, and an interior surface; and b. adding at least one reactant into the pipe reactor proximal the inlet so that the reactants flow through the pipe reactor, the reactants reacting with each other to form the polyester monomer within the pipe reactor and the polyester monomer exits from the outlet thereof, wherein the at least one reactant and the polyester monomer flowing through the esterification pipe reactor are each an esterification fluid.

In another embodiment, the invention is directed to a process for making a polyester polymer, comprising:

a. providing a polycondensation pipe reactor having a first end, a second end, and an inside surface, the first end being disposed vertically above the second end, the polycondensation pipe reactor having alternating linear and non-linear sections extending in its lengthwise direction between its first end and its second end; and b. directing a fluid polyester monomer into the first end of the polycondensation pipe reactor so that the monomer flows through the polycondensation reactor, the monomer reacting to form an oligomer and then the oligomer reacting to form the polymer within the polycondensation pipe reactor, and the polymer exits from the second end of the reactor, wherein the monomer, the oligomer, and the polymer flowing through the polycondensation pipe reactor are each a polycondensation fluid.

In another embodiment, the invention is directed to a process for making a polyester polymer, comprising:

a. providing a polycondensation pipe reactor having a first end, a second end, an inside surface, and at least one weir attached to the inside surface thereof, wherein the pipe reactor is made of a substantially empty pipe; and b. directing a fluid polyester monomer into the first end of the polycondensation pipe reactor so that the monomer flows through the polycondensation reactor, the monomer reacting to form an oligomer and then the oligomer reacting to form the polymer within the polycondensation pipe reactor, and the polymer exits from the second end of the reactor, wherein the monomer, the oligomer, and the polymer flowing through the polycondensation pipe reactor are each a polycondensation fluid, and wherein at least one of the polycondensation fluids flows over the weir.

In another embodiment, the invention is directed to a process for making a polyester polymer, comprising:

a. providing a polycondensation pipe reactor having a first end, a second end, and an inside surface; and b. directing a fluid polyester monomer into the first end of the polycondensation pipe reactor so that the monomer flows through the polycondensation reactor, the monomer reacting to form an oligomer and then the oligomer reacting to form the polymer within the polycondensation pipe reactor, and the polymer exits from the second end of the reactor, wherein the monomer, the oligomer, and the polymer flowing through the polycondensation pipe reactor are each a polycondensation fluid; and c. removing vapors from the pipe reactor intermediate its inlet and its outlet and/or proximate its inlet or outlet through a vent comprising substantially empty pipe.

In another embodiment, the invention is directed to a process for making a polyester polymer, comprising:
 a. providing a polycondensation pipe reactor having a first end, a second end, and an inside surface; and
 b. directing a fluid polyester monomer into the first end of the polycondensation pipe reactor so that the monomer flows through the polycondensation reactor, the monomer reacting to form an oligomer and then the oligomer reacting to form the polymer within the polycondensation pipe reactor, and the polymer exits from the second end of the reactor, wherein the monomer, the oligomer, and the polymer flowing through the polycondensation pipe reactor are each a polycondensation fluid, and wherein the fluids present in the pipe reactor are in a stratified flow regime.

In another embodiment, the invention is directed to a process for making a polyester polymer, comprising:
 a. providing a polycondensation pipe reactor having a first end, a second end, and an inside surface; and
 b. directing a fluid polyester monomer into the first end of the polycondensation pipe reactor so that the monomer flows through the polycondensation reactor, the monomer reacts to form an oligomer and then the oligomer reacts to form the polymer within the polycondensation pipe reactor, and the polymer exits from the second end of the reactor, wherein the monomer, the oligomer, and the polymer flowing through the polycondensation pipe reactor are each a polycondensation fluid.

In another embodiment, the invention is directed to a process for making a polyester polymer, comprising:
 a. providing a polycondensation pipe reactor having a first end, a second end, and an inside surface; and
 b. directing a fluid polyester oligomer into the first end of the polycondensation pipe reactor so that the oligomer flows through the polycondensation pipe reactor, the oligomer reacting to form the polyester polymer within the polycondensation pipe reactor and the polyester polymer exits from the second end thereof.

In another embodiment, the invention is directed to an apparatus for producing a polyester polymer, comprising:
 a. an esterification pipe reactor having an inlet, an outlet, and an interior surface through which esterification fluid reactants are passed; and
 b. a polycondensation pipe reactor formed separately of and in fluid communication with the esterification reactor, wherein the polycondensation reactor has an inlet, an outlet, and an interior surface through which at least one polycondensation fluid reactant is passed, wherein the esterification and polycondensation reactors comprise substantially empty pipe.

In another embodiment, the invention is directed to an apparatus for producing a polyester polymer, comprising:
 a. an esterification pipe reactor having an inlet, an outlet, and an interior surface through which esterification fluid reactants are passed; and
 b. a polycondensation pipe reactor formed separately of and in fluid communication with the esterification reactor, wherein the polycondensation reactor has an inlet, an outlet, and an interior surface through which at least one polycondensation fluid reactant is passed.

In another embodiment, the invention is directed to an esterification pipe reactor apparatus for producing a polyester monomer, comprising:
 a. an esterification pipe reactor having an inlet, an outlet, and an interior surface; and
 b. a recirculation loop having an influent and an effluent, the effluent being in fluid communication with the esterification pipe reactor.

In another embodiment, the invention is directed to an apparatus for producing a polyester monomer, oligomer, or polymer, comprising:
 a. a pipe reactor having an inlet, an outlet, and an interior surface through which the fluid reactants are passed; and
 b. a weir connected to a portion of the interior surface of the pipe reactor and adjacent the outlet thereof,
wherein the reactor comprises substantially empty pipe.

In another embodiment, the invention is directed to an apparatus for producing a polyester monomer, oligomer, or polymer, comprising:
 a. a pipe reactor having an inlet, an outlet, and an interior surface through which the fluid reactants are passed; and
 b. a vent in fluid communication with the reactor, the vent further comprising an upstanding degas stand pipe coupled to the vent, the degas stand pipe having a receiving end in fluid communication with the vent and an opposed venting end disposed vertically above the receiving end, and wherein the degas stand pipe is non-linear extending in its lengthwise direction between the receiving end and the venting end thereof, and wherein the degas stand pipe is formed of three contiguous sections each in fluid communication with each other, a first section adjacent the receiving end and extending substantially vertically from the vent, a second section coupled to the first section and oriented at an angle relative to the first section in plan view, and a third section coupled to the second section and oriented at a complimentary angle relative to the second section in plan view so that the third section is oriented substantially horizontally.

In another embodiment, the invention is directed to an apparatus for producing a polyester monomer, oligomer, or polymer comprising:
 a. a pipe reactor having an inlet, an outlet, and an interior surface through which the fluid reactants are passed.

In another embodiment, the invention is directed to an apparatus for venting a process of gas or vapor while effectively disengaging liquid from the gas or vapor, the liquid, gas, and vapor being fluids, separating the liquid from the gas or vapor, and returning the liquid back to the process, comprising:
 a. a vessel or process pipe containing (i) liquid and (ii) gas or vapor; and
 b. a vent in fluid communication with the vessel or process pipe, the vent further comprising an upstanding degas stand pipe coupled to the vent, the degas stand pipe having a receiving end in fluid communication with the vent and an opposed venting end disposed vertically above the receiving end, and wherein the degas stand pipe is non-linear extending in its lengthwise direction between the receiving end and the venting end thereof, and wherein the degas stand pipe is formed of three contiguous sections each in fluid communication with each other, a first section adjacent the receiving end and extending substantially vertically from the vent, a second section coupled to the first section and oriented at an angle relative to the first section in plan view, and a third section coupled to the second section and oriented at an angle relative to the second section in plan view so that the third section is oriented substantially horizontally.

In another embodiment, the invention is directed to a fluid mixing and distribution system adapted for the mixture, storage, and distribution of fluids to a separate plant process distribution system, comprising:
 a. a first elongate and vertically disposed fluid storage vessel;
 b. a circulating pump in fluid communication with the first vessel and the second vessel, the circulating pump being constructed and arranged to pass a fluid flow through the system and to circulate the fluid from the first vessel into the second vessel and from the first vessel to the first vessel;
 c. a second fluid storage and dispensing vessel in fluid communication with the first vessel and the second vessel being disposed at a greater vertical elevation than the first vessel; and
 d. a control valve in fluid communication with the circulating pump, the first vessel and the second vessel, respectively, the control valve being constructed and arranged to selectively direct the fluid flow from the first vessel into the second vessel and from the first vessel into the first vessel,
wherein the second vessel is in fluid communication with the plant process distribution system, and wherein a static pressure head formed by the fluid held within the second vessel is used to pass the fluid from the second vessel to the plant process distribution system.

In another embodiment, the invention is directed to a fluid mixing and distribution system adapted for the mixture, storage, and distribution of fluids to a separate plant process distribution system, comprising:
 a. a first fluid storage vessel;
 b. a second fluid mixing and storage vessel;
 c. a circulating pump in fluid communication with the first vessel and the second vessel, the circulating pump being constructed and arranged to circulate the fluid through the system and from the first vessel into the second vessel;
 d. the second vessel being disposed at a greater vertical elevation than both of the first vessel and the plant process distribution system; and
 e. a control valve in fluid communication with the circulating pump, the first vessel and the second vessel, respectively, the control valve being constructed and arranged to selectively direct the fluid flow from the first vessel back into the first vessel and from the first vessel into the second vessel;
 f. the second vessel being in fluid communication with the plant process distribution system, wherein a static pressure head formed by the fluid held within the second vessel is used to pass the fluid from the second vessel to the plant process distribution system.

In another embodiment, the invention is directed to a method of mixing and distribution a fluid within a fluid mixing and distribution system adapted for the mixture, storage, and distribution of fluids to a separate plant process distribution system, comprising:
 a. placing at least one fluid into a first elongate and vertically disposed fluid storage vessel;
 b. passing the fluid from the first vessel into a second elongate and vertically disposed fluid mixing and storage vessel, the second fluid vessel being disposed at a greater vertical elevation than both of the first vessel and the plant process distribution system, with a circulating pump in fluid communication with the first vessel and the second vessel, the circulating pump being constructed and arranged to pass the fluid through the system;
 c. using a control valve in fluid communication with the circulating pump, the first vessel and the second vessel to selectively direct the fluid from the first vessel to either of the first vessel and the second vessel; and
 d. selectively passing the fluid from the second vessel to the plant process distribution system, the second vessel creating a static pressure head used to pass the fluid stored therein to the plant process distribution system.

In another embodiment, the invention is directed to a heat transfer media control system for use with a pipe reactor system, the pipe reactor system having a supply heat transfer media loop through which a first stream of a heat transfer media is passed and a return heat transfer media loop through which a second stream of the heat transfer media is passed, the temperature of the first heat transfer media stream being greater than the temperature of the second heat transfer media stream, said heat transfer media control system comprising:
 a. a first heat transfer media header through which the first heat transfer media stream is passed;
 b. a second heat transfer media header through which the second heat transfer media stream is passed;
 c. a first heat transfer media sub-loop, through which the heat transfer media may be passed, from the first to the second headers, respectively;
 d. a control valve in fluid communication with a selected one of the headers and the first sub-loop;
 e. the pressure of the first heat transfer media stream within the first header being greater than the pressure of the second heat transfer media stream within the second header;
 f. wherein the control valve is used to selectively direct at least a portion of the first heat transfer media stream into the first sub-loop using the pressure of the first heat transfer media stream to pass the heat transfer media, and to also control the temperature and pressure of the heat transfer media stream being passed through the first sub-loop.

In another embodiment, the invention is directed to a heat transfer media control system for use with a pipe reactor system, the pipe reactor system having a supply heat transfer media loop through which a first stream of a heat transfer media is passed and a return heat transfer media loop through which a second stream of the heat transfer media is passed, the temperature of the first heat transfer media stream being greater than the temperature of the second heat transfer media stream, said heat transfer media control system comprising:
 a. a first heat transfer media header through which the first heat transfer media stream is passed;
 b. a second heat transfer media header through which the second heat transfer media stream is passed;
 c. a first heat transfer media sub-loop through which the heat transfer media may be passed from the first header to the second header;
 d. a first control valve in fluid communication with the first header and the first sub-loop; and
 e. a second control valve in fluid communication with the first sub-loop and the second header;

f. the pressure of the first heat transfer media stream within the first header being greater than the pressure of the second heat transfer media stream within the second header;

g. wherein one or both of the control valves is used to selectively direct at least a portion of the first heat transfer media stream into the first sub-loop, using the pressure of the first heat transfer media stream, to pass the heat transfer media through the first sub-loop, and to also control the temperature and pressure of the heat transfer media stream being passed through the first sub-loop.

In another embodiment, the invention is directed to a method of passing a heat transfer media through a heat transfer media system for use with a pipe reactor system, the pipe reactor system having a supply heat transfer media loop through which a first stream of a heat transfer media is passed and a return heat transfer media loop through which a second stream of the heat transfer media is passed, the temperature and the pressure of the first heat transfer media stream being greater than the temperature and the pressure of the second heat transfer media stream, said heat transfer media control system comprising:

a. passing the first heat transfer media stream through a first heat transfer media header;

b. passing the second heat transfer media stream through a second heat transfer media header;

c. passing the heat transfer media from the first header through a first heat transfer media sub-loop, in the absence of a heat transfer media circulating pump, with a first control valve in fluid communication with the first header and the first sub-loop; and d. passing the heat transfer media from the first sub-loop into the second header, in the absence of a heat transfer media circulating pump, with a second control valve in fluid communication with the first sub-loop and the second header.

In another embodiment, the invention is directed to a fluid delivery system for the delivery of a process working fluid supply to a fluid process plant, the process plant having a pipe system for handling, distributing, and processing the fluid, the system comprising:

a. at least one delivery container positioned at a pump station; and b. at least one pump in fluid communication with the at least one delivery container;

c. said at least one delivery container being in fluid communication with a valve train, the valve train being in fluid communication with the process plant pipe system;

wherein the fluid is selectively pumped directly from the at least one delivery container through the valve train and into the process plant pipe system in the absence of a fluid delivery feed and storage tank for otherwise receiving and storing the fluid from the at least one delivery container therein.

In another embodiment, the invention is directed to a fluid delivery system for the delivery of a process working fluid supply to a fluid process plant, the process plant having a pipe system for handling, distributing, and processing the fluid, the system comprising:

a. a first delivery container positioned at a pump station;

b. a first pump in fluid communication with the first delivery container;

c. a second delivery container positioned at the pump station; and d. a second pump in fluid communication with the second delivery container;

e. each of the delivery containers and pumps, respectively, being in fluid communication with a valve train, the valve train being comprised of a plurality of selectively operable control valves and being in fluid communication with the process plant pipe system;

wherein the fluid is selectively pumped directly from the first and second delivery containers, respectively, through the valve train and into the process plant pipe system in the absence of a fluid delivery feed and storage tank.

In another embodiment, the invention is directed to a fluid delivery method for use in delivering a supply of a process working fluid to a fluid process plant, the process plant having a pipe system for handling, distributing, and processing the fluid, the system comprising:

a. positioning a first delivery container at a pump station, the first delivery container being in fluid communication with a first pump;

b. positioning a second delivery container at the pump station, the second delivery container being in fluid communication with a second pump;

c. selectively pumping the fluid from each of the respective delivery containers directly into a valve train, the valve train being comprised of a plurality of selectively operable control valves in fluid communication with the process plant pipe system, and through the valve train into the process plant pipe system in the absence of a fluid delivery feed and storage tank for otherwise receiving and storing the fluid from the at least one delivery container therein.

In another embodiment, the invention is directed to an integrated plant water distribution system, the water distribution system being separately supplied with clean, fresh water from a water supply source for use within a process plant, the system comprising:

a. a safety shower water storage tank in fluid communication with, and supplied by water from the water source;

b. a first water distribution loop in fluid communication with the safety shower water storage tank and being supplied with water therefrom;

c. a second water distribution loop in fluid communication with the first water distribution loop; and d. means for selectively drawing water from the first water distribution loop to supply water to the second water distribution loop.

In another embodiment, the invention is directed to a method of distributing water through an integrated plant water distribution system, the water distribution system being separately supplied with clean, fresh water from a water source for use within a process plant, the method comprising:

a. supplying water to a safety shower water storage tank;

b. passing the water from the safety shower water storage tank into a first water distribution loop in fluid communication with the water storage tank;

c. selectively passing water from the first water distribution loop to a second water distribution loop in fluid communication with the first water loop.

In another embodiment, the invention is directed to an integrated vacuum system for use with a final polycondensation reactor having separate high pressure, medium pressure, and low pressure polycondensation vacuum zones, respectively, the system comprising:

a. a spray condenser, said spray condenser being in fluid communication with each of the medium and low pressure vacuum zones, respectively, of the polycondensation reactor;

b. an interstage condenser in fluid communication with the spray condenser; and c. a vacuum pump in fluid communication with the interstage condenser.

In another embodiment, the invention is directed to an integrated vacuum system for use with a final polycondensation reactor having at least a medium pressure polycondensation vacuum zone and a separate low pressure polycondensation vacuum zone, the system comprising:

a. a spray condenser, said spray condenser being in fluid communication with each of the medium and low pressure vacuum zones, respectively, of the polycondensation reactor;

b. a first EG jet in fluid communication with the spray condenser;

c. an interstage condenser in fluid communication with the first EG jet;

d. a vacuum pump in fluid communication with the interstage condenser; and e. a second EG jet in fluid communication with the low pressure vacuum zone and the spray condenser, respectively.

In another embodiment, the invention is directed to a method of collecting fluid from a final polycondensation reactor having a high pressure vacuum zone, a medium pressure vacuum zone, and a low pressure polycondensation vacuum zone, the method comprising:

a. passing the fluid from at least the medium pressure polycondensation vacuum zone and the low pressure polycondensation vacuum zone of the reactor into a single spray condenser in sealed fluid communication with each of the medium and low pressure vacuum zones, respectively; and b. drawing the fluid through an interstage condenser in fluid communication with the spray condenser with a vacuum pump in fluid communication with the interstage condenser.

In another embodiment, the invention is directed to a process for making a polyester monomer, comprising:

a. providing a pipe reactor having an inlet, an outlet, and an interior surface, the inlet disposed elevationally below the outlet; and b. adding at least one reactant into the pipe reactor proximal the inlet so that the reactants flow through the pipe reactor, wherein the reactants react with each other to form the polyester monomer within the pipe reactor and the polyester monomer exits from the outlet thereof.

In another embodiment, the invention is directed to a process for making a polyester polymer, comprising:

a. providing a polycondensation reactor having a first end, a second end, and an inside surface, the first end disposed elevationally above the second end, the polycondensation reactor being non-linear between the first end and the second end; and b. directing a fluid polyester monomer into the first end of the polycondensation reactor so that the monomer flows through the polycondensation reactor, wherein the monomer reacts to form the polymer within the polycondensation reactor and the polymer exits from the second end thereof.

In another embodiment, the invention is directed to a process for making a polyester polymer, comprising:

a. providing a polycondensation reactor having a first end, a second end, and an inside surface, the first end disposed elevationally above the second end, wherein the polycondensation reactor forms an angle with a vertically-oriented plane, the angle being greater than zero degrees; and b. directing a fluid monomer into the first end of the polycondensation reactor so that the monomer flows through of polycondensation reactor, wherein the monomer reacts to form the polyester polymer within the polycondensation reactor and the polyester polymer exits from the second end thereof.

In another embodiment, the invention is directed to a process for making a polyester, comprising:

a. providing a pipe reactor having an inlet, an outlet, and an interior surface, the inlet disposed elevationally below the outlet; and b. adding at least one reactant into the pipe reactor proximal the inlet so that the reactants flow through the pipe reactor, wherein the reactants react with each other to form the polyester within the pipe reactor and the polyester exits from the outlet thereof.

In another embodiment, the invention is directed to an apparatus for reacting reactants into a polyester monomer, comprising:

a. a pipe reactor having an inlet, an outlet, and an interior surface, the inlet disposed elevationally below the outlet; and b. a weir connected to a portion of the interior surface of the pipe reactor adjacent the outlet thereof.

In another embodiment, the invention is directed to an apparatus for reacting reactants into a polyester monomer, comprising:

a. a pipe reactor having an inlet, an outlet, and an interior surface, the inlet disposed elevationally below the outlet; and b. a venting mechanism incorporated into the pipe reactor so that a fluid traversing within its interior surface also flows through the venting mechanism when flowing from the inlet to the outlet of the pipe reactor, the venting mechanism comprising an eccentric flat-on-bottom reducer.

In another embodiment, the invention is directed to an apparatus for reacting reactants into a polyester monomer, comprising:

a. a pipe reactor having an inlet, an outlet, and an interior surface, the inlet disposed elevationally below the outlet; and b. a recirculation loop having an influent and an effluent, the influent in fluid communication with the pipe reactor proximal to its outlet and the effluent in fluid communication with the pipe reactor adjacent its inlet.

In another embodiment, the invention is directed to an apparatus for reacting a monomer into a polyester polymer, comprising:

a. a polycondensation reactor having a first end, a second end, and an inside surface, the first end disposed elevationally above the second end, the polycondensation reactor being formed as a plurality of contiguous interconnected sections in which the monomer flows along the inside surface of each section traversing from the first end to the second end of the polycondensation reactor, wherein adjacent sections form non-linear angles with each other; and b. at least one weir attached to the inside surface of the polycondensation reactor, wherein one weir is located adjacent a juncture of each of the interconnected sections.

The present invention provides for apparatuses for each and every process embodiment, and concomitantly a process related to each and every apparatus of the invention.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiment(s) of the invention and together with the description, serve to explain the principles of the invention.

FIG. 1 shows a typical polyester reaction temperature and pressure profile.

FIG. 2 shows one embodiment of the esterification or the polycondensation pipe reactor. In a polycondensation pipe reactor mode, the influent and effluent are reversed (influent at 11 and effluent at 12).

FIG. 3 shows installed costs vs. nominal pipe diameter (inches) for a typical pipe reactor installed cost of this invention.

FIG. 4 shows one embodiment of the invention wherein the top of the ester exchange or esterification reactor where level control occurs via a weir into the polycondensation reactor.

FIG. 5 shows one embodiment of the invention where an existing polyester production facility is modified with one or more pipe reactors.

FIG. 6 shows an embodiment of the invention where a larger plant where multiple parallel esterification and polycondensation pipe reactors are utilized, as well as the production of multiple products within one system.

FIGS. 7a–g show various embodiments of the vapor disengagement for both the esterification and polycondensation process.

FIG. 8 shows an embodiment of the polycondensation vapor disengagement.

FIG. 9 shows an embodiment of laminar mixing in a polycondensation zone utilizing a weir and a reduced diameter pipe flow inverter system downstream of the weir.

FIG. 10 shows various embodiments of altering the esterification or ester exchange reactor pressure profile using different non-linear configurations. This figure is presented in side view, showing the vertical displacement between each turn of the esterification or ester exchange reactor lines.

FIG. 11 is a plot of the pressure profiles corresponding to those configurations of FIG. 10.

FIGS. 12a and 12b show different aspects of the additive locations within the process.

FIG. 14 shows an embodiment wherein the heat transfer media subloop pumps are eliminated.

FIG. 15a shows a typical prior art mix and feed system.

FIG. 15b shows an embodiment of the invention for the mix and feed system that eliminates various tanks and other control devices and unit operations.

FIG. 16 shows an embodiment of the invention wherein an alternating low and high pressure configuration is used for the ester exchange or polycondensation pipe reactor.

FIGS. 17a and b show two embodiments of the invention for a low cost polyester plant design integrating a pipe reactor for the esterification and a pipe reactor for the polycondensation system.

FIG. 18 shows one embodiment for the polycondensation pipe reactor process. FIG. 8 is an exploded view of element 133 and FIG. 9 is an exploded view of element 142.

FIG. 19 is an embodiment wherein distillation is replaced with adsorption.

FIG. 20a shows the different flow regimes of two-phase flow in horizontal pipes.

FIG. 20b shows the vapor mass flow vs. ratio of liquid over vapor mass flow and the relationship to each flow regime of two-phase flow in horizontal pipes from FIG. 20a. FIG. 20b also identifies the preferred flow regimes for esterification and polycondensation processes of the present invention.

FIG. 21 shows an embodiment of the invention for unloading trucks without the use of tanks to minimize capital costs and unit operations, along with eliminating water to waste water treatment.

FIG. 22 shows an embodiment of the invention for combining safety shower, cooling tower, cutter water and HTM pump coolers to minimize the water systems in the facility.

FIG. 23 shows an integrated vacuum system for reducing EG jets and eliminating a chilled water system as one embodiment of the invention.

FIG. 24 shows the two-phase regimes for esterification and polycondensation for one embodiment of a process of the present invention wherein a pipe reactor is used to produce PET homopolymer.

DETAILED DESCRIPTION OF THE INVENTION

Figure 13B:
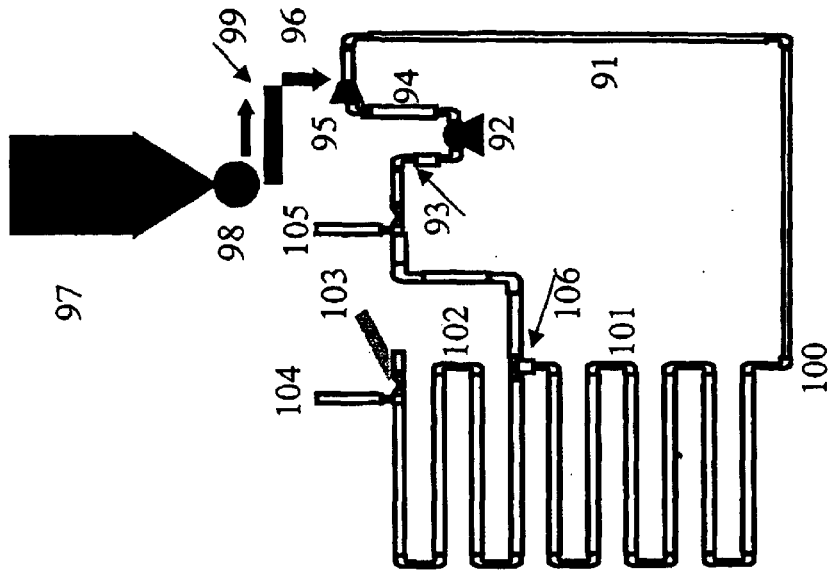
FIGS. 13a and 13b show two different embodiments wherein the paste tank is eliminated by using a recirculation loop.

The present invention may be understood more readily by reference to the following detailed description of preferred embodiments of the invention and the Examples included therein and to the Figures and their previous and following description.

Before the present compounds, compositions, articles, devices, and/or methods are disclosed and described, it is to be understood that this invention is not limited to specific synthetic methods, specific processes, or to particular apparatuses, as such may, of course, vary. It is also to be understood that the terminology used herein is for the purpose of describing particular embodiments only and is not intended to be limiting.

In this specification and in the claims, which follow, reference will be made to a number of terms which shall be defined to have the following meanings:

As used in the specification and the appended claims, the singular forms "a," "an" and "the" include plural referents unless the context clearly dictates otherwise. Thus, for example, reference to a pipe reactor includes one or more pipe reactors.

Ranges may be expressed herein as from "about" one particular value, and/or to "about" another particular value.

When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. For example, the phrase "optionally heated" means that the material may or may not be heated and that such phrase includes both heated and unheated processes.

Residue refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— repeat units in the polyester, regardless of whether ethylene glycol is used to prepare the polyester. Similarly, a sebacic acid residue in a polyester refers to one or more —CO(CH2)$_8$CO— moieties in the polyester, regardless of whether the residue is obtained by reacting sebacic acid or an ester thereof to obtain the polyester.

As used herein, a prepolymer reactor is the first polycondensation reactor, typically under vacuum, and grows the polymer chain length from a feed length of 1–5 to an outlet length of 4–30. The prepolymer reactor typically has the same function for all polyesters, but some polyesters have a target chain length that is short, such as from 10 to 30. For these short target chain length products, no finisher reactor (as defined below) is required, since the prepolymer reactor will provide the end product. A finisher reactor is the last melt phase polycondensation reactor, typically under vacuum, and grows the polymer chain to the desired product chain length.

As used herein, "conventional" process or apparatus with respect to polyester processing refers to a non-pipe reactor or process, including, but not limited to, a continuous stirred tank reactor (CSTR) process or apparatus, or a reactive distillation, stripper, or rectification column process or apparatus, or tank with internals, screw, or kneader process or apparatus. A typical CSTR reactor used in a conventional polycondensation process is a wipe or thin film reactor.

Reference will now be made in detail to the present preferred embodiment(s) of the invention, examples of which are illustrated in the accompanying drawings. Wherever possible, the same reference numbers are used throughout the drawings to refer to the same or like parts.

The present invention encompasses apparatuses and methods for converting reactants into a polyester. More specifically, in one embodiment, in a first step, the present invention reacts starting materials (also referred to as raw materials or reactants) into monomers (also referred to as polyester monomers) and then, in a second step, the present invention reacts the monomers into oligomers (also referred to as polyester oligomers or prepolymers) and then into the final polyester (also referred to as polymer or polyester polymer). If materials with acid end groups are fed to the first step, such as terephthalic acid or isothalic acid, then the first step is referred to as an esterification reaction or reactor. If the starting materials have methyl end groups, such as dimethyl terephthalate or dimethyl isothalate, then the first step or first reactor is an ester exchange step or reactor. For simplicity, throughout the specification and claims, esterification and ester exchange are used interchangeably and are typically referred to as esterification, but it is understood that esterification or ester exchange depends upon the starting materials. It should also be understood that the output from the esterification process can also contain oligomer in addition to the monomer. The polycondensation process can be one integral process or can be subdivided into two subparts, a prepolymer process and a finishing process. In the prepolymer process, the output comprises monomer, oligomer, and polymer, with oligomer being typically in the majority. In the finishing process, typically the output from the process comprises oligomer and polymer, with the majority of the output being polymer. In the esterification process, it is possible to have small quantities of polymer exit the process. Likewise, in the finishing process, it is possible to have small quantities of monomer exiting the process.

The second step is referred to as the polycondensation process or polycondensation reactor. In this embodiment, the inlet pressurized side of the first step or esterification reactor exits at about atmospheric pressure or above, and the output from that first step, which is fed into the second step, is substantially monomer. In the second step, the monomer is converted to oligomer, which can, if desired, be isolated at, for example, a first pressure separation device such as a seal leg, in the reactor. If not isolated, the oligomer is further converted to the polymer in the pipe reactor.

In an alternative embodiment, the inlet pressurized side of the first step exits under vacuum (in one embodiment essentially putting the prepolymer reactor on the top of the ester exchange or esterification reactor), and oligomer is the substantial product from the first step and is either isolated as a final product or feeds across to the second step in which the oligomer is reacted to form the polymer.

The invention contemplates many different arrangements for the different reactors. In one embodiment, the esterification reactor is a separate and distinct reactor from the polycondensation reactor. Monomer is produced in the esterification reactor and is then fed to the polycondensation reactor to produce polymer. In another embodiment, a prepolymer reactor is put on top of the esterification reactor forming either a separate or an integral unit, thereby producing oligomer from the combined esterification/ prepolymer reactor, which is then fed to the polycondensation reactor. As used herein, integral with reference to the combination of reactors is intended to mean combining two reactors together such that they are in direct fluid communication with each other and the reactors are essentially indistinguishable from each other and from one overall reactor system. In another embodiment, the polycondensation reactor forms an integral unit with the esterification reactor. Reactants are inputted in the esterification reactor and the final polyester polymer product is produced by the integral unit. In another embodiment, a prepolymer reactor is used in conjuction with an esterification reactor, either as two separate units or as an integral singular unit. The oligomer product from the prepolymer reactor is isolated as a final product. Additionally, the invention provides an esterification pipe reactor utilized to make monomer. In another aspect, the invention provides a polycondensation pipe reactor apparatus and process. When the esterification and prepolymer reactor are formed as an integral unit, typically there is a vent line between the reactors to vent off the water by-product; thus, the vent line serves as the crossover point from the esterification to the prepolymer reactor.

The process is applicable for any polyester. Such polyesters comprise at least one dicarboxylic acid residue and at least one glycol residue. More specifically suitable dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids comprise terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, dipheny-3,4'-dicarboxylic acid, 2,2,-dimethyl-1,3-propandiol, dicarboxylic acid, succinic acid, glutaric acid, adipic acid, azelaic acid, sebacic acid, mixtures thereof, and the like. The acid component can be fulfilled by the ester thereof, such as with dimethyl terephthalate.

Suitable diols comprise cycloaliphatic diols preferably having 6 to 20 carbon atoms or aliphatic diols preferably having 3 to 20 carbon atoms. Examples of such diols comprise ethylene glycol (EG), diethylene glycol, triethylene glycol, 1,4-cyclohexane-dimethanol, propane-1,3-diol, butane-1,4-diol, pentane-1,5-diol, hexane-1,6-diol, neopentylglycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4tetramethylcyclobutanediol, 2,2-bis-(3-hydroxyethoxyphenyl)-propane, 2,2-bis-(4-hydroxypropoxyphenyl)-propane, isosorbide, hydroquinone, BDS-(2,2-(sulfonylbis)4,1-phenyleneoxy)) bis(ethanol), mixtures thereof, and the like. Polyesters may be prepared from one or more of the above type diols.

Preferred comonomers comprise terephthalic acid, dimethyl terephthalate, isophthalic acid, dimethyl isophthalate, dimethyl-2,6-naphthalenedicarboxylate, 2,6-naphthalenedicarboxylic acid, ethylene glycol, diethylene glycol, 1,4-cyclohexane-dimethanol (CHDM), 1,4-butanediol, polytetramethyleneglyocl, trans-DMCD, trimellitic anhydride, dimethyl cyclohexane-1,4 dicarboxylate, dimethyl decalin-2,6 dicarboxylate, decalin dimethanol, decahydronaphthalane 2,6-dicarboxylate, 2,6-dihydroxymethyl-decahydronaphthalene, hydroquinone, hydroxybenzoic acid, mixtures thereof, and the like. Bifunctional (A-B type where the ends are not the same) comonomers, such as hydroxybenzoic acid may also be included.

A co-monomer, as in a conventional process, can be added anywhere along the process from the beginning of the esterification to the polycondensation process. Specifically, with reference to the instant invention, a co-monomer can be added at a location including, but not limited to, proximate the inlet to the esterification reactor, proximate the outlet of the esterification reactor, a point between the inlet and the outlet of the esterification reactor, anywhere along the recirculation loop, proximate the inlet to the prepolymer reactor, proximate the outlet to the prepolymer reactor, a point between the inlet and the outlet of the prepolymer reactor, proximate the inlet to the polycondensation reactor, and at a point between the inlet and the outlet of the polycondensation reactor.

It should also be understood that as used herein, the term polyester is intended to include polyester derivatives, including, but not limited to, polyetheresters, polyester amides and polyetherester amides. Therefore, for simplicity, throughout the specification and claims, the terms polyester, polyether ester, polyester amide and polyetheresteramide may be used interchangeably and are typically referred to as polyester, but it is understood that the particular polyester species is dependant on the starting materials, i.e., polyester precursor reactants and/or components.

The polyesters formed by the process of the present invention are polyester homopolymers and copolymers that are suitable for use in a wide variety of applications including packaging, film, fiber, sheet, coatings, adhesives, molded articles, and the like. Food packaging is a particularly preferred use for certain polyesters of the present invention. In one embodiment, the polyesters comprise a dicarboxylic acid component comprising terephthalic acid or isophthalic acid, preferably at least about 50 mole % terephthalic acid, and in some embodiments, preferably at least about 75 mole % terephthalic acid and a diol component comprising at least one diol selected from ethylene glycol, cyclohexanedimethanol, diethylene glycol, butanediol and mixtures thereof. The polyesters may further comprise comonomer residues in amounts up to about 50 mole percent of one or more different dicarboxylic acids and or up to about 50 mole percent of one or more diols on a 100 mole % dicarboxylic acid and a 100 mole % diol basis. In certain embodiments comonomer modification of the dicarboxylic acid component, the glycol component or each individually of up to about 25 mole % or up to about 15 mole % may be preferred. In one embodiment, dicarboxylic acid comonomers comprise aromatic dicarboxylic acids, esters of dicarboxylic acids, anhydrides of dicarboxylic esters, and mixtures thereof.

In one embodiment, the reactants comprise terephthalic acid and ethylene glycol. In another embodiment, the reactants comprise dimethyl terephthalate and ethylene glycol. In yet another embodiment, the reactants comprise terephthalic acid, ethylene glycol, and CHDM.

Preferred polyesters include, but are not limited to homopolymers and copolymers of polyethylene terephthalate (PET), PETG (PET modified with CHDM comonomer), PBT, fully aromatic or liquid crystalline polyesters, biodegradable polyesters, such as those comprising butanediol, terephthalic acid and adipic acid residues, poly(cyclohexane-dimethylene terephthalate) homopolymer and copolymers, homopolymer and copolymers of CHDM and cyclohexane dicarboxylic acid or dimethyl cyclohexanedicarboxylate, and mixtures thereof. In one embodiment the polyester is PET made by reacting PTA and EG. In another embodiment, the polyester is PETG made by reacting PTA, EG, and CHDM. In one embodiment, the reactants do not comprise an anhydride. In one embodiment, the polyester is not polycarbonate or PBT ("polybutylene terephthalate"), or polyesters made from phthalic anhydride or maleic anhydride.

The present pipe reactor process may also be used in esterification, polycondensation, or both, for a process wherein terephthalic acid is esterified, hydrogenated, and polymerized to form PET (or PETG if CHDM is also added), such as disclosed in U.S. application Ser. No. 60/228,695, filed Aug. 29, 2000, and U.S. application Ser. No. 09/812,581, filed Mar. 20, 2001, which are both incorporated herein by reference.

The polyesters of the present invention may also contain small amounts of a trifunctional or tetrafunctional comonomer such as trimellitic anhydride, trimethylolpropane, pyromellitic dianhydride, pentaerythritol, or other polyester forming polyacids or polyols generally known in the art. Crosslinking or branching agents may also be used. In addition, although not required, an additive(s) normally used in polyesters may be used if desired. Such an additive includes, but is not limited to one or more of a catalyst, colorant, toner, pigment, carbon black, glass fiber, filler, impact modifier, antioxidant, stabilizer, flame retardant, reheat aid, acetaldehyde reducing compound, oxygen scavenging compound, UV absorbing compound, barrier improving additive, such as platelet particles, black iron oxide, and the like.

When terephthalic acid is used as one of the reactants, typically purified terephthalic acid (PTA) is used as the reactant rather than unpurified terephthalic acid (TPA) or crude TPA (CTA), although TPA and/or CTA can be used in this invention.

The processes of the present invention are directed to melt polymerization, that is, the process of the present invention is in the melt phase, wherein the reactants are in a fluid state. This should be contrasted with solid polycondensation as used in certain polyester processes of the prior art. The pipe reactor process of the present invention is thus appropriate for a fluid process. The polyester polycondensation process of the present invention should also be distinguished from other polymer processes, such as, for example, emulsion basedpolymerization, which typically requires a second or even further solvent, whereas polyester condensation does not, and from olefin polymerization, which is not necessarily a two-step reaction as is the case in polycondensation.

The processes of the present invention can achieve completion or substantial completion of the esterification reaction at the outlet of the esterification or polycondensation process. More specifically, the process of the present reaction, in various aspects, can achieve at least 80% completion, at least 85% completion, at least 90% completion, at least 95% completion, at least 97.5% completion, at least 99% completion, at least 99.5% completion, at least 99.9% completion, wherein completion is a term commonly used in the art to mean 100 minus the mole percent of leftover acid end groups divided by non-acid end groups.

In addressing the present invention, the first step preferably occurs in a pipe reactor. It is also preferred that the second step, which is performed after the first step, occur in the same or a different, second pipe reactor. However, as one skilled in the art will appreciate, the esterification step can occur using conventional prior art processes and then the polycondensation step can occur in a pipe reactor of the present invention. Similarly, the esterification step can occur using a pipe reactor of the present invention and the polycondensation step can occur using a prior art process. According to the present invention, at least one of the first or second steps occurs in a pipe reactor.

Basic pipe reactor apparatuses as used herein are known in the art and are typically standard pipes used in place of conventional reactors. More generally, pipe reactors herein are typically an axially elongated, substantially cylindrically shaped apparatus, although shapes may vary, such as square or rectangular, if not detrimental to the purpose of the invention. In certain aspects herein, pipe reactors can simply be hollow or empty or substantially hollow or empty pipe or tube. Hollow or empty, as defined herein, refers to the pipe or tube having no additional devices or internal components, particularly no internal components for mixing, transporting, or heating the reactor or vent fluids, such as agitators, static mixer elements, protruberences for controlling the fluid flow profile or mixing, packing, scrapers, rotating discs, such as, for example, those used in a wipe film or thin film reactor, baffles, trays, down corners, screws, or heating or cooling coils, which are found in conventional reactors and in some pipe reactors. Hollow or empty as used herein does allow for the placement of flow measuring devices, such as orifices, or flow control devices, such as control valves or weirs, in the line. In one aspect of the invention, the pipe or tubes have a smooth interior surface. The pipe reactor of the present invention does not require surface area enhancement components in the interior of the pipe nor does it require a film forming enhancer as used in some of the pipe reactor designs of the prior art.

For the pipe reactors used in the first and/or second steps of the present invention, the criteria for choosing the attributes are usually known and are similar to the criteria generally considered when building a prior art, conventional reactor. For example, the designers may consider the criteria of the desired capacity, quality, agitation, heat transfer area, and disengagement. The designers may also consider information determined from the operation and design of conventional reactors, such as the working volume of the reactor, the heat transfer area, the surface area of the liquid, the vapor piping velocity, the reactor vapor velocity, the process flow rate into and out of the reactor, and the heat transfer media flow rate may also be considered. More specifically, the designers may determine the reactor volume from an existing reactor, a reactor design model, engineering calculations, or other sources of design criteria. The length, l, of each pipe diameter required for each zone of the reactor may be calculated using the reactor volume, $V_r$, and the formula below:

$$l = V_r/(\pi r^2), \text{ where r is the pipe radius.}$$

The surface area, A, required for each zone may be calculated as follows:

$$A = 2*l*SQRT(r^2-(r-h)^2),$$

where h is the height of the liquid in the pipe and wherein r is greater than h.

These calculations can be reiterated for each reaction zone, taking into consideration heat transfer area, vapor velocity (vapor flow in most standard reactors is vertical and in the pipe reactor will typically be horizontal), and process flow rate. In this way, the length for each pipe diameter can be determined. It should be appreciated that not all pipe diameters will meet the requirements of all reactor conditions. FIG. 3 contains an example of the calculations. Too small a pipe size may create foaming problems in that foam may not break whereas too big a pipe size may cause too great a pressure drop across the fluid height. The reactor is not constrained to these design criteria as other factors may lead to a non-optimal cost design, such as material availability or sub optimization of an area of the reactor. In certain aspects, the pipe size is from 2 inches to 24 inches, preferably 6 inches to 16 inches, more preferably 12 to 16 inches.

Reaction conditions (temperatures, pressures, flow rates, etc.) and materials charged to the reactor (reactants, coreactants, comonomers, additives, catalysts, etc.) can be those typically found in the prior art for the commensurate polyester reaction, but the process of this invention allows even wider operating conditions than used in the art. That is, the use of a pipe reactor in this present invention does not necessarily change the reaction conditions and materials charged to the reactor. However, reaction conditions can be different and, in fact, improved with the pipe reactor system of the present invention. In certain embodiments, pipe reactor conditions are improved over the prior art reactor conditions, allowing enhanced performance, such as higher purity product (e.g., lower DEG impurity) or improved color.

One skilled in the art can determine such parameters based on prior art methods of making polyesters as a starting point. In one aspect, the operating conditions in the prior art are a reactor temperature of 20–400° C., preferably above the melting point of the bulk of the fluid at any given point in the reactor train, pressure from full vacuum to 500 psig, a residence time up to about 8 hours, and a mole ratio of from 1.005:1 to 6.00:1 on a basis of the mole ratio of the glycol residue to dicarboxylic acid residue, where the acid residue can be based on the ester and the glycol residue can be based on a diol. These conditions or other prior art operating conditions can be modified and optimized for the pipe reactor design of this invention with mere routine skill.

In addition to this general overview, considerations and attributes of the specific esterification and polycondensation pipe reactors processes and apparatuses are discussed in more detail below as well as certain other inventions that are either related to or separate from the pipe reactor systems of the present invention.

The Esterification Step

With respect to the below discussion under this section "THE ESTERIFICATION STEP," including all subsections (Pressure Profile, Heating, etc.), unless specifically stated to the contrary, the processes and apparatuses of this invention discussed in this section below are equally applicable to, and can be used in, the polycondensation processes and apparatuses.

As noted above, in one embodiment the first step involves use of a pipe reactor to react the starting materials to form a monomer. In one embodiment shown in FIG. 2, the pipe reactor 10 has an inlet 12, an outlet 11, an exterior surface, and an interior surface. In one aspect, the interior surface of the pipe is circular, square or rectangular in cross section, preferably circular, so as to form an inner diameter.

For both the esterification and polycondensation pipe reactors, the pipe reactor is preferably formed of a material that is non-reactive with the materials flowing through the interior surface, including by way of example steel, iron, alloys, titanium, hastalloy, stainless, carbon steel, nickel, aluminum, copper, platinum, palladium, lithium, germanium, manganese, cobalt, zinc or a combination thereof. Other materials of construction include, but are not limited to, glass, ceramic, lined pipe, and plastics such as acrylonitrile-butadiene-styrene (ABS), polybutylene (PB), polyethylene (PE), poly vinyl chloride (PVC), chlorinated PVC (CPVC), polypropylene (PP), fiberglass, teflon, and a reinforced epoxy resin. Stainless steel, hastalloy and titanium are commonly used due to their properties, availabiliy and cost. For both ester exchange and polycondensation, a catalytic material may also be used for the pipe.

In use, the reactants typically are added into the pipe reactor proximal, or near, the inlet (i.e., closer to the inlet than the outlet) or adjacent to the inlet (right next to or at the inlet). As the reactants flow through the pipe reactor, the reactants react with each other to form the monomer within the pipe reactor so that the formed monomer exits from the outlet. However, not all of the reactants must react into the monomer while traversing from the inlet to the outlet (i.e., some of the reactants may exit the outlet without having reacted into monomer) and still fall within the scope of the present invention. Additionally some of the monomer may react to form oligomer and still fall within the scope of the present invention. The reactants added or injected proximal or adjacent to the inlet of the pipe reactor may be in the form of a liquid, gas, solid, or slurry, or other phase mixture.

It is easiest to add reactants as a liquid (e.g., EG and DMT) because the reactants may be independently pumped directly into the inlet of the pipe reactor or at another location upstream or downstream of the inlet. In one particular design, one reactant may be added via the inlet of the pipe reactor and another reactant added upstream of the inlet. In still another particular embodiment, one or more reactants may be added through the inlet and another reactant may be added at one or a plurality of locations along the length of the pipe reactor between the inlet and outlet.

When the reactants are fluids, a pump can be used that discharges the reactants at a pressure above atmospheric pressure, typically proximal to the inlet of the pipe reactor. More specifically, a pump can discharge the reactants at a pressure sufficient for the materials to traverse through the pipe reactor and exit out of the outlet, which involves overcoming frictional forces or losses, changes in potential energy (elevational head), and other forces that resist the flow of the materials through the pipe reactor. The pump can be any pump known in the art, nonlimiting examples of which include a centrifugal pump, including an in-line vertical centrifugal pump; positive displacement pump; power (piston); screw (double-end, single-end, timed, untimed); rotary (gear, multiple-rotary screw, circumferential piston, lore, rotary valve, or flexible member); jet (eductor single nozzle or multiple nozzle); or elbow pump. The reactants can be pumped separately or mixed beforehand and pumped together.

Fluid reactants are easily pumped, either alone or mixed together, but solid reactants are more problematic. As discussed in more detail below, the solid reactants can be added using a paste pump, a mix tank, a unique mix and feed system, a recirculation loop integrally formed with the paste tank, or a combination of these apparatuses and methods. Adequate mixing is needed to dissolve any solids present in the liquid, and to provide gas/liquid mixing to drive the esterification reaction. Preferably, the gas/liquid mixture is in a bubble or froth state in the esterification reactor.

Pressure Profile

In the preferred embodiment, the pressure of the reactants at the interior surface of the pipe reactor adjacent the inlet is higher, or greater, than the pressure of the monomers and/or reactants at the interior surface adjacent the outlet. To achieve this pressure differential, the inlet of the pipe reactor is preferably disposed elevationally below the outlet (as shown in FIG. 2) so that the pressure differential arises, in large part, from the hydrostatic pressure resulting from fluids contained within the interior surface of the pipe reactor. That is, hydrostatic pressure exists between the downstream and upstream positions so that as the fluid flows upwardly through the pipe reactor, the pressure decreases. The hydrostatic pressure is a function of liquid density (temperature and composition), void fraction (reactants added, temperature, reaction by-products created, amount of gas removed from the reactor), the height or elevational difference between two points in the pipe reactor, and the pressure drop due to flow in the pipe (flow rate, viscosity, pipe diameter).

The esterification pipe reactor can also take different shapes. For example, in one design (not shown), the pipe reactor is substantially linear between the inlet and outlet so that the pipe reactor is axially elongated. In another embodiment, the pipe reactor is substantively non-linear. In another embodiment, the pipe reactor has alternating linear and non-linear sections.

The pipe reactor can be essentially vertical, horizontal, or any angle in between. The pipe reactor orientation can form any angle with the vertical plane, from 0° (vertical, i.e. perpendicular to the ground or foundation) to 90° (horizontal or parallel to the horizon). In various aspects, the pipe reactor can be 0°, 10°, 20°, 45°, 60°, 75°, 85°, 89°, or 90° with respect to the vertical pane. The pipe reactor orientation angle with the vertical plane depends upon many conditions, particularly the product being made and the pressure profile desired. For example for PET production, if terephthalic acid is used, a horizontal orientation is preferred, whereas if a DMT process is used, a vertical orientation is preferred. For PETG, a vertical orientation is preferred.

In various embodiments, the esterification pipe reactor can have a vertical configuration. In various embodiments for such a vertical configuration, the inlet of the pipe reactor can be positioned at least 20, 50, 75, 80, 90, or 100 vertical feet below the outlet. In other embodiments the inlet can be positioned from 20 to 200, from 50 to 200, from 50 to 175, from 90 to 150, or from 100 to 140 vertical feet below the outlet.

Another equally viable design includes a pipe reactor that is non-linear between the inlet and outlet. One such design is shown in FIG. 2, in which the pipe reactor is serpentine in front plan view. Other profiles of the non-linear pipe reactor include, but are not limited to, designs that are twisting; winding; twine; coil; contort; wreathe (move in a curve); convoluted; distorted; meandering; tortuous; sinuous; and/or labyrinth.

In another design, the pipe reactor proceeds from inlet to outlet in a non-linear, horizontal run, and then proceeds vertically to a further level with another non-linear horizontal run, and this process can be repeated to any height (and width/length) desired. This creates a packed design with layered non-linear, horizontal runs.

In an alternative embodiment, the esterification (or polycondensation) reactor can be a series of up and down vertical rises. Specifically, the esterification reactor (or polycondensation) would be comparable to FIG. 2 but rotated 90°. That is, with reference to FIG. 16, the starting materials are pumped in at 12 and proceed vertically upward and then vertically downward in an alternating pattern. This design allows the feeds to come in under pressure, then go to low pressure, and then back to high pressure, alternating subsequently back and forth. The vapor could be removed at the low-pressure zone. The effluent exits at 11.

In these non-linear designs, the pipe reactor preferably includes a plurality of elbows disposed between the inlet and the outlet. The elbows commonly form angles of forty-five (45) or ninety (90) degrees, but other angles are also contemplated. Each elbow changes the direction of flow within the pipe reactor as the reactants and/or monomer traverses through the elbow. The direction of the flow may change relative to a stationary horizontal plane, such as the floor of the building, or relative to a stationary vertical plane, such as a wall of the building, or relative to both stationary horizontal and vertical planes. When the reactants and monomers flow through the elbows, more mixing advantageously occurs of the materials compared to a straight section of the pipe reactor.

It is also contemplated to design the pipe reactor to obtain a desired pressure profile. As one skilled in the art will appreciate, when the reactants and/or monomer are in a liquid form, the pressure of liquid is substantially constant when flowing along a portion of the pipe reactor that is horizontally oriented. That is, there is no hydrostatic pressure differential along a horizontal section of the pipe reactor, but frictional losses occur as the liquids flow downstream that may vary the pressure along that horizontal section of the pipe reactor. In contrast, the pressure of the fluid decreases at an increasing rate, as that portion of the pipe reactor is oriented more vertically flowing downstream.

Referring now to FIGS. 10 and 11, these engineering principles may be employed in embodiments of the present invention to create desired pressure profiles for the reactants and/or monomer flowing through the pipe reactor. Profiles 21–25 of FIG. 11 correspond to views 21–25 of FIG. 10. Changing the configuration of the pipe alters the pressure profile. FIGS. 10 and 11 are correct in principle, but in actuality, the pressure drop along the horizontal pipes will only decrease by the frictional pressure drop along the length of the pipe. Only the vertical dimension of the horizontal pipe will lead to noticeable lower pressure in the pipe reactor so that the primary pressure drop occurs in the upstanding or vertically-oriented sections. Accordingly, FIG. 11 charting the pressure versus length or time would, in reality, occur in surges, not in the monatomic fashion depicted. Given this understanding of the simplified diagrams, each configuration will be described. View 21 of FIG. 10 is a series of pipes equally spaced, which results in a linear pressure drop in the reactor assuming equal fluid density and void fraction. View 22 shows a pipe reactor with smaller pressure drops at the beginning and larger pressure drops in the upper four, widely spaced, reactor sections. The pipe reactor depicted in view 23 of FIG. 10 has large initial pressure drops, caused by the increased vertical sections and smaller pressure drops in the last four sections of the reactor. View 24 shows a pipe reactor having four zones with small pressure drop each and with a large pressure drop between each zone. View 25 design allows the reactor to drop the pressure in steps. As already noted, the pressure profiles for views 21 through 25 are shown graphically in FIG. 11 as profiles 21–25. It should be appreciated that the configurations described herein are illustrative only. Many other configurations can be designed based on the principles discussed herein.

In another embodiment, it is contemplated having the inlet at approximately the same elevational height as the outlet (i.e., the pipe reactor oriented substantially horizontally) so that the pressure at the inlet will be greater than that of the outlet based on frictional losses that occur as the materials flow along the interior surface of the pipe reactor. The pressure differential between the inlet and the outlet will not be as great as the embodiment having the inlet elevationally higher than the outlet. Although the least desirable design, it is also within the scope of the present invention to orient the reactor pipe so that the inlet is disposed elevationally above the outlet.

The pressure in the top of the esterification reactor could be under vacuum with the fluid traveling upward with the vacuum. In one aspect, before the vacuum section, a vent can be used to remove the bulk of the water. In this embodiment, the first part of the polycondensation reactor could be placed on the top of the esterification reactor. This would make the plant process smaller, with part of the polycondensation process/apparatus on the esterification side. In another embodiment, it would also eliminate the longest seal leg in the facility. Additionally, in another aspect, a heat exchanger can be used in the reactor line after the vent.

Heating

Heating the reactants increases the reaction rate to facilitate forming the monomer and polycondensation.

Accordingly, another optional feature of the present invention is to include a means for heating the reactants and/or monomers traversing through the pipe reactor. Moreover, heating the materials to boil along the interior surface of the pipe reactor increases the mixing by (1) creating a buoyancy differential between the gas/vapor formed by the boiling and the surrounding liquid (or solids) flowing along the pipe reactor and (2) breaking up the boundary layer created by frictional forces between the interior surface of the pipe reactor and the materials in contact with the interior surface. In various aspects, at least some of the fluids in the esterification process, the polycondensation process, or both the esterification and polycondensation processes are heated to boiling to provide efficient mixing. In other aspects, at least some of the fluids can be brought to boil by other means, such as, for example, by lowering the system pressure or adding a component having a higher vapor pressure than the fluids needing to be boiled. As one skilled in the art will appreciate, the highest heat transfer rate occurs for nucleate boiling (i.e., generation of individual bubbles or bubble columns), but other types of boiling are also contemplated.

The following chart provides the boiling point of exemplary components that the present invention may process. Other components than those listed below may, of course, be used:

| Component | Boiling Point Temp. (° C.) |
|---|---|
| Acetic Acid | 118.5 |
| Adipic Acid | 330 Decomposing |
| Isophthalic Acid (IPA) | Sublimes |
| Phosphoric Acid | 213 |
| Terephthalic Acid | 301.4 |
| Methanol | 64.5 |
| 1-Butanol | 117.8 |
| Isopropanol | 82.5 |
| Titanium Isopropoxide | 82.5 |
| Titanium Dioxide | 73000 |
| Trimellitic Anhydride | 390 |
| Zinc Acetate | 100 Loses water then sublimes |
| Antimony Oxide | 1100 |
| Cobaltous Acetate Tetrahydrate | 140 |
| Dimethyl 1.4 Cyclohexanedicarboxylate | 265 |
| Dimethyl Isophthalate | 282 |
| Dimethyl Terephthalate (DMT) | 288 |
| Butanediol | 230 |
| Cyclohexane Dimethanol (CHDM) | 284–288 |
| Diethylene Glycol (DEG) | 245 |
| Ethylene Glycol (EG) | 197 |
| Triethylene Glycol | 290 |

The heating means for the pipe reactor can take numerous forms. The pipe reactor may be heated by a variety of media through various surfaces. More preferably, the present invention includes heat transfer media ("HTM") that are in thermal communication with a portion of the exterior surface of the pipe reactor along at least a portion of the pipe reactor between its inlet and outlet. The heat transfer media can circumscribe the entire outer diameter of the exterior surface and extend substantially the full length of the pipe reactor. Heat can also be added by inserting heat exchangers or by adding reactants hot or in the vapor state. In one aspect, in a PET or PETG process, the ethylene glycol and/or CHDM can be added hot or in the vapor state. Alternatively, induction heating or microwave heating may be used.

A heat exchanger can be used in a reactant feed line to heat or vaporize a reactant. A heat exchanger can also be used intermediate the pipe reactor, wherein the pipe reactor is in different sections and each effluent from one section is fed through a heat exchanger to heat the reactants and/or monomeric units. This heat exchanger intermediate the pipe reactor system is especially applicable if unjacketed pipe for the pipe reactor is utilized. Heater exchangers can be the low cost component of the reactor train depending upon the installed cost of jacketed pipe vs. the installed cost of the heat exchangers. Typically, in the esterification and early polycondensation, the temperature of the fluid controls the residence time, so heat input can be the limiting design factor rather than the reaction kinetics. Therefore, to minimize volume and costs, rapid heating can enhance the process. Heat exchangers can be inserted at any location along the length of such as intermediate the inlet and outlet or proximate or adjacent the inlet or outlet to the esterification reactor(s), the polycondensation reactor(s) or the recirculation loop or between any of the reactors (between the esterification reactors, polycondensation reactors, or between an esterification and polycondensation reactor), adjacent or proximate the inlet or outlet of any of the esterification or polycondensation reactors, or proximate, adjacent, or within any seal leg. Preferably, a heat exchanger is located at the start of each reactor section, where the pressure changes, since the vaporization cools the fluid. Therefore, as described below, insertion of a heat exchanger into, proximate, or adjacent the seal leg can be advantageous. If non-jacketed type pipe is used in esterification, then a low cost option is to use a heat exchanger at the beginning of the esterification process, and also utilize additional heat exchangers along the length of the reactor to bring the temperature back up as the by-product vaporizes. In one aspect, the heat exchangers would be close together at the beginning of the esterification process and further apart later on, as the amount of by-product vaporized is greater at the beginning of the esterification.

One example of the heat transfer media comprises a plurality of electrical heating components wrapped about the exterior surface of the pipe reactor. It is also contemplated using a jacket pipe circumscribing the exterior surface, in which the jacket pipe has an inner surface larger than the exterior surface of the pipe reactor to form an annular space therebetween. The heat transfer media, including by way of example a liquid, vapor, steam, superheated water, compressed gases, condensing vapor gas, conveyed solids, electrical tracing, electrical heating components, or a combination thereof, are then located within the annular space. For use of a fluid heat transfer media (i.e., liquid, vapor, or steam), the annular space should be leak-tight in the lateral direction so that the fluid flows longitudinally between the inlet and outlet. More specifically, it is desired in this embodiment using fluid heat transfer media that the fluid flow within the annular space be in a direction counter to the direction of the material flowing through the pipe reactor (i.e., the heat transfer media flow from outlet to inlet since the reactants and monomer flow from inlet to outlet) although co-current HTM flow paths can also be used.

Based on the heat transfer media flow rate, the designers must ensure that the velocity of the heat transfer media in the annular space between the process pipe and the jacket pipe is of the appropriate velocity for good piping design. For the present application, a speed of from approximately four to about eighteen feet/second linear velocity is generally considered appropriate. If the velocity is too high, then the jacket pipe diameter must be increased.

It is also contemplated that the heat transfer media may also flow or be located within the inner pipe and the process fluid located in the annular space between the outer surface of the inner pipe and the interior of the exterior pipe. This design reduces the surface area of the process pipe and requires a larger external pipe, but may be beneficial for some heat transfer media, such as high-pressure media. More area can be added with HTM both on the inside and the outside of the process fluid, with the process fluid in the middle annular space.

If more heat transfer is desired in a section of the reactor, then the surface area to process volume ratio must be increased. This is accomplished by using smaller diameter process pipe. The smaller process pipe will increase the process linear velocity, but as long as the flow rate is not so high that it causes pipe erosion and is not in a disengaging section of the pipe reactor, this is acceptable. These higher surface area zones will affect the cost of the pipe reactor. If the process flow rate is too high, then multiple parallel pipes are used.

Degassing

While flowing from the inlet to the outlet, the reactants, monomers, oligomers, polymers, and by-products may form vapor or gases as result of chemical reactions, heating, or other reasons. The present invention also optionally includes a means for removing vapors from the pipe reactor intermediate to its inlet and outlet and/or at, proximate or adjacent to the outlet. This removal helps to drive the reaction to a favorable equilibrium and/or to control the phase flow to the desired regime. The removal locations can be, in certain aspects, at the end of one or more or all zones (a "zone" referring to the esterification zone and each polycondensation zone) and/or at one or more locations within each reactor zone.

With reference to FIG. 20A, eight different flow regimes of two-phase flow in horizontal pipes are shown. Dark areas represents liquid and light areas the gas. In bubble flow, bubbles of gas move along the upper part of the pipe at approximately the same velocity as the liquid. In plug flow, alternate plugs of liquid and gas move along the upper part of the pipe. In stratified flow, liquid flows along the bottom of the pipe and gas flows above, over a smooth liquid/gas interface. Wavy flow is similar to stratified flow except that the gas moves at a higher velocity and the interface is disturbed by the waves traveling in the direction of the flow. In slug flow, the roll wave is picked up by the more rapidly moving gas to form a slug, which passes through the pipe at a velocity greater than the average liquid rate. In annular flow, the liquid flows in a thin film around the inside wall of the pipe and the gas flows at a high velocity as a central core. The surface is neither symmetrical nor smooth, but rather is similar to roll waves superimposed on squalls, as noted for wavy flow. In dispersed or spray flow, most of the liquid is entrained as spray by the gas. The spray appears to be produced by the high-velocity gas ripping liquid off the crests of the roll waves. Froth flow is similar to bubble flow only with larger bubbles or void percentage. See generally, Robert S. Brodkey, "The Phenomena of Fluid Motions," Addison-Wesley Series in Chemical Engineering, pp. 457–459, 1967.

For the esterification process of this invention, froth or bubble flow in the pipe reactor is the optimum region to operate in, as it provides good mixing of the vapor and liquid for facilitating the reaction. For the polycondensation step of this invention, stratified flow in the pipe reactor is the optimum flow regime, as it provides good disengagement of the vapor by-product from the liquid product. Stratified flow is also the optimum flow for the vent off of the pipe reactor of this invention in either esterification or polycondensation. As seen in FIG. 20B, which is a Baker Plot of the vapor mass flow (By) versus the ratio of liquid over vapor mass flow (Bx), the various flow regimes of two-phase flow in horizontal pipes are shown. See generally, Baker Plots for two phase flow, e.g., in U.S. Pat. No. 6,111,064. As stated above, froth or bubble is optimum for the esterification process, whereas stratified is the optimum for the prepolymer and finishing steps of the polycondensation process. Slug and plug flow risk possible equipment damage, annular and disbursed provide too low a residence time, and wavy flow entrains process liquid into the gas stream, which causes fouling in the gas handling equipment.

In the early part of esterification, in certain embodiments, a solid can be present, which can create a three-phase flow. However, the optimum flow regimes described above pertain to the relationship of the liquid and the gas. The solid does not, in fact, impact the gas/liquid flow regime, but it should be noted that for clarity, if a solid is present, it may not be a true two-phase flow since a third (solid) phase may be present.

Movement between the fluid regimes is accomplished by changing plant capacity, increasing the recirculation rate, modifying the recirculation removal location in the process, venting off vapor, changing the pipe diameter, using parallel pipes, changing the physical parameters by means such as temperature, pressure, composition, adding a diluent or an inert component, or by other means.

With reference to FIG. 20B, for the esterification process, to move in the right-hand direction on the graph, the recirculation can be increased in an amount or ratio to achieve the froth or bubble state. To move upward on the graph, smaller diameter pipe is used. To move left, additional paths are used. For the polycondensation process, if the vapor velocity is too high, then additional parallel pipes can be added to decrease the vapor velocity, in order to achieve a stratified two-phase flow regime.

FIG. 24 shows one possible set of two-phase regimes for one embodiment of the invention for a process for making PET homopolymer. In this embodiment, the esterification reactor starts at point 400 in the froth or bubble regime and slowly moves towards point 401 as the process proceeds through the reactor. The velocity is lowered for disengagement of the two phases at point 402 in the stratified zone and then proceeds through the first pressure zone separator, for example, a seal leg, into the first stage of polycondensation at point 403. The process proceeds along the path to point 404 until the second pressure zone separator is reached moving the flow regime to point 405. The process proceeds along the path past point 406 to the last pressure zone separator. The last polycondensation zone is not shown as it is not on the scale for this diagram but has the same pattern as the first two zones.

Additionally, venting the gases from the system can control vapor flow and the ratio of liquid over vapor flow. Venting removes vapor. This moves the process down (less vapor flow) and to the right (higher ratio of liquid to gas). The embodiments below show some methods that may be used to move in any direction on the graph to change flow regimes.

Entrained gases can be vented from a pumped liquid by controlled reduction of the flow velocity of the fluid in a degassing enclosure coupled with controlled venting of collected gas from the degassing enclosure. More preferably, it has been found that gases entrained in a pumped fluid stream can be separated from the pumped liquid by incorporating a length of degas piping in the flow path of the fluid stream and releasing the separated gases through such a standpipe, or a flow-controlled vent. As used herein, the term "entrained" and like terms, refers to undissolved gas present in a fluid; for example, gas in a fluid in the form of bubbles, microbubbles, foam, froth or the like.

In one presently preferred embodiment, the vapor removing means, or degassing means, comprises a vent or venting mechanism incorporated into the pipe reactor. The venting mechanism is positioned so that either all or a portion of the reactants and monomer traversing within the interior surface of the pipe reactor also flow through the venting mechanism when flowing from the inlet to the outlet.

Referring now to FIGS. 7a–7f, the venting mechanism functions to slow the velocity of the reactants and/or monomer in the pipe reactor to an extent sufficient to permit entrained gas to separate from the fluid reactants and/or monomer. The venting mechanism preferably produces a laminar, stratified, non-circular, two-phase gas/liquid flow. The extent of velocity reduction in the venting mechanism to provide the desired two-phase (gas/liquid) flow can be determined by one of skill in the art using (1a) the size of the gas bubbles likely present and the viscosity of the fluid, or (1b) the physical properties of both the liquid and the gas, and (2) the anticipated flow rate through the pipe reactor. The internal dimensions of the venting mechanism are selected to provide a larger cross-sectional area open to fluid transport than the cross-sectional area of the pipe reactor adjacent the venting mechanism. Based on mass flow rate principles, since the inner diameter increases, the velocity for a constant flow rate decreases. With the slower velocity, the gases rise and come out of solution until the pressure of the released gases prevents additional gases from coming out of solution. Venting the released gases allows additional gases to come out of solution as the equilibrium originally existing between the gases in solution and out of solution is shifted.

For separation of entrained gases in the reactants and/or monomer disclosed in the present disclosure, for example, it is desirable that the venting mechanism reduces the flow rate of the fluids flowing therethrough to such that a froth or bubble two-phase flow regime is preferably achieved in the esterification process and preferably a stratified two-phase flow regime is achieved in the venting and polycondensation process. The residence time of the fluid within the venting mechanism is also controlled by appropriate selection of the length of the venting mechanism to allow sufficient time at the reduced velocity within the venting mechanism for adequate separation of entrained gas from the liquid. The appropriate residence time for a particular fluid flow may be determined by one of ordinary skill in the art either experimentally or empirically.

For best results, the venting mechanism is disposed or oriented substantially horizontally so that the vapors and gases, within the reactants and monomer flowing therethrough flow substantially horizontally and collect at the top area of the venting mechanism. The attributes of a desirable venting mechanism allows the gases coming out of solution to be trapped by any design capable of allowing the liquid to pass on the bottom but restricting the flow of the gas on the top.

Several designs that can be used to disengage the gas from the liquid reactants and monomer include, but are not limited to, those in FIGS. 7a–7f. Each embodiment in FIGS. 7a–7f has an inlet 31 to receive the fluid and gas/vapor mixture, a fluid outlet 32, a tee 36, and a gas/vapor outlet 33. The venting mechanism can comprise an eccentric flat-on-bottom reducer(s) 37 to slow the velocity of the fluid into the stratified regime and to minimize the entrainment of the liquid into the vapor.

The reducer allows for a certain amount of surface area so that the vapor velocity on the liquid surface is sufficiently slow so that the vapor does not drag liquid along with it when it releases and sufficient liquid path cross-section area so that the linear velocity is slow enough that the vapor bubbles disengage from the liquid by buoyancy differential that causes the two phases to separate. Reducers are preferred where there is no limitation on pipe diameter or in reactor capacity. If pipe diameters are limited and plant capacity is not limited, an alternative to a reducer can be providing pipes and parallel to provide a lower linear velocity and more surface area in a shorter path length.

The venting mechanism preferably has an effective inner diameter (or greater flow area) larger than the inner diameter of the pipe reactor. Velocity can also be reduced by using multiple parallel pipes as shown in FIG. 7f. In one aspect, the system of FIG. 7f does not need a reducer on the inlet. The configuration in FIGS. 7e and 7f can be further enhanced with a weir at 38 that is in the top half of the pipe (inverted weir) between the TEEs 36 and the elbow to the right of the TEEs.

As the gases and vapors come out of solution within the venting mechanism, they must be removed. To this end, the venting mechanism preferably further comprises an upstanding degas stand pipe coupled to the venting mechanism. The degas stand pipe has a receiving end in fluid communication with the venting mechanism and an opposed venting end positioned elevationally above the inlet end. Although a straight embodiment is contemplated, it is preferred that the degas stand pipe be non-linear between the receiving end and the venting end.

In one embodiment, the vent further comprises an upstanding degas stand pipe coupled to the vent, wherein the degas stand pipe has a receiving end in fluid communication with the vent and an opposed venting end disposed vertically above the inlet end; and wherein the degas stand pipe is non-linear extending in its lengthwise direction between the receiving end and the venting end thereof, and wherein the degas stand pipe is formed of three contiguous sections each in fluid communication with each other, a first section adjacent the receiving end and extending substantially vertically from the vent, a second section coupled to the first section and oriented at an angle relative to the first section in plan view, and a third section coupled to the second section and oriented at an angle relative to the second section in plan view so that the third section is oriented substantially horizontally. In one aspect, the vent is a first section vertical pipe coupled to a third section horizontal pipe with a second section pipe connecting the vertical and horizontal pipe at any angle other than 0 or 90 degrees, preferably at a 45 degree angle. In various aspects, substantially vertical, with respect to the first section, includes, the first section being oriented at an angle of from about 0 to about 60 degrees relative to the vertical plane, from about 0 to about 50 degrees relative to the vertical plane, from about 0 to about 45 degrees relative to the vertical plane, from about 0 to about 30 degrees relative to the vertical plane, from about 0 to about 15 degrees relative to the vertical plane, or about 0 degrees (vertical) to the vertical plane; the second section being oriented at an angle to the vertical plane of from about 5 to about 85 degrees, from about 15 to about 75 degrees, from about 30 to about 60 degrees, or about 45 degrees; and substantially horizontal, with respect to the third section, includes being oriented at an angle relative to the horizontal plane of plus or minus from about 45 to about 0 degrees, plus or minus from about 30 to about 0 degrees, plus or minus from about 15 to about 0 degrees, plus or minus from about 5 to about 0 degrees, or about 0 degrees. Plus or minus with respect to the third section is intended to mean that the first and second sections are typically placed at an angle with respect to the vertical such that the vapor or gas fluid flowing therethrough proceeds in an upwardly direction (with the liquid initially proceeding upwardly but then after full disengagement moving in a downwardly direction back to the process), whereas the third section can be oriented in an upward, horizontal, or downward orientation. In another aspect, the first section is oriented at from about a 0 to about a 60 degree angle relative to the vertical plane, the second section is oriented at from about a 5 to about an 85 degree angle relative to the vertical plane, and the third section is oriented at from about a 0 to about a 45 degree angle relative to the horizontal plane. In another aspect, the first section is oriented at 0 degrees relative to the vertical plane, the second section is oriented at 45 degrees relative to the vertical plane, and the third section is oriented at 0 degrees relative to the horizontal plane. Preferably, the first section is oriented at about a 45 degree angle relative to the second section, and the third section is oriented at about a 45 degree angle relative to the second section. Preferably, the third section is co-current to the process line that it is in fluid communication with, as shown in FIG. 7g, as would be shown if the device of FIG. 7g were to be placed or transposed directly over FIGS. 7a–7f where outlet 33 connects to inlet 34, or as shown in FIG. 8 (assuming that the element 137 is on the same plan view plane as TEE 36 or 139). However, the third section can be countercurrent, or even a point between being co-current and countercurrent. Countercurrent can provide for more efficient disengagement but presents equipment layout disadvantages. Thus, the degas standpipe creates a non-linear path from the first to the second section and then another non-linear path from the second section to the third section. In another aspect, the third section is positioned at a minus 45 degree angle with respect to the horizontal, creating a downward flow path in the third section, and for this aspect, preferably the third section is oriented at a 90 degree angle to the second section, which is preferably oriented at a 45 degree angle to the vertical plane. The vent is an extremely low cost configuration to perform a disengagement function, in that there are no moving parts in the basic pipe design of the vent, and the vent can be merely empty pipe.

As shown in FIG. 7g and FIG. 8, the preferred embodiment of the degas stand pipe is formed in three contiguous sections in fluid communication with each other: a first section adjacent the receiving end and extending substantially vertically from the venting mechanism; a second section coupled to the first section and oriented at about a forty-five degree angle relative to the first section in plan view; and a third section coupled to the second section and oriented at about a forty-five degree angle relative to the second section in plan view so that the third section is oriented substantially horizontally.

A common feature is that the standpipe is vertically oriented and the venting mechanism is horizontally oriented, which creates a non-linear path from inlet to outlet and thus allows the gas to escape without the liquid also flowing out of the standpipe. With reference to FIG. 7g or FIG. 8, which venting mechanism arrangement is also applicable to the esterification process, the pipe lengths 136 and 145 are adjusted until a straight path from component 144 (or inlet 34 in FIG. 7g) to component 137 is not possible. Thus, no straight path exists between inlet 34 and exit 35. This non-linearity causes all or most of the liquid droplets in the vapor to impinge on some surface of the vent piping. Thus, FIGS. 7a–7f show six different vapor disengagement arrangements, embodiments of FIGS. 7d, 7e, and 7f being most preferred as they have no low spots that would be detrimental in a draining operation. In each embodiment of FIGS. 7a–7f, the embodiment of FIG. 7g gas/vapor inlet 34 is placed in fluid communication with the outlet 33 of venting "tee" 36 of FIGS. 7a–7f, such that the vapor first proceeds through the vertical section of FIG. 7g, then through the diagonal section then through the horizontal section, and exists the outlet 35.

It is also desirable to include a flow control device within the degas standpipe to control the flow of fluids there through. The flow control device may be, for example, an orifice; throttle valve; control valve; hand valve; reduced pipe section; outlet pressure control; nozzle; and/or bubble through liquid for head.

The flow control device preferably allows approximately ninety percent of the vapor generated to this distance in the pipe reactor to pass while the remaining ten percent is retained with the liquid. This approximately ninety/ten percentage ratio ensures that liquid will not pass through the gas line and maintains the approximately ten percent of the gas for mixing in the pipe reactor. The amount of gas removed cannot approach one hundred percent as a maximum, since the liquid would flow into the standpipe along with the gases.

The venting end of the degas stand pipe is typically in fluid communication with a distillation system to which the vapors flow or are evacuated. It is also possible to vent the vapors to ambient. The pressure at the venting end of the degas stand pipe can be controlled when the venting end is in communication with the distillation system, whereas when venting to ambient, the venting end will be at atmospheric pressure.

One skilled in the art will appreciate that the efficiency of vapor removal can be improved by increasing the inner diameter of the pipe reactor adjacent and prior to the venting mechanism to maximize the surface area of the liquid and minimize the vapor velocity at the surface half of the pipe diameter. If the velocity in the pipe in the vicinity of disengagement is too high, the pipe diameter may be expanded as shown in, for example, FIG. 7d. In some embodiments, the expansion sections preferably have an eccentric flat-on-bottom reducer to keep pockets from forming in the reactor. These pockets reduce the reaction area, thereby reducing capacity, and in cannot be readily drained during the process. The configurations shown in FIGS. 7d and 7f do not trap liquid and allows complete draining on plant shutdowns. The venting mechanism can be the same size; smaller or larger in diameter than the line it is attached to. In one aspect, the venting pipe is at least one standard pipe size larger than the pipe being vented, in another aspect, is double the size of the pipe being vented. Because the typical optimum pipe size for the pipe reactor design herein is normally the largest pipe size available, and therefore it is not practical to have a venting pipe being larger than the pipe being vented, multiple venting pipes to lower the velocity can be used as an alternative design as shown in FIG. 7f.

If additional surface area is required or desired, additional pipes may be installed at the same elevation, in which the additional pipes run parallel to each other and all include a venting mechanism (see, for example, FIG. 7f). This series of parallel pipes and venting mechanisms provide additional area for the disengagement of gas from the reactants and monomer.

One skilled in the art will appreciate that no gas removal is required to maintain the reaction within the pipe reactors, but removal of gas enhances the reaction rate by removing a limiting species. The gas removal also reduces the void fraction making the final reactor volume smaller.

One skilled in the art will further appreciate that multiple venting mechanisms can be used in the pipe reactor between its inlet and outlet. For example, in one embodiment, the esterification or polycondensation reactor has at least two sections of a first section and a second section, and wherein the pressure is reduced in the polycondensation reactor, the reducing step comprising at least two degassing mechanisms incorporated into the polycondensation reactor so that the polycondensation fluids traversing within its inside surface also flow sequentially by the two respective degassing mechanisms when flowing from the first end to the second end of the polycondensation reactor, and wherein the two degassing mechanisms are located respectively at the first section and the second section of the polycondensation reactor. In one aspect, the first and second sections of the esterification or polycondensation reactor are maintained at different pressures from each other. In another embodiment, the esterification or polycondensation pipe reactor includes a top section, a middle section, and a bottom section, and each of the three sections includes at least one venting mechanism. In a particular aspect, the polycondensation reactor includes a top section, a middle section, and a bottom section, and wherein the pressure is reduced in the polycondensation reactor, the reducing step comprising at least three degassing mechanisms incorporated into the polycondensation reactor so that the polycondensation fluids traversing within its inside surface also flow sequentially by the three respective degassing mechanisms when flowing from the first end to the second end of the polycondensation reactor, and wherein the three degassing mechanisms are located respectively at the top section, the middle section, and the bottom section of the polycondensation reactor. The top, the middle, and the bottom sections of the polycondensation reactor can be maintained at different pressures from each other. Another design consideration is, as noted above, including a plurality of elbows in the pipe reactor, which can assist in removing the vapors from the reactants and monomer. More specifically, the pipe reactor can include a first elbow disposed upstream of the venting mechanism and a second elbow disposed downstream of the venting mechanism.

Addition of Reactants into the Pipe Reactor

The addition of reactants was addressed above in reference to adding fluid reactants into the pipe reactor using a pump. The present section discusses alternative methods of adding the reactants into the pipe reactor, including using a paste tank, a mixing tank, an alternative feed system, and a recirculation loop.

One skilled in the art will appreciate that for each method the reactants may be added as discussed below, the reactants may be at the standard transfer conditions or, alternatively and preferably, the reactants may be preheated before entering the reactor so that a cold, poor mixing zone does not occur. As one skilled in the art will also appreciate, adding cold reactants at locations upstream or downstream from the inlet into the pipe reactor may be beneficial or necessary.

In some embodiments, external reactant lines for addition to the pipe reactor are preferably fed from the top down into the reactor, in which the entry location can be any location described herein or chosen by one skilled in the art. This reactant line should be jacketed at a temperature exceeding the melting point of the reactor contents at the location and the reactant feed point. Such a design keeps the reactant line from plugging when flow is stopped and (1) the control valve does not seal and (2) the check valve does not completely close, both of which are common in prior art polyester plants.

Pumping Fluid Reactants

As discussed more thoroughly above, it is easiest to add reactants as a liquid (i.e., EG and DMT) because the reactants may be pumped directly into the inlet of the pipe reactor or at another location upstream of the inlet. The pump(s) discharge the reactants above atmospheric pressure proximal to the inlet of the pipe reactor. The reactants can be either pumped separately or mixed beforehand and then pumped together.

Injection of Solid Materials Using a Paste Tank

The main goal of the esterification reactor is to completely react or convert the acids in the reactor to monomers and oligomers. To maintain this goal, solid acids, such as terephthalic acid, must be kept in the reactor until it dissolves. Paste tanks are frequently used to aid the mixing and blending, and U.S. Pat. No. 3,644,483 discloses the use of such a paste addition. If a paste tank is desired, the paste of any solid can be fed into the inlet of the pipe reactor or at any location along the path of the pipe reactor with or without the recirculation loop, which is described below.

Mix and Feed Tank System

Referring to FIG. 15A, the mix tank 41 is filled with the liquid to be added. Suitable liquids will dissolve or slurry with the selected solid. Suitable liquids include EG, methanol, CHDM and the like. Ethylene glycol will be used as an example in this section. The EG is either heated or cooled to the appropriate temperature, depending on the additive and the EG addition temperature, which is a function of ambient conditions and preconditioning. The heat exchanger 46, mix tank jacket, or internal coils, etc. is used to heat and cool the mix as it is being recirculated with pump 43 (not required when a mix tank jacket or internal coils are used, but can be used to enhance heat and mass transfer) using temperature controller 45. The heat exchanger is typically supplied with steam 47 and water 48, but any appropriate heating and cooling media or mechanisms can be used. The additive is added with agitator 44, pump 43 or both operating to suspend the solids until they are dissolved into the EG. The level in the tank 42 is monitored to control the addition of EG and to tell when the tank is empty for the next mix. Mix is pumped from the mix tank 41 to the feed tank 51 using pump 43 and going through a 3-way valve 60 or a pair of 2-way control valves (not shown).

The feed tank 51 level 49 is controlled by adding mix from mix tank 41. When mix tank 41 is empty, the next mix is made while the residual volume in feed tank 51 continues to feed the process. Pumps 52 and 53 supply a feed header 59 to supply mix to the feed systems 57 and 58 that control the additive flow into the process. The feed tank temperature is controlled with temperature controller 54 using steam 55 and water 56 or any appropriate temperature control media or mechanism. Agitator 50 is used to maintain a uniform mix in the feed tank.

Pumps 52 and 53 may be installed to directly feed the polymer line without using a header 59. At least one pump is required per line with spares as appropriate.

An alternative system works as follows as shown in FIG. 15B. EG is added to unjacketed pipe 72, which acts as the tank in this system. The pipe 72 is located vertically in the plant, in an unused space or attached to an outside wall. The pipe 72 may have horizontal components to facilitate installation or enhancements to the volume, but the installation must not have traps for the solid being dissolved. After the appropriate amount of EG is added to pipe 72 as monitored by level 75, the circulating pump 74 is activated. The mix system temperature is controlled with temperature controller 77 with steam 78 and water 76 or any appropriate temperature control media or mechanism and in this case uses a jacketed pipe 73. The additive is added and pump 74 circulation continues to suspend the solids in pipe 73 until the solids are dissolved. When the solids are dissolved, valve 81 is switched to direct the flow to feed tank 82.

Feed tank 82 should have the appropriate volume to allow a mix to be made and dumped and a second mix to be made in case the first mix is in error. In one aspect, the inlet to tank 82 is just above the weld line of the bottom head. The overflow of feed tank 82 is preferably at a distance of 95% of the length of the tank between the tank head weld lines. The mix from pump 74 is directed through valve 81 into feed tank 82 and overflows tank 82 back into pipe 72 of the mix system via pipe 71. The flow of the mix via pump 74 through both the mix system and the feed tank provides mixing and temperature control for both systems eliminating the need for temperature control, level control, and mixing (agitation) in tank 82. Mix is added to the plant through header 59 and systems 57 and 58. In one aspect, no pumps are required since the tank 82 is strategically located at an elevation that provides head pressure to the additive systems. As mix is consumed through stations 57 and 58 (two station are shown, but 1 to a large number could be used), the level in pipe 72 will drop. When the level in pipe 72 is so low that pump 74 starts to cavitate, valve 60 is switched directing flow from pipe 73 back to pipe 72 without going through tank 82. During this time, the level in tank 82 will start to decline. A new mix will be made in the mix system starting with adding EG to pipe 72 as described above. The new mix is made and diverted through valve 60 into tank 82 before tank 82 is emptied.

The pumps 74 for the mix tanks are located on a lower floor of the building. The mix tank pipe is positioned on the outside wall (or inside if space allows) to the roof, where the feed tanks 82 are located. The pipe 73 leaving the circulating pump 74 may be jacketed for heating or cooling. The return pipe to pipe 72 may also be jacketed where necessary or desirable. The top of the mix tank pipe 73 has a three-way valve 60 leading to the feed tank 82. The feed tank 82 has an overflow line 71 back to the mix tank 72. The feed tank 82 has enough residence time between the overflow valve and the bottom of the feed tank to feed the plant, while the next mix batch is being made. Accordingly, and while the next batch is being made, the three-way valve 60 is switched so that the fluid does not flow through the feed tank 82. This configuration eliminates all agitators and the level control in the feed tank 82. As the feed tanks are located on the roof, the additive flow pressure is derived from the elevation difference. Flow is controlled via a flow meter and a control valve in stations 57 and 58. This configuration also reduces space required in the facility.

For a typical system consuming 100 lbs/hr through each of 2 feed stations, the pipe 72 can be 14-inch schedule 10 pipe at a length of 72 feet. The pump can be 50 gallons per minute and pipe 72 can be 3 or 4 inches in diameter. Tank 82 in this case would hold 75 ft$^3$ and have approximate dimensions of 3.5 feet in diameter and height.

The described fluid mixing and distribution system of the invention thus includes a first elongate and vertically disposed fluid storage vessel; a second fluid storage and dispensing vessel in fluid communication with the first vessel, the second vessel being disposed at a greater vertical elevation than the first vessel; a circulating pump in fluid communication with the first vessel and the second vessel, the circulating pump being constructed and arranged to pass a fluid flow through the system and to circulate the fluid from the first vessel into the second vessel and from the first vessel to the first vessel; and a control valve in fluid communication with the circulating pump, the first vessel and the second vessel, respectively. The control valve is constructed and arranged to selectively direct the fluid flow from the first vessel into the second vessel, and from the first vessel into the first vessel. The second vessel is in fluid communication with the plant process distribution system. A static pressure head formed by the fluid held within the second vessel is used to pass the fluid from the second vessel to the plant process distribution system.

Accordingly, an aspect of the invention is that the first vessel further comprises a fluid level monitor, the fluid level monitor being constructed and arranged to activate the control valve upon detecting a predetermined fluid level within the first vessel. In a further aspect, both of or either one of the vessels is insulated. In an additional aspect, the first vessel is temperature controlled, the fluid flow from the first vessel being used to control the temperature of the second vessel. The temperature controller further comprises a means for selectively adding steam and water to the fluid within the first vessel to raise and lower the temperature thereof, as desired. In another aspect, the second vessel further comprises a fluid inlet in fluid communication with the control valve such that the fluids are passed through the inlet and into the second vessel, and a fluid outlet spaced vertically above the inlet and in fluid communication with the first vessel such that any excess fluids held in the second vessel overflow therefrom into the first vessel. In yet another aspect, the fluid flow through the system is directed by the control valve from the first vessel back into the first vessel until such time as the fluid within the first vessel has been mixed to a predetermined standard, and where the mixed fluid flow is selectively directed by the control valve from the first vessel into the second vessel.

An alternate embodiment of the system comprises a first fluid storage vessel; a second fluid mixing and storage vessel; a circulating pump in fluid communication with the first vessel and the second vessel, the circulating pump being constructed and arranged to circulate the fluid through the system and from the first vessel into the second vessel; the second vessel being disposed at a greater vertical elevation than both of the first vessel and the plant process distribution system; and a control valve in fluid communication with the circulating pump, the first vessel and the second vessel, respectively, the control valve being constructed and arranged to selectively direct the fluid flow from the first vessel back into the first vessel and from the first vessel into the second vessel. The second vessel is in fluid communication with the plant process distribution system, and a static pressure head formed by the fluid held within the second vessel is used to pass the fluid from the second vessel to the plant process distribution system.

The method of mixing and distribution a fluid within the fluid mixing and distribution system includes placing at least one fluid into a first elongate and vertically disposed fluid storage vessel; passing the fluid from the first vessel into a second elongate and vertically disposed fluid mixing and storage vessel, the second fluid vessel being disposed at a greater vertical elevation than both of the first vessel and the plant process distribution system, with a circulating pump in fluid communication with the first vessel and the second vessel, the circulating pump being constructed and arranged to pass the fluid through the system; using a control valve in fluid communication with the circulating pump, the first vessel and the second vessel to selectively direct the fluid from the first vessel to either of the first vessel and the second vessel; and selectively passing the fluid from the second vessel to the plant process distribution system, the second vessel creating a static pressure head used to pass the fluid stored therein to the plant process distribution system.

Additional aspects of the method include adding at least one solid or a second liquid to the at least one fluid within the first vessel and mixing the combination therein; circulating the fluid through the first vessel until the materials therein are mixed with one another; passing the fluid from the first vessel into the second vessel once the materials therein have been mixed with one another; controlling the temperature of the fluid within the first vessel; controlling the temperature of the fluid within the first vessel by selectively adding steam and water to raise and lower the temperature thereof, as desired; measuring the fluid level within the first vessel with a fluid level monitor; the fluid level monitor activating the control valve upon detecting a predetermined fluid level within the first vessel; passing any overflow fluid from the second vessel back into the first vessel.

Injection of Reactants Using Recirculation

The present invention also optionally includes a means for recirculating a portion of the reactants and monomer flowing though the pipe reactor. As noted above, the acid paste mix tank or the mix tank can be replaced with a recirculation or recycle loop on the ester exchange pipe reactor.

In the presently preferred embodiment, the recirculating means comprises a recirculation loop having an influent and an effluent. The influent is in fluid communication with the pipe reactor at any point along the esterification or polycondensation process, including, but not limited to, proximal the esterification reactor inlet, proximal the outlet of the esterification reactor, a point between the inlet and the outlet of the esterification reactor, proximal the inlet to the prepolymer reactor, proximal the outlet to the prepolymer reactor, a point between the inlet and the outlet of the pre-polymer reactor, proximal the inlet or outlet to the polycondensation reactor, and at a point between the inlet and the outlet of the polycondensation reactor, and the effluent is independently in fluid communication with the pipe reactor at any point along the esterification or polycondensation process, including but not limited to, proximal the esterification reactor inlet, proximal the outlet of the esterification reactor, a point between the inlet and outlet of the esterification reactor, proximal the inlet to the pre-polymer reactor, proximal the outlet to the pre-polymer reactor, a point between the inlet and the outlet of the pre-polymer reactor, proximal the inlet or outlet to the polycondensation reactor, and at a point between the inlet and outlet of the polycondensation reactor. In one aspect, the effluent is in fluid communication with the esterification pipe reactor proximal or adjacent its inlet, proximal or adjacent its outlet, or at a point between the inlet and the outlet of the esterification reactor. In one aspect, the effluent from the recirculation is directed to the esterification reactor proximate the inlet of the esterification reactor, in another aspect, the effluent is in fluid communication with the reactor adjacent the inlet thereof, in another aspect, the effluent is in fluid communication with the reactor between the inlet and outlet thereof, in another aspect, the effluent from the recirculation is directed to the esterification reactor upstream of the inlet of the esterification reactor, in another aspect, the influent is in fluid communication with the esterification reactor between the inlet and outlet thereof, in another aspect, the influent is in fluid communication with the esterification reactor proximate the outlet thereof, in another aspect, the influent is in fluid communication with a second reactor, wherein the second reactor is downstream of the esterification reactor, in another aspect, the influent to the recirculation is in fluid communication with the polycondensation reactor, in another aspect, the influent to the recirculation is in fluid communication with the polycondensation reactor proximate the outlet thereof, in another aspect, the recirculating step is performed using a recirculation loop having an influent and an effluent, the effluent being in fluid communication with the pipe reactor proximal the inlet, wherein the fluids flowing through the recirculation loop are each recirculation fluids, in another aspect, the influent being in fluid communication with the pipe reactor between the inlet and outlet thereof or proximal the outlet thereof. In this discussion, the reactants and monomer and any other fluid, such as oligomer and polymer flowing through the recirculation loop are referred to as the "recirculation fluids."

As stated in another embodiment, the monomer can be provided to the recirculation loop from the polycondensation reactor, which is discussed below. Thus, in this embodiment, the infeed to the recirculation loop is not from (or not solely from) the esterification pipe reactor, to which the effluent of the recirculation loop discharges.

Figure 13A:
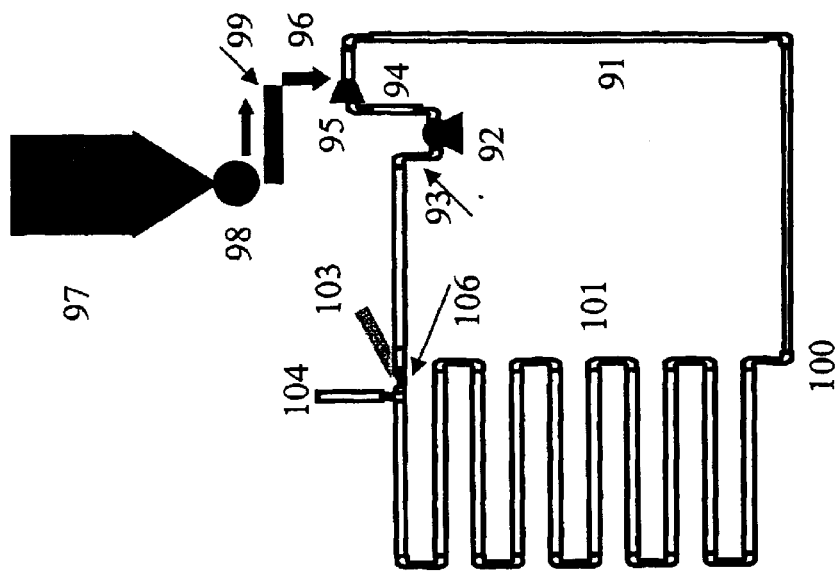

In certain embodiments of the invention, which are shown in FIGS. 13a and 13b, the recirculation loop 91 includes a recirculation pump 92 located intermediate its influent 93 and effluent 94 for increasing pressure of the recirculation fluids flowing therethrough. The recirculation pump 92 is preferably an in-line centrifugal pump that is located elevationally below the influent to obtain proper net positive suction head ("NPSH"). This is because the recirculation fluids, as discussed in more detail below regarding the vapor removing means, are at or close to atmospheric pressure and the solution boiling point. Other pumps may alternatively be used, but a centrifugal pump is desired based on the pumping characteristics.

Once the recirculation fluids pass through the influent and the recirculation pump to increase the pressure, it may be desirable to decrease the pressure of the recirculation fluids, at least temporarily, at a location downstream from the recirculation pump. The advantage of decreasing the pressure is so that other materials, such as one or more reactants, can be drawn into the recirculation loop. The pressure is preferably decreased using a pressure decreasing device, such as an eductor 95 through which at least a portion of the recirculation fluids flow. The eductor pulls a slight vacuum, or sub-atmospheric pressure, at its throat. One skilled in the art will also appreciate that the eductor 95 can be used interchangeably with a siphon; exhauster; venturi nozzle; jet; and/or injector or other like pressure reducing devices.

To feed or supply the reactants into the recirculation loop, a feeding conduit 96 is used that has a discharge end in fluid communication with the recirculation line adjacent the eductor. The reactants to be fed are drawn into the recirculation line from the decreased pressure of the recirculation fluids developed by the eductor. The feeding conduit also includes a receiving end, which is opposed to the discharge end. The vacuum on the eductor throat keeps vapor from lofting up into the solids being moved into the process line. The vapor will condense on the solids and the mixture will be very sticky and plug the system. The eductor expansion zone has intense mixing and separates the reactant, such as PTA, so that it does not lump in the esterification piping. The solid reactant may drag gas into the reactor with it. This gas can be removed by another vapor disengagement system after the eductor. Alternately, a liquid feed to the reactor system can be fed into the solid feed hopper. The liquid will displace the gas and then the inerts will not enter the eductor.

A feeding system is used to meter and to feed selectively the solid reactants or other components, such as modifiers, catalysts, etc. into the recirculation loop. One embodiment of a feed system is shown in FIGS. 13a and 13b. The first component of the feeding system is a solid reactant storage device 97, such as a silo, dust collector, or bag house used for storing the solid reactant to be fed into the recirculation loop. Liquid can be added to the solid reactor and storage device to reduce or eliminate the gas entrained with the solids. If a dust collector is used, then a shipping unit on scales can meter in solids by weight and the shipping container acts as the inventory device. Additionally, the silo can act as the weight system and short term inventory. If solid raw material is conveyed from offsite, then no convey system is required. A solid metering device 98, such as a rotary air lock, a piston and valve (hopper), double valve, bucket conveyor, blow tank, or the like, is located at the bottom of the solid reactant storage device 97 for receiving the reactants from the solid reactant storage device 97. The next component of the feeding system is a loss in weight feeder (or volumetric feeder) 99 that is in communication with the solid metering device 98, and also in communication with the receiving end of the feeding conduit 96 and intermediate 96 and 98. Thus, the reactants are fed into the recirculation loop from the solid reactant storage device 97, to the solid metering device 98, into the loss in weight feeder 99, and then through the feeding conduit 96 to be drawn into the recirculation loop adjacent or directly into the eductor 95. The loss in weight feeder 99 can also be located at the solid reactant storage device 97 or at a feed tank (not shown) located upstream of 97 and which feeds 97. It will also be appreciated that the addition of solid chemical components adjacent to a pressure decreasing device, such as an eductor, enables addition of solid chemical components directly into any reaction fluid found within a given chemical manufacturing process. For example, in those embodiments utilizing an eductor as the means for decreasing the pressure of the recirculation fluids, the vacuum on the eductor throat will keep vapors from lofting up into the solids that are being introduced into the process line. Prior to the instant invention, vapors would condense on the solids and the mixture would become very tacky, thus resulting in the clogging of the entire system. However, in accordance with the present invention, the eductor expansion or divergence zone provides very intense mixing and maintains sufficient separation of the solid component, such as terephthalic acid, so that it does not lump in the various reactor zones. To this end, one of ordinary skill in the art will appreciate that for best results, it is preferred to feed the solid component directly into the pressure decreasing device, such as an eductor, at any point within the divergence or expansion zone of the pressure decreasing device.

The feeding system can feed more than one solid reactant. Also, a plurality of feeding systems can operate in parallel or series. In a specific embodiment, the polymers can be made of multiple solids and these can be fed individually each to its own pressure reducing device in series or in parallel, or all of the polymer solids can be metered into one feed hopper into one pressure reducing device. The solid polymer could also be metered together for entering the solid reactor to device 97. This system can thus eliminate the need for a compressor and convey system due to gravity flow.

In one aspect, the solid reactant storage device can be on weigh cells to perform the function of the loss in weight feeder. Also, instead of using weigh cells as the loss of weight feeder, a belt feed, hopper weight scale, volumetric screw, mass flow hopper, coriolis flow meter, hopper or feed bin weight loss, or the like can be used.

When the reactants added into the recirculating loop flow to the effluent of the recirculation loop, the reactants and the other recirculation fluids re-enter the pipe reactor 101 adjacent or proximal the inlet 100. Thus, this process of adding the reactants in the recirculation loop so that the reactants start near the inlet and traverse toward the outlet perform the function of adding at least one type of reactant into the inlet of the pipe reactor, which is one of the initial steps in the process of the present invention. It is advantageous to feed a solid reactant into the recirculation loop via the feeding system so that the solid reactant is dissolved by the recirculation fluids, especially the monomer or oligomer, before flowing to the effluent of the recirculation loop.

It is also contemplated adding additional fluid reactants into the recirculation loop. The fluid reactants may be added to assist the solid reactants in dissolving in the recirculation fluids before reaching the effluent of the recirculation loop, or as a convenience so that the additional reactant does not need to be added separately at the inlet of the pipe reactor.

The fluid reactants are preferably added into the recirculation loop upstream of the eductor (before the addition point of the solid reactants), although the fluid reactants may likewise be added downstream of the eductor. It is contemplated adding the fluid reactant into the recirculation loop through the recirculation pump 92 seal. Reactants can also be added upstream of the recirculation pump 92. When the solid reactants are added through the feed system and the fluid reactants are also added into the recirculation loop, these processes result in adding at least two types of reactants into the pipe reactor proximal its inlet into which the effluent of the recirculation loop feeds.

The dissolution of the solid reactant material can be enhanced by increasing the temperature and by changing the ratio of the polyester monomer to solid reactant in the recirculation system, changing the feed mole ratio, and/or changing the pressure of the system.

Taking a specific example, one type of reactant fed into the recirculation loop via the feeding system can be PTA, which is a solid at room temperature. The recirculation design avoids use of a paste tank and inherent problems therewith. The fluid reactant can be, for example, ethylene glycol. Thus, if EG and PTA are the only reactants to be added to form the monomer, then the effluent can feed directly into the inlet of the pipe reactor as the only source of reactants added to the pipe reactor. Of course, variations of this design are contemplated, such as pumping more of the EG reactant into the inlet of the pipe reactor, in addition to the EG and PTA added proximal to the inlet of the pipe reactor from the recirculation loop. In a separate aspect, the diol, such as EG, can be fed through the recirculation line before or after the recirculation loop pump or before or after the PTA feed line to the recirculation line, or upstream of but adjacent to the pressure reducing device along with the PTA feed.

In FIG. 13a, one embodiment is shown where the effluent from the end of the esterification process is teed off 106 and one portion of the effluent is sent to the recirculation loop. In a separate embodiment, as shown in FIG. 13b, the tee 106 is intermediate the complete esterification process pipe reactors 101 and 102, so that the influent for the recirculation loop is not from the end of the esterification process, but rather comes from an intermediate point in the esterification process. In FIGS. 13a and 13b, the final effluent from the esterification process is at line 103 (after vapor removal in line 104).

In another embodiment, the effluent of the recirculation loop is located downstream of the inlet of the pipe reactor. This embodiment is preferable when the monomer that enters the influent of the recirculation loop or the slurry formed as a result of the addition at the feeding station requires a shorter residence time than would occur if the effluent fed directly into the inlet of the pipe reactor.

In various embodiments, the influent to the recirculation loop is from either the esterification process or the polycondensation process. Specifically, in various aspects, the influent to the recirculation loop can be from a point intermediate the esterification reactor (as shown in FIG. 13b), the end of the esterification reactor (as shown in FIG. 13a), the product from the outlet of the prepolymer reactor, the product from the outlet of the finisher reactor, or any point from the beginning of the esterification process to the final product from the outlet of the polycondensation process. Thus, the recirculation fluids comprise in various aspects the reactants, the polyester monomer, the polyester oligomer, and/or the polyester polymer, depending upon where the influent from the recirculation loop originates. The recirculation system is not limited to the use of one recirculation loop, but alternatively comprises two or more recirculation loops configured in series, parallel, or a combination thereof.

It is also contemplated for the recirculation loop that it includes other features discussed above for the pipe reactor, such as a heating means and a vapor removing means for the recirculation loop, which may be the same components and apparatuses discussed above and encompassing the same features and embodiments. If monomer is removed from adjacent the outlet of the pipe reactor a shown in FIG. 13a, then the vapor removing means does not have to be added to the recirculation loop. Otherwise, the liquid elevation is raised or lowered until the pressure is near atmospheric and the vapor is removed to the distillation system.

Addressing the vapor removing means specifically, in one embodiment of the recirculation loop, the design is similar to that described above for the pipe reactor as shown in, for example, FIGS. 7a–g. Also, although not required, it is preferable that the venting mechanism be located proximal to the influent of the recirculation loop so that the vapors are removed prior to the addition of the reactants, and such a design is shown in FIG. 13a and 13b at 104 in FIG. 13a and 105 in FIG. 13b.

Of note, although there are advantages with the recirculation loop that will be apparent to one skilled in the art based on the discussion above, it is not necessary to include the recirculation loop for a pipe reactor to fall within the scope of the present invention. Instead, the components originally discussed, such as a pump for the fluid reactants and a paste mix tank for the solid reactants can be used. This embodiment using the recirculation loop, however, allows the designer to replace the paste mix tank, pump, instrumentation, agitator, etc. with a pump anda pressure reducing device, such as an eductor.

One skilled in the art will also appreciate that the recirculation loop is most advantageous for injecting solid reactants and is less advantageous when only fluid reactants are added (e.g., forming PET monomer from DMT and EG). Using a recirculation loop to dissolve solid reactants reduces the abrasion caused by the solids in the system. For example, solid PTA can be dissolved by the monomer in the recirculation loop, rather than using a conventional paste tank. In a conventional paste tank process, solid PTA is fed to the process and remains an abrasive component in the undissolved state. In fact, pipe reactors that process only fluid reactants may not benefit from the added complexity of including the recirculation loop. However, the recirculation loop can enhance the heat transfer to the esterification process.

Weirs

A means may be included to control the level at the top of the esterification pipe reactor. In one embodiment, at least one weir is attached to the interior surface of the esterification pipe reactor and wherein the esterification fluids flow over the weir. As illustrated in FIG. 4, the desired controlling means is a weir 110. The weir is preferably disposed proximal to the outlet of the pipe reactor.

The weir has a body portion circumscribed by an edge. A portion of the edge is referred to as the connecting edge and a remaining portion of the edge is the top edge. The connecting edge is of a size to be complementarily received by a portion of the interior surface of the pipe reactor and attached thereto. Thus, since the interior surface is circular in cross-section in the preferred embodiment, the connecting edge is also circular to complementarily contact and engage the interior surface.

Referring still to FIG. 4, the reactants and/or monomer is shown flowing from point 111 and over the weir at point 112. The weir acts as a barrier for the reactants and/or monomer so that the fluid material flows over the top edge of the weir. Thus, the weir controls the liquid depth along with the fluid viscosity, the flow rate, and the length of the pipe before the weir. After passing over the weir, the fluid flows out of the outlet of the pipe reactor at 113. The weir, as described below, may also have openings in it or at the bottom to provide flow uniformity and complete draining. This would include weirs with the top sloped, V-notched in the weirs, etc. The weir is preferably located a distance five to ten pipe diameters from the outlet of the pipe reactor. In one aspect, by sloping the top of the weir, the weir can compensate for higher and lower flows and viscosities.

In alternative embodiments, the level can be controlled by any level controller known in the art, such as, but not limited to, a control valve, seal legs, level devices such as those that use differential pressure, radiation, ultrasonics, capacitance, or sight glasses. Other specific examples of level devices can be found in Perry's Chemical Engineer's Handbook, $7^{th}$ ed., p. 8–49, which is hereby incorporated by this reference.

Additives

Another optional aspect of the present invention comprises a means for introducing one or more additives into the pipe reactor between its inlet and outlet. Such additives are described above and include, but are not limited to one or more of a catalyst, colorant, toner, pigment, carbon black, glass fiber, filler, impact modifier, antioxidant, stabilizer, flame retardant, reheat aid, acetaldehyde reducing compound, oxygen scavenging compound, UV absorbing compound, barrier improving additive, such as platelet particles, black iron oxide, comonomers, mixtures thereof, and the like. Additives can be a solid, liquid, or gas. The additives can be preheated before entry to the system, including a phase change, such as heating EG liquid to the vapor state to provide heat for the reactor.

In the preferred embodiments shown in FIGS. 12a and 12b, the introducing means comprises a sealable channel, as represented by any of the arrows in FIGS. 12a and 12b, through the pipe reactor allowing fluid communication between its exterior surface and its interior surface and an injector for injecting the additive into the material flowing within the pipe reactor (i.e., the reactants and/or monomer). The injector can include a pump or other means such as pre-pressurized, elevational, or gravity driven injection that injects the additive into the interior of the pipe reactor, which must be performed at a pressure greater than that of the materials within the pipe reactor at the location of the sealable channel.

The term "sealable channel" is meant to encompass any opening that allows communication from outside the pipe reactor into its interior. It is preferred that the "sealable channel" be able to be closed off so that when the additive is not being injected into the pipe reactor, the reactants and/or monomer do not leak out of the pipe reactor. The sealable channel may be "sealed" by a plug or the like, as well as the injector not allowing leakage out of the pipe reactor.

The additives can be introduced or injected at any point along any portion of the pipe reactor, as shown in FIGS. 12a and 12b. Examples of suitable addition points include the sealable channel traversing through a portion of the top, side, or bottom of the horizontally oriented sections of the pipe reactor, the top, side, or bottom of a respective elbow, into a seal leg, and before a heat exchanger. As shown in FIG. 12b, injection into the elbow is advantageous because of the resulting maximum mixing and quick incorporation of the additive into the reactants and/or monomer without high-concentration eddies occurring inside of the pipe reactor.

Another aspect of the injecting means is including a nozzle at the discharge or outlet of the injector. The nozzle can direct flow within the pipe reactor at the location of the sealable channel. For example, the nozzle can inject the additive co-current, counter current, or perpendicular to the reactants and/or monomer that are flowing within the pipe reactor at that location.

Returning to the design of the esterification pipe reactor, the pipe elevational height, pipe diameter, total length of pipe, and pressure at the inlet and outlet can vary widely depending upon the products made, plant capacity, and operating conditions. One of skill in the art could readily determine these parameters using basic engineering design principles.

The Polycondensation Step

With respect to the below discussion under this section, "THE POLYCONDENSATION STEP," unless specifically stated to the contrary, the processes and apparatuses of this invention discussed in this section below are equally applicable to, and can be used in, the esterification processes and apparatauses.

As noted in the "Overview" section above, the second step of the process of the present invention is the polycondensation step, which in one embodiment occurs in the polycondensation pipe reactor. The polycondensation step involves reacting the monomers into oligomers and then into the polyester polymer. The monomers may be provided from the first step in an esterification reactor, as discussed above, or from a prior art process. Alternatively, if oligomers were substantially formed in a prepolymer first step, then oligomers are reacted directly to form the polymer.

In a specific embodiment, when PET polymer is formed, the PET monomers are fed to the polycondensation pipe reactor. The PET monomers are reacted in the polycondensation pipe reactor to form the PET oligomer and then are further reacted preferably within the same polycondensation pipe reactor to form the PET polymer. As used herein with respect to PET, monomers have less than 3 chain lengths, oligomers have from about 7 to about 50 chain lengths (components with a chain length of 4 to 6 units can be considered monomer or oligomer), and polymers have greater than about 50 chain lengths. A dimer, for example, EG-TA-EG-TA-EG, has a chain length of 2 and a trimer 3 and so on. Thus, the condensation pipe reactor of the present invention can take the place of both a prepolymer reactor as well as a finisher reactor as those terms are used in the prior art and as defined hereinabove.

FIG. 4 shows the output of the pipe reactor traversing over a weir, for level control, and into the polycondensation reactor of the second step of the present invention. Also referring to FIGS. 4 and 6, one skilled in the art will appreciate that pressure-restricting devices (such as, but not limited to a valve, orifice, or the like) between the esterification or ester exchange reactors and the polycondensation reactors can be used but are not required.

In one embodiment, a seal leg is used between the esterification/ester exchange reactor and the polycondensation reactor. Seal legs can also be used between some or all of the polycondensation stages. As was discussed above with respect to the esterification process for the polycondensation process, a heat exchanger can be placed proximate or adjacent to, or even within a seal leg, thereby transferring heat to the fluid between the esterification and polycondensation or between the polycondensation stages or zones.

The static equivalent to a seal leg is a barometer. The difference in pressure between two zones of the reactor is maintained with a fluid in a 'U' shaped pipe. The differential in pressure will be equivalent to the product of the fluid height times the density on the low pressure side minus the fluid height times the density on the high pressure side. One skilled in the art will recognize that if the differential height is not great enough, the differential pressure between the zones will push the fluid out of the seal leg and both zones will assume an equilibrium pressure. This can require the height of the seal leg to be very large between zones with high pressure difference. In addition, the side of the seal leg on the low pressure side will generally be boiling at the reduced pressure, hence the low pressure side's density will be reduced by the void fraction of the vapor.

Fortunately, the seal leg is a dynamic barometric device in that the fluid is flowing through the seal leg. This fluid flow has associated pressure drop with it and can be used to enhance the pressure drop of the low pressure side. By adding a flow path restriction, such as an orifice, valve, or small diameter piping, to the low pressure leg of the seal leg, the pressure drop on the low pressure side per unit of elevation can be increased. If the flow restriction is inserted before the heat is transferred into the seal leg, then the fluid will not be two phases and the density of will be greater. Using these methods to increase the pressure drop of the low pressure seal leg will decrease the total height of the seal leg.

The present invention involves providing a polycondensation reactor having a first end, a second end, and an inside surface defining an inner diameter. The first end can be disposed elevationally above the second end so that gravity moves the monomer and any formed oligomer and polymer from the first end to the second end.

As shown in FIG. 2, the polycondensation reactor can be serpentine in front plan view (but flow is in the opposed direction as compared to the esterification pipe reactor—that is, the influent is at 11 and the effluent is at 12 for the polycondensation process). Nonetheless, as with the esterification pipe reactor, other profiles, such as the designs hereinbefore described with respect to the esterification pipe reactor, are contemplated in addition to the serpentine design. It is also preferred to include a plurality of elbows, each elbow changing the direction of fluid flow within the polycondensation reactor. The materials used to form the polycondensation reactor may also be the same as those used to form the esterification pipe reactor.

Thus, the monomer, which is preferably in a fluid form, is directed into the first end of the polycondensation reactor so that the monomer flows downwardly through the polycondensation reactor. The monomer reacts to form the oligomer and then the final polymer within the polycondensation reactor so that the polymer exits from the second end thereof. As one skilled in the art will appreciate, not all of the monomer and/or oligomer must react to be within the scope of the present invention. The monomer, oligomer, and/or polyester polymer flowing through the polycondensation reactor are referred to as the polycondensation fluids.

It is also preferred that the polycondensation reactor is non-linear between the first end and the second end to improve the mass transfer/mixing of the monomer and formed oligomer and polymer. In general and as discussed below, the polycondensation mass transfer is accomplished by the mass transfer at the surface of the oligomer (low molecular weight polymer) and by the foaming action of the gas evolving from within the polymer. This gas is evolved from the heating at the wall surface and the reaction within the polymer. The mass transfer is further enhanced as the liquid falls over optional weirs in each section of the reactor. The reactor can be constructed without the polycondensation reactor weirs if the physical parameters of the polymer allows.

The polycondensation reactor can be formed as a plurality of contiguous interconnected sections, in which the monomer, oligomer and/or polymer flows through the inside surface of each section traversing from the first end to the second end of the polycondensation reactor. Adjacent sections of the reactor preferably form non-linear angles with each other.

The polycondensation reactor preferably forms an angle with a vertically-oriented plane, in which the angle is greater than zero degrees. Stated differently, each section is not parallel to the vertically-oriented reference plane and, thus, is not vertically oriented. More specifically, the angle that each section forms with the vertically-oriented plane is between about 1 (almost vertically oriented) and 90 degrees (horizontally oriented). The preferred angle progresses from horizontal (90 degrees) to within about 26 degrees of vertical; however, one skilled in the art will appreciate that the preferred angle is based on viscosity and line rate (flow) within the polycondensation reactor. Preferably, the sections can have different angles relative to each other, preferably the initial sections having a horizontal or near horizontal angle, and as the polycondensation reaction progresses and the fluid increases in viscosity, the angle increases to provide an increased vertical sloping to facilitate transport of the fluid through the polycondensation pipe reactor.

In one aspect, the polycondensation reaction at the top end has a low slope (more horizontal) because the fluid is of a low viscosity, whereas the bottom end is of a high slope (more vertical) because the fluid is of a high viscosity. The slope can be varied depending upon parameters such as viscosity and density of the fluid to achieve the optimum effect. In another aspect, no slope is used in a horizontal configuration for the polycondensation reactor.

In one aspect, the polycondendation reactor has a general horizontal orientation rather than a vertical orientation. This horizontal orientation can include some vertical height to allow the polycondensation fluids to flow by gravity in a downward manner throughout the system. In various aspect, for the horizontal configurations, the pipe reactor can have a length of at least 10 feet, at least 20 feet, at least 30 feet, at least 40 feet, at least 50 feet, at least 60 feet, at least 100 feet, or at least 200 feet. In other aspects the length is from 10 to 500 feet, 20 to 250 feet, 50 to 200 feet, 60 to 100 feet, or 60 to 80 feet. The upper length limit is only limited by the practical amount of horizontal space available at the production facility. In one embodiment, a pipe reactor of at least about 60 feet is used because standard maximum length commercial pipe is about 60 feet. Pipe reactors herein can even be hundreds of feet long or more.

In one aspect, the interior surface of the polycondensation pipe reactor is circular, square, or rectangular in cross section, preferably circular, so as to form an inner diameter.

To aid in the mass transfer/mixing, the present invention further comprises a means for heating the oligomer and polymer flowing through the polycondensation reactor. The preferred heating means is the same as discussed for the esterification pipe reactor of the first step, namely, heat transfer media in thermal communication with a portion of the outside surface of the polycondensation reactor along at least a portion of the polycondensation reactor between the first and second ends thereof or heat exchangers in series with jacketed or unjacketed pipe. In the preferred embodiment, the heat transfer media are the same as discussed above. In one aspect, heat exchanges can be used, preferably between the polycondensation zones. In a particular embodiment, heat exchangers are used in conjunction with seal legs, such as by providing the heat exchangers proximate, adjacent, or within the seal legs used to separate the zones.

Also similar to the esterification pipe reactor discussed above, in one aspect, the polycondensation reactor of the present invention further comprises at least one weir attached to the inside surface thereof. The polycondensation fluids flow over the weir. The weir acts as a barrier for the monomer/oligomer/polymer so that it flows over the top edge of the weir when flowing from the first end to the second end of the polycondensation reactor. The weirs can be the same weir design and/or configuration described above in the esterification section. In one aspect, a weir is used between each zone of the polycondensation reactors, and in another aspect, a weir is used between some of the zones of the polycondensation reactors but not in all zones.

The weir controls the liquid level in each pipe level of the reactor. These weirs can be as simple as a half circle or include added complexities. In one aspect, by sloping the top of the weir, the weir can compensate for higher and lower flows and viscosities. In one aspect, the design of the polycondensation pipe reactor allows the integration of any weir design to compensate for these factors. It is also contemplated including at least one opening though the body portion of the respective weirs so that the monomer/oligomer/polymer flows through the opening, as well as over the top edge of the weir when flowing thereby. These openings or holes in the weirs improve the flow and reduce stagnant flow zones. In still another embodiment, a section of the body portion of the weir may be detachably removable to allow a fluid to pass through that section of the weir instead of over the weir. For example, the section may be a "V" notch or "V-slot" in the weir. The "V-slot" in the middle of each weir from the inside of the pipe to the center of the pipe further allows the reactor to drain when shutdown. These designs increase the mixing of the fluids when traversing by the weir.

The first pipe in each zone can be horizontal and can be functional without a weir, but the weir has the advantage of increasing the efficiency of the system by both surface area and residence time. Additionally, the polycondensation pipe can be sloped downward, particularly for when the IV of the fluid approaches 0.5 dl/g or greater.

Another aspect of the present invention that is similar to the esterification pipe reactor discussed above is that the polycondensation reactor preferably also includes a means for reducing the vapor pressure in the polycondensation reactor, such as a degassing mechanism in fluid communication with the inside surface of the polycondensation reactor.

Similarly, the degassing mechanism used in the polycondensation reactor may include a venting means and/or stand pipe similar to the design discussed above in the esterification section. Of note, the venting end of the degas stand pipe is preferably in fluid communication with a vacuum source so that a sub-atmospheric pressure exists in the standpipe and at the inside surface of the polycondensation reactor. The vacuum source may be maintained by vacuum pumps, eductors, ejectors, or similar equipment known in the art. The vacuum in each of the vapor removal lines can be used to control the pressure in the zones of the polycondensation reactor.

Referring now to FIG. 9, which shows one embodiment of the weir/degassing system, specifically, using an optional flow inverter system for the separated liquid, the polycondensation reactor may also include a reducer 123 located immediately downstream of a weir 124 inside tee 128. In one embodiment, at least one polycondensation fluid flows through a flow inverter, wherein the flow inverter is proximate to and downstream of the weir. The reducer has a diameter smaller than the inner diameter of the polycondensation reactor and the reducer forms a part of the juncture of two interconnected sections, in which the interconnected sections are formed by an upstream section and a downstream section. The reducer is connected to the upstream section and extends into the downstream section. The reducer has a lower end 127 having an aperture through which the monomer/oligomer/polymer flows when traversing from the upstream section to the downstream section. The lower end of the reducer 127 is spaced apart from the inside surface of the downstream section, which improves mixing as the fluids fall from the force of gravity into the inside surface of the downstream section. In fact, it is more preferred that the lower end of the reducer be spaced apart from a top or upper surface of the monomer/oligomer flowing through the downstream section that the fluid flowing through the reducer splatters upon the top or upper surface of the monomer/oligomer.

Stated differently and still referring to FIG. 9, in one embodiment, the inside and outside flow paths can be mixed by using a flow inverter. By dropping over the weir 124 and into a reducer 123 before entering the next elbow 125, the liquid monomer/oligomer/polymer will be mixed from inside out and vice versa. The liquid flows in the pipe from the left 120 and passes over the weir 124, which controls the liquid depth. The vapor continues out the right side of the tee 128 at 121. The degassed liquid flows into the concentric reducer 123. The concentric reducer 123 passes through a pipe cap 126 of a larger diameter pipe. The reduced pipe stops above the liquid pool depth of the next pipe run. The configuration withdraws liquid from the walls of the top pipe and introduces the fluid into the middle of the next pipe and out at 122. FIG. 9 is but one embodiment of a flow inverter system 142; other flow inverters known in the art may also be used. Typical flow inverters used in the art can be found in, for example, Chemical Engineers' Handbook, Perry and Chilton, Ed., 6$^{th}$ Edition, p. 5–23. Flow inverters are typically not needed in the esterification process, because the gas tends to mix the fluid. However, a flow inverter can be used in the esterification process, if needed.

The vapor disengagement system of, for example, FIG. 8 can be used without a flow inverter. In that aspect, in one embodiment, tee 139 of FIG. 8 contains a weir such as shown in FIG. 9, but section 143 can be just straight pipe and section 140 an elbow, without a flow inverter therein. Thus, in that aspect, section 142 of FIGS. 8 and 18 do not contain the flow inverter system of FIG. 9.

Referring back to the exemplary embodiment of the polycondensation reactor shown in FIG. 2, the polycondensation reactor pipe elevations can be continuously sloped from top to bottom. This configuration requires extreme care in calculating the angles to obtain the desired liquid level, since strictly the liquid viscosity and pipe length (reaction along length) would control the angle for the level. By adding weirs to each level of piping, the weirs can correct errors in calculation. Even with weirs, the liquid could overflow and continue around a sloped horizontal spiral of the polycondensation piping. However, laminar flow would maintain the same liquid on the outside and the same liquid on the inside of the flow path.

In the polycondensation pipe reactors of the present invention, pumps are not required between the reactor zones or sections of the polycondensation pipe reactor. Thus, the present invention in one aspect eliminates the need for additional pumps between zones. The oligomer and polymer in the polycondensation zones of the reactor in one aspect flow by gravity from one section to the next, and no pressure restricting devices are located between the reactors. Seal legs are preferably used to maintain a pressure differential between the reactors as discussed below.

Referring now to FIGS. 17*a* and 17*b*, the polycondensation reactor preferably includes a top section 235, a middle section 236, and a bottom section 237, and at least one degassing mechanism incorporated into the polycondensation reactor. Such a degassing mechanism is shown in one aspect in FIG. 8 and in FIG. 18 as system 133. Only one vacuum system is required and only one vacuum pressure is required in the polycondensation process. However, with only one vacuum system, the vapor velocities can be extremely high and will detrimentally put liquid with the vapor into the vacuum system. At least two, and more preferably three levels of vacuum can be used to minimize this entrainment. One vacuum system can ultimately supply the one or more vacuum pressures required.

If only one spray system is used, this requires that the vacuum to the highest pressure zone be controlled with a control valve. Without a spray condenser between the reactor and the control valve, this valve will plug. When three levels of vacuum are used, with a main spray system for the combined two lower pressure vacuum systems and another spray system for the higher pressure vacuum system, then the control valve is after the high vacuum spray system. This valve will not plug. One vacuum train is sufficient, but two spray systems are typically required.

With reference to FIGS. 17*a* and 17*b*, the effluent from the esterification reactor enters the polycondensation reactor at 235 and the final product from the polycondensation process exits the system at 239. The fluids traversing within the inside surface of the polycondensation reactor also flow sequentially by the at least one (one is the minimum, but additional degassing mechanisms reduces the vapor velocity, hence reducing liquid entrainment into the vapor)

respective degassing mechanism when flowing from the first to second end of the polycondensation reactor, in which the as shown three degassing mechanisms are located respectively at the top section, the middle section, and the bottom section of the polycondensation reactor. The top, middle, and bottom sections are preferably maintained at different pressures from each other preferably by the use of seal legs. Preferably, for PET production, the pressure in the top section ranges from 40 to 120 millimeters mercury, the pressure in the middle section ranges from 2 to 25 millimeters mercury, and the pressure in the bottom section ranges from 0.1 to 5 millimeters mercury. One embodiment of the seal legs and vacuum source is disclosed in U.S. Pat. Nos. 5,466,765 and 5,753,190, which are incorporated herein in their entirety. It is also preferred that the three degassing mechanisms are in fluid communication with one venting system. When the polycondensation pipe reactor is at a sub-atmospheric pressure, the source of such vacuum can be any vacuum generating source such as, but not limited to, a vacuum pump or ejector. A preferred degassing mechanism 133 is shown in exploded view in FIG. 8. In one aspect, laminar mixing system 142 can be used and is shown in exploded view in FIG. 9. The elevational difference in the different zones of the polycondensation reactor allows for the elimination of all pumps internal to the polycondensation reactor train. The polycondensation pipe reactor actually dampens inlet perturbations despite eliminating the use of pumps.

Alternatively, the various stages of polycondensation can be broken up so that the effluent (bottom) from one stage is pumped to the influent (top) of the next stage. This allows the height of the total system to be reduced because each stage is smaller in height than the overall gravity fed system. Thus, the different vacuum sections do not need to end up with one below the next. In one aspect, the difference in pressure that is controlled in the seal leg can be used to raise the next section of the polycondensation reactor above the exit of the higher pressure section. A pump can be added between polycondensation vacuum pressure zones so that all zones can start at the same elevation. This lowers the total building height for the polycondensation facility.

With reference to FIG. 18, a single zone of the polycondensation reactor is shown. That is, with reference to FIGS. 17a and 17b, FIG. 18 represents one of the zones P1, P2, or P3. Alternatively, FIG. 18 could represent the entire polycondensation process. Typically, each of the zones P1, P2, and P3 is at a different pressure to maximize the efficiency in the polyester production. More or less zones can be used from 1 to a plurality, for example, 2, 3, 4, 5, or more zones with 3 typically be used for PET or PETG production for example. The inlet to the zone in FIG. 18 is at 147 and the outlet at 148. The polycondensation fluids flow through the pipe reactor reacting from the inlet to the outlet along, in one embodiment as shown, the linear and non-linear path. The vapor is disengaged from the polycondensation reactor with a similar piping arrangement to the esterification process at 133, as shown in FIG. 7 and as specifically shown for one embodiment of polycondensation in FIG. 8 (which were also referenced above in the discussion of the esterification pipe reactor). FIG. 8 shows a blowup of section 133 of FIG. 18 where liquid and gas comes into the disengaging system 133. FIG. 9 shows a blow up of Section 142 of FIG. 8 and FIG. 18. FIG. 18 shows five vapor disengagement section 133. However, any number of vapor disengagement section 133 can be used for a particular zone, from 1, 2, 3, to as many as are needed to effectively vent this system. FIG. 18 also shows an embodiment wherein the laminar mixing using a flow inverter system 142 is used, which is blown up in FIG. 9. Additionally, preferred angles for the vent system of the 90 degree angle followed by two 45 degree angles are shown. Other angles can also be used.

The vapor or gas in the polycondensation process should preferably be disengaged from the liquid. For example, in one embodiment, it is preferred to drive the EG byproduct from the polycondensation reaction off as a vapor, disengage it, and remove it from the system. The degree of disengagement can be affected by, for example, increasing the number of parallel pipes, which increases disengagement With reference to FIGS. 8 and 9, at the end of each elevation of the polycondensation reactor 138, the liquid flows over the weir 124 inside of a tee 139 with a leg 143 directing the liquid toward the ground to elbow 140 and then horizontally at 141. The weir (or the fluid viscosity and pipe length) in the polycondensation zones maintains the liquid level, L, at approximately half full in the piping. This maximizes the surface area. Once the fluid in the reactor is so thick that a weir is not required to maintain level, then maintaining the pipe half full does not maximize surface area or mass transfer rates. The second leg 138 of the tee is in the direction of the flow. The third leg 144 of the tee is pointed in the horizontal plane in the direction away from the liquid flow. In one aspect, the vapor and entrained liquid is disengaged by flowing through a nonlinear pipe. In one aspect, the nonlinear pipe is a pipe such that the angle from third leg 144 to the vapor exit does not proceed along a linear path. Such an angle creates an impingement plate for the entrained liquid. This impingement plate causes the entrained liquid to disengage from the vapor and return back to the liquid system. With reference to FIGS. 7, 8, and 18, various embodiments of this entrained liquid/vapor separator are shown. After a short horizontal run from the third tee leg, the vapor line has an elbow 134, preferably a 90° elbow, directing the vapor away from the ground. The horizontal zone 144 allows the vapor to flow at a slow rate and the liquid to disengage and flow back to the main stream. After a short vertical run 145 from the vapor elbow 134, a preferred 45° elbow 135 (common pipe component with a maximum disengagement vector) is installed with the vapor line at preferably 45° elbow 146, which is again horizontal at 137. The angled pipe has a steep slope to provide the energy required for the high viscosity liquid to drain back into the reactor with very low residence time. The vapor, without the liquid, passes upward into angled pipe. This horizontal pipe 137 is then combined with the other vapor lines or is directed to the condenser or vacuum system. The vapor leaves via line 137 and the liquid goes to the next level in line 141. The steep slope is the impingement plate for the entrained liquid. The liquid flows over the weir, and drops to the next zone. Further polycondensation may be conducted in the next line 141. The physical layout of the pipe creates the desired functionality (flow, pressure, etc.) without any internal parts (other than a weir) or complicated configurations.

The ester exchange or esterification vapor piping leaving tee 36 can be the same as the polycondensation piping after the 90° elbow 134 directing the vapor vertically and is shown in FIG. 7g. As shown in FIG. 7g, the liquid is disengaged against the angled pipe flowing back into the liquid pool. As shown in FIG. 18, the angled pipe 136 has a steep slope to provide the energy required for the high viscosity liquid to drain back into the reactor with very low residence time. The vapor, without the liquid, passes upward into angled pipe. The gas proceeds up the pipe and to the vapor processing equipment.

The pressure drop zone preceding the polycondensation zone has a high degree of mixing. The pressure let down zones between reactors also has high mixing and are accessible in this reactor.

Nitrogen or vapor or gas can be purged across or into the liquid of one or more polycondensation reactor sections. The nitrogen or vapor or gas lowers the partial pressure of the diol, thereby increasing the polycondensation rate.

Referring now to FIG. 6 which is yet another embodiment of the invention, the esterification reactor is shown dividing into a plurality of parallel pipe reactor flow conduits 165 and 166, with the inlet being at 164. The outlet of the parallel esterification reactors flow to the polycondensation reactors. The polycondensation reactor is shown dividing into a plurality of substantially parallel flow conduits 160, 161, and 162 between the first and second ends thereof. Fluid flowing through the polycondensation reactor passes through one of the plurality of flow conduits while flowing from the first end to the second end. As shown, at least one of the flow conduits further comprises an injection line 163 in fluid communication therewith, in which the injection line adapted to add an additive to the monomer flowing therethrough. The contemplated additives may be any of those listed above.

Still referring to FIG. 6, the polycondensation reactor of the present invention can be used to manufacture multiple products from the split line. The reactor can be split at many locations to permit the incorporation of different additives, reactants or product attributes (such as inherent viscosity (IV)). For example, in FIG. 6, one monomer or oligomer is made in a single esterification section 164 (shown with two parallel reactors 165 and 166), and fed to two different polycondensation reactors 160 and 161, allowing two different melt phase products to be made. The polycondensation reactions can be the same or may differ in conditions, reactants, additives, size, or a combination of these features or other features. As noted above, line 163 is an addition line and the monomer is shown as being split and an additional reactant, such as DEG, added at 163 to allow one polycondensation reactor to make a different product, such as a higher DEG product, in 162. The number of splits is not limited to two; any number of splits can be made. Similarly, the plant could be operated with some zone emptied and not operating, allowing the plant to operate at multiple capacities.

Returning to the design of the polycondensation pipe reactor, the pipe elevational height, pipe diameter, total length of pipe, and pressure at the inlet and outlet can vary widely depending upon the products made, plant capacity, and operating conditions. One of skill in the art could readily determine these parameters using basic engineering design principles. The pipe elevational height is typically not critical and can be based upon the building dimensions.

HTM Subloops

Most polyester plants have numerous HTM (Heat Transfer Media, such as oil) subloop pumps. These pumps allow temperature control of individual loops that is lower than the main loop header temperature. Lowering the HTM temperature reduces the wall temperatures, improves the polymer color, lowers degradation, and allows for better temperature control.

In the present invention, allowing the header temperature to be controlled by the hottest zone in the reactor and valves for the other zones can eliminate these pumps. The second hottest zone is heated by the HTM exiting the first zone. In between the two zones, a control valve allows flow to the Return HTM header and then a second control valve allows flow from the Supply HTM header. This provides the equivalent temperature control that can be obtained with Subloop pumps. Each successive zone has temperature controlled in the same manner. All of this is made possible because the pipe reactor can be of a jacketed pipe so the pressure drop (ΔP) of the HTM across the reactor is low. On the other hand, for a conventional process, a CSTR relies upon coils in the reactor and a jacketed reactor, which causes a large ΔP of the HTM across the reactor.

Referring to FIG. 14, the flow rate in the main HTM header can be reduced and the return temperature of the HTM will be lower than the Subloop controlled system. Heat Transfer media is supplied in header 173 and returned to the furnace or heat source in header 174. A differential pressure is applied between the headers 173 and 174 to provide driving force for the fluid flow. The supply header 173 pressure must also exceed the additive pressure drop of all of the zones piped in series and still overcome the pressure in the return header 174. Return header 174 must provide adequate Net Positive Suction Head for the header pumps. Heat Transfer Media (HTM) is supplied to Zone 172 through a temperature or flow control valve. The HTM leaving zone 172 proceeds to zone 171. If the fluid is too hot or the flow is too high, then HTM is removed to header 174. If the fluid is too cold, fluid is added from header 173. If the fluid requires a higher temperature than can be obtained with the valve sizing, then fluid can be removed to header 174 and replaced with fluid from header 173.

In a first embodiment, therefore, the heat transfer media control system includes a first heat transfer media header through which a first heat transfer media stream is passed; a second heat transfer media header through which a second heat transfer media stream is passed; a first heat transfer media sub-loop, through which the heat transfer media may be passed, from the first to the second headers, respectively; and a control valve in fluid communication with a selected one of the headers and the first sub-loop. The pressure of the first heat transfer media stream is greater than the pressure of the second heat transfer media stream, and the control valve is used to selectively direct at least a portion of the first heat transfer media stream into the first sub-loop using the pressure of the first heat transfer media stream, only, to pass the heat transfer media through the first sub-loop, and to also control the temperature and pressure of the heat transfer media stream being passed therethrough. An additional aspect of the system includes a second heat transfer media sub-loop formed separately of the first sub-loop and in fluid communication therewith; and a second control valve in fluid communication with the second sub-loop. The second control valve selectively directs at least a portion of the first heat transfer media stream into the second sub-loop, using the pressure of the first heat transfer media stream, to control the temperature and the pressure of the heat transfer media being passed therethrough.

In a second embodiment, the heat transfer media control system includes a first heat transfer media header through which the first heat transfer media stream is passed; a second heat transfer media header through which the second heat transfer media stream is passed; a first heat transfer media sub-loop through which the heat transfer media may be passed from the first header to the second header; a first control valve in fluid communication with the first header and the first sub-loop; and a second control valve in fluid communication with the first sub-loop and the second header. The pressure of the first heat transfer media stream within the first header being greater than the pressure of the second heat transfer media stream within the second header, and one or both of the control valves is used to selectively direct at least a portion of the first heat transfer media stream into the first sub-loop, using the pressure of the first heat transfer media stream, to pass the heat transfer media through the first sub-loop, and to also control the temperature and pressure of the heat transfer media stream being passed through the first sub-loop.

An additional aspect of the second embodiment of the invention includes adding a second heat transfer media sub-loop formed separately of the first sub-loop and in fluid communication therewith, with a second control valve in fluid communication with the second sub-loop wherein the second control valve selectively directs at least a portion of the first heat transfer media stream into the second sub-loop, using the pressure of the first heat transfer media stream, to control the temperature and the pressure of the heat transfer media being passed therethrough. The second control valve is used to decrease the temperature and the pressure of the heat transfer media passed though the first sub-loop. An additional aspect of the invention includes a third control valve in fluid communication with the second sub-loop, wherein the third control valve selectively directs at least a portion of the first heat transfer media stream into the second sub-loop, using the pressure of the first heat transfer media stream, to control the temperature and the pressure of the heat transfer media being passed therethrough.

Still another aspect of the heat transfer media control system is that the pressure of the heat transfer media passed through the second sub-loop will be less than the pressure of the heat transfer media passed through the first sub-loop. Additionally, the second control valve will be used to increase the temperature and the pressure of the heat transfer media passed through the second sub-loop. Thus, in another aspect, the system includes a conduit extending in sealed fluid communication from the first sub-loop to the second sub-loop so that the heat transfer media passed though the first sub-loop is passed through the second sub-loop, the second control valve being in fluid communication with each of the first and second sub-loops, respectively, and used for controlling the temperature and pressure of the heat transfer media passed from the first sub-loop into the second sub-loop. The second control valve may also be used to lower the temperature and the pressure of the heat transfer media passed from the first sub-loop into the second sub-loop.

Still another aspect of the system includes a series of heat transfer media sub-loops, therefore, each subsequent sub-loop being in fluid communication with the immediately preceding sub-loop for receiving the heat transfer media therefrom. This features the aspect of the fluid pressure of the heat transfer media passed through the series of heat transfer media sub-loops being lower in each subsequent sub-loop with respect to the immediately preceding sub-loop. Also, an aspect of this embodiment of the system is that the temperature of the heat transfer media passed through the series of heat transfer media sub-loops will be lower in each subsequent sub-loop with respect to the immediately preceding sub-loop. An additional aspect is that each respective heat transfer media sub-loop of the series of sub-loops has a first control valve in fluid communication with the first header and the sub-loop for increasing the temperature and pressure of the heat transfer media passed therethrough, and a second control valve in fluid communication with the sub-loop and the second header for decreasing the temperature and pressure of the heat transfer media passed therethrough.

Another aspect of the heat transfer media control system is that the heat transfer media is passed from the first header into and through the first sub-loop in the absence of a heat transfer media circulating pump, and also that the heat transfer media is passed from the first sub-loop into the second header in the absence of a heat transfer media circulating pump. Similarly, it is an additional aspect of this embodiment that the heat transfer media is passed from the first header into and through the first sub-loop, and passed from the first sub-loop into the second header, respectively, in the absence of a heat transfer media circulating pump.

The method of passing the heat transfer media through the heat transfer media system includes passing the first heat transfer media stream through a first heat transfer media header; passing the second heat transfer media stream through a second heat transfer media header; passing the heat transfer media from the first header through a first heat transfer media sub-loop, in the absence of a heat transfer media circulating pump, with a first control valve in fluid communication with the first header and the first sub-loop; and passing the heat transfer media from the first sub-loop into the second header, in the absence of a heat transfer media circulating pump, with a second control valve in fluid communication with the first sub-loop and the second header. The polycondensation fluids are moved from the first end of the pipe reactor to the second end thereof in the absence of a pump.

Minimization of Equipment

If desired, the use of liquid raw material feed tanks may be eliminated from the polyester process. As known, raw materials are delivered to the process plant by any number of known types of delivery vehicles, to include a pipeline, a rail car, or a tractor-trailer. This invention provides that the raw materials, as delivered, may now be pumped directly to the plant from the delivery vehicle. The basis of this process is the NPSH curve of the pump. As known, and for example when a tractor-trailer delivers the fluid(s) used, the NPSH is a function of the fluid level within the trailer and the pressure drop of the fluid to the pump. The pressure drop is a function of the fluid velocity, the fluid viscosity, and the piping configuration used. In comparison, the head pressure from a supply tank is a function of liquid height and density. The piping configuration of the system will be constant in both instances. The liquid density and viscosity changes should be small with ambient temperature changes, but if the density and viscosity changes are large they can then be obtained from a coriolis mass flow meter, in known fashion.

Therefore, if the mass flow rate is known from the flow meter, then a process control computer (not illustrated) of known construction can take this data input, as well as any additional input data that may be required, as discussed above, and can calculate the fluid mass within the trailer using the inlet pump pressure. The inlet pump pressure and flow are used to continually determine the mass of the fluid within the trailer. During functional checkout, the pressure and flow relationship to the fluid level within the trailer is established to correct any deficiencies in the computer estimation.

The operating process is now described below with reference to the fluid delivery system illustrated in FIG. 21. A first trailer 265 is parked at a pump station "P". The trailer is connected and valved to a pump 263 by opening a series of valves 251, 252, 253, 257, 261, and 276, respectively. At the same time, a second series of valves 258, 259, 272, 274, and 275, respectively, are closed. The pump 263 is started and primed by going back to the trailer 265. The system is now ready for plant operation once the automatic valve 272 is opened. A second trailer 266 is also parked at the pump station, and is connected and valved to a second pump 264 by opening a series of valves 254, 255, 256, 260, 262 and 273, respectively. Simultaneously, the valves 258, 259, 271, 274 and 275 are closed. The pump 264 is started and primed by going back to the trailer 266. The pump 264 system is now ready for plant operation but is left in a standby mode.

The valve 272 is opened and the plant is started. When the level in the trailer 265 is determined to be at a certain level such as, for example, 10% of its full level, the valve 272 is closed and the valve 271 is opened simultaneously for providing a seamless supply of fluid to the plant. Now the pump 263 is in recirculation back to the trailer 265 and the pump 264 is supplying the plant from the trailer 266. The plant continues to run consuming fluid from trailer 266 until the level therein is measured to be at a certain level such as, for example, 85% of the full level. Once this occurs, the computer opens the valve 275 and closes the valve 276. This pumps the remainder of the fluid contents within the trailer 265 into the trailer 266. The pump 263 stops automatically on low watts. The process control computer then closes the valve 275.

The first trailer 265 is removed from the pump station, and another trailer 265 full of the desired process fluid is parked at the pump station. This process is repeated with pump 263 being primed from the trailer 265. Then, once the fluid level within the trailer 266 is measured to be at a certain level such as, for example, 10% of full value, the valve 271 is closed and the valve 272 is opened. The fluid level in the trailer 265 is used until the fluid level is measured at a certain level such as, for example, 85% of full, whereupon the remainder of the fluid within the trailer 266 is pumped into the trailer 265. The trailer 266 is then removed from the pump station, and another full trailer 266 is parked in the position of the original trailer. The pump 264 is fed and primed from the new trailer 266, and the process continued in this fashion.

A first embodiment of the described fluid delivery system therefore includes at least one delivery container positioned at a pump station, and at least one pump in fluid communication with the at least one delivery container, the at least one delivery container being in fluid communication with a valve train, the valve train being in fluid communication with the process plant pipe system. The fluid is selectively pumped directly from the at least one delivery container through the valve train and into the process plant pipe system in the absence of a fluid delivery feed and storage tank for otherwise receiving and storing the fluid from the at least one delivery container therein. Additionally, the system includes a second delivery container positioned at the pump station and a second pump in fluid communication with the second delivery container, each of the delivery containers and pumps, respectively, being in fluid communication with the valve train. The valve train is comprised of a plurality of selectively operable control valves and being in fluid communication with the process plant pipe system, such that the fluid is selectively pumped directly from the first and second delivery containers, respectively, through the valve train and into the process plant pipe system in the absence of a fluid delivery feed and storage tank.

Additional aspects of the system include a process control computer, the process control computer being operably coupled to the first and the second pumps, respectively, and to at least one of the control valves within the valve train; a mass flow meter in fluid communication with each of the first and the second delivery containers, respectively, and being operably coupled to the process control computer; the mass flow meter being constructed and arranged to measure and transmit a fluid mass flow rate of the fluid pumped from either of the delivery containers to the process control computer; the process control computer calculating the fluid mass within a selected one of the delivery containers using the fluid mass flow rate and a measured inlet pump pressure. Additionally, the process control computer uses the inlet pump pressure and fluid flow rate flow to continually determine the mass of the fluid within the selected one of the delivery containers.

The process control computer opens a first automatic control valve and starts the operation of the process plant; and closes the first automatic control valve once the fluid level within the first delivery container is determined by the process control computer to be at a first predetermined fluid level. An additional aspect is that a second automatic control valve is simultaneously opened by the process control computer such that the first pump recirculates the fluid from the first delivery container back into the first delivery container, and the second pump supplies the fluid from the second delivery container to the process plant. The plant is thereafter provided with the process fluid from the second delivery container until the fluid level therein is determined by the process control computer to be at a second predetermined fluid level. Thereafter, the process control computer opens the first control valve and closes the second control valve such that the remainder of the fluid contents within the first delivery container are pumped into the second delivery container. Once the process control computer closes the first control valve, the first delivery container may be replaced with a fresh delivery container in its place at the pump station. An additional aspect of the invention includes the process control computer reopening the second control valve and closing the first control valve such that the plant is provided with the process fluid from the second delivery container.

The described method of this invention therefore includes positioning a first delivery container at a pump station, the first delivery container being in fluid communication with a first pump, positioning a second delivery container at the pump station, the second delivery container being in fluid communication with a second pump, and selectively pumping the fluid from each of the respective delivery containers directly into the valve train and into the process plant pipe system. This method includes the aspects of operably coupling the process control computer to the first and the second pumps, respectively, and to at least one of the control valves within the valve train, and using a mass flow meter in fluid communication with each of the first and the second delivery containers, respectively, and being operably coupled to the process control computer, to measure the fluid flow passed therefrom by the first and second pumps, respectively. The process control computer calculates the fluid mass within a selected one of the delivery containers using the fluid mass flow rate and a measured inlet pump pressure, and also uses the inlet pump pressure and the fluid flow rate flow and continually determining the mass of the fluid within the selected one of the delivery containers. The process control computer opens a first automatic control valve and starts the operation of the process plant in response to determining the mass of the fluid within the selected one of the delivery containers.

Additional aspects of the method also include the process control computer closing the first automatic control valve once the fluid level within the first delivery container is determined by the process control computer to be at a first predetermined fluid level such that the first pump recirculates the fluid back into the first delivery container, and simultaneously opening a second automatic control valve such that the second pump supplies the fluid from the second delivery container to the process plant; providing the process plant with the process fluid from the second delivery container until the fluid level therein is determined by the process control computer to be at a second predetermined fluid level; the process control computer opening the first control valve and closing the second control valve such that the remainder of the fluid contents within the first delivery container are pumped into the second delivery container; the process control computer closing the first control valve and replacing the first delivery container with a fresh delivery container at the pump station; and then transferring the remainder of the fluid from within the first delivery container to the second delivery container, and thereafter continuing to provide the process plant with the process fluid from the second delivery container while replacing the first fluid delivery container.

As known, in a typical polyester processing facility three different distillation columns are present: A water column, a stripper column, and an MGM column (mixed glycol and monomer column or ethylene glycol condensate column). Vapor from the esterification reactor is sent to the water column. There water is separated from the ethylene glycol. Low boilers (including water) are removed at the top of the column and sent to the stripper column, while ethylene glycol and other high boilers are removed at the bottom of the column and can be sent back to the paste tank, the reactors, directed to other users, and as described herein, back to the recycle loop.

The stripper column separates paradioxane out at the top of the stripper column which cannot be sent to the waster water treatment facility, and combines the paradioxane with an azeotrope of water which is then sent to the furnace or to an oxidizer with the other low boiling point components. The fluids from the bottom of the stripper column are sent to the wastewater treatment facility. In one embodiment of the present invention, the water column is maintained by sending the low boilers to the furnace rather than to the stripper column, and the stripper column can be eliminated. In this instance, the water column is vented to the furnace rather than sending the low boilers to the stripper column. The MGM column is also vented to the furnace.

It is also known that in a conventional polyester processing facility, a wastewater treatment facility is required to treat the organic waste as well as the hydraulic load (water flow) resulting from the process. In one aspect of the present invention, described above, the organic waste is vented to the furnace where it is burned. In a separate aspect of the invention, and as discussed in detail herein, by eliminating many unit operations from the polyester formation process and integrating the plant, thus creating a more compact plant, a roof can be put over the entire process plant, thus eliminating the need to send the hydraulic load to a wastewater treatment facility because rain water will no longer be permitted to come into contact with the process equipment, and/or any spilled process fluids. In still another aspect of the invention, therefore, the elimination of the organic wastes by sending these to the furnace, and the elimination of hydraulic load or wastewater by integrating the plant through the reduction of the facility size coupled with putting a roof over the facility, eliminates the need for a wastewater treatment facility needed to otherwise service the polyester processing plant.

Environmental Emissions from the plant can be reduced by venting all of the process (i.e., the distillation columns, the scrubbers, the adsorbers, the vacuum pumps, etc,) and tank vents into a pressurized vent header. The vent header flows to the HTM furnace and is incinerated. If all such vents are connected to this header, therefore, the unoxidized emissions from the plant will be reduced by more than 99% (typically oxidized emissions are carbon dioxide and water). Additionally, this process eliminates the need for a stripper column.

Still another feature of the present invention is that by increasing the volume of the base portion of the respective distillation columns over that base volume used in conventional processes, tanks for the products passed to and from the distillation columns can be eliminated. This reduces the amount of fluid containment area and all of the associated costs with any such storage tanks. Increasing the height or diameter of the base can increase the distillation column volume. No additional instruments are needed on the column. In one aspect of the invention, the base of the water column is at least 40% larger in diameter or height than a conventional water column. In this aspect, the overall height increases by about at least 3%. In another aspect, the base is increased at least 50% in diameter or height.

The wastewater treatment facility can be eliminated, as discussed above, through the integration of the plant. This is particularly made possible by eliminating environmental emissions and by eliminating storage tanks as previously discussed. Moreover, the plant is constructed with a roof over all process buildings, the trailer pump/unloading station, the HTM furnace, and/or any other areas of the plant that could have the potential of COD. The wastewater from the pelletizer and the cooling tower are separated from all other waste streams and go to the plant outfall. All rainwater, including water from all roof areas described above, also goes to the plant outfall. A ditch, preferably double walled, is constructed between the process plant and the HTM furnace. This preferably is a covered ditch. All remaining contaminated wastewater goes into the ditch. All collected wastewater within the ditch is pumped from the ditch to the HTM furnace where the wastewater is burned. The heat duty cost is offset by the reduction in the cost for the capital and operating cost of a wastewater treatment plant if all other sources of water are limited.

Also, if the plant layout is planned properly, only one convey system is required for the pellets or chips for a melt phase facility. The final reactor outlet is high enough so that the cutter can make pellets, which will fall by gravity into the analysis bins located below the cutters. In another embodiment, the analysis bins are eliminated. The pellets are conveyed to the top of the blending silo, and the bottom of the blending silo is positioned above the packaging bin. The bottom location and elevation of the packaging bin are high enough to allow the contents of the packaging bin to feed by gravity into Sea bulks, trucks, or railroad cars. The packaging bin can also be eliminated by directly feeding the packaging equipment from the silo. The units that package bulk bags, boxes, drums, and sacks are located under and near enough to the packaging bin so that they can also be filled by gravity. The reduction in convey systems reduces equipment, utility cost, and improves product quality with the elimination of the mechanism for the melting and the stringing of the pellets.

In still another aspect of the invention, the water systems in the plant can be minimized by combining the safety shower, the cooling tower, the cutter water, and the HTM pump coolers.

Typically, the plant safety shower system is a self contained system. It has a level control system fed off of the city water supply. It also has a pressurization system and a back up pressurization gas in case of a power failure. The cooling tower has a water supply used to maintain the water level therein due to the loss of water that evaporates, and a blowdown (purge) to keep high boiling point components from concentrating or precipitating. The cooling tower system has a chemical additive system that keeps the water pH, hardness, biological growth, and the like on target. The cutter water system supplies water to the cutter (making pellets), and make-up water is required since the water evaporates when contacting the hot polymer strands. This system does not normally have a purge, and the impurities generally leave on the pellets, although this can cause problems. The cutter system also has a chemical additive system. The HTM pumps have coolers that have a high-pressure drop. The standard cooling tower header does not supply enough pressure to go through the high-pressure drop coolers on the HTM pumps.

Four choices typically exist for dealing with these problems:

1.) use supply water as once through cooling;
2.) increase the pressure of the cooling tower water header paying the increased capital and pumping costs;
3.) build a separate high pressure cooling tower header incurring the increased capital and pumping cost; and
4.) purchasing low pressure drop coolers for the pumps incurring the added capital cost and voiding the warrantee.

Integrating these systems could reduce capital and operating costs. With the integration of the HTM systems and the elimination of all Subloop pumps, only the main loop HTM pumps are left. The cooling water flow required for these HTM pumps is slightly less than the cooling tower makeup water required (too much water is acceptable). The cutter water system has higher water pressure to go to the cutters, the pressure of which is also high enough for use with the HTM pump coolers. However, after passing through the HTM pumps the water should not come back to the cutter system since an HTM leak would contaminate the product. Therefore, this water from the HTM pumps should go to the cooling tower. If the cooling tower chemicals were added to the cutter water system, it would protect the cutter water system and eliminate one of the chemical additive systems and still supply the chemicals to the cooling tower via this purge. A purge on the cutter water system would not be detrimental and could be beneficial. Pumping water from the cutter water system through the HTM pump coolers and then through the cooling tower would eliminate the additional cooling system needed for the HTM pumps, would eliminate a chemical treatment system, and provide the needed water to all three uses. Water would still need to be supplied to the cutter water system and the safety shower.

The safety shower system needs to be purged weekly to keep the water from being stagnant. Purging more often that this would be beneficial, and an automatic purging would reduce cost. If the safety shower tank is elevated then the pressurization and back up pressurization system therefor are not needed. If water entered the safety shower tank and overflowed out the top of the tank, then the tank would stay full and not need a level system. If the level control valve for the cutter water system was in the line supplying the safety shower tank, and the safety shower tank overflowed into the cutter water tank, then the safety shower would be continuously purged with water flowing at the make-up rate for both of the cutter water and the cooling tower water systems. This layout would eliminate all labor and instruments from the safety shower system.

A novel integrated plant water distribution system of the invention which addresses the aforementioned problems, and satisfies the needs of the plant operator, is illustrated in FIG. 22. Referring now to FIG. 22, a safety shower water storage tank 290 is supplied with clean fresh water from a suitable water source "W", such as an off-site city water supply (not illustrated). The safety shower tank supplies any needed water to the plant safety showers and eyebaths (not illustrated), and also supplies water through a first pipeline 291 to a filter and water storage tank assembly 294 provided as a part of a separate cutter/pelletizer water tank 294. Once introduced into the water distribution loop, the water is passed into and through the filter and water storage tank assembly 294. From here the filtered and cold water is passed through the pelletizer water distribution loop by a suitable pump 295, and then passed through a downstream heat exchanger 296 to cool the water after having been passed through the pump. A filter 298 is positioned in the pelletizer water distribution loop downstream of the pump to remove any dirt and/or small particles that may be entrained therein. A downstream chemical additive station 299 is provided as a part of the pelletizer water distribution loop in order to keep the water in the pelletizer water distribution loop within controlled organic growth, water hardness, water solubility, and corrosivity guidelines, as needed for the process being performed, as well as being due to the locale and water characteristics of the water supplied to the system. The last component of the pelletizer water distribution loop is a cutter/pelletizer station 300, the function of which is described below.

Molten polymer from the plant is supplied via polymer supply line 316 to a polymer extrusion die head 317 at the cutter/pelletizer station 300, the die head extruding a plurality of molten polymer strands 318 in known fashion. The molten polymer strands are cooled in the cutter/pelletizer station 300 for pelletizing and/or cutting the molten polymer strands with the cold, filtered water supplied through the pelletizer water distribution loop. Thereafter, the now heated and "dirty" water is passed into the filter and water storage tank assembly to be cooled, with make up water for water lost from evaporation at the cutter/pelletizer station, which make up water is also used to purge to pump 303, added from the safety shower water storage tank. The water passed into the filter and water storage tank assembly is then passed back through the pelletizer water distribution loop, as described hereinabove, for re-use.

A separate water line 302 is fed from the pelletizer water distribution loop, and extends to a downstream pump 303 used to pass the water to a cooling tower 304. The cooling tower is provided with a level control 306, used to maintain the level of water held in a water collection basin 307 formed as a part of the cooling tower assembly. The level control 306 has a minimum flow setting that will ensure that a satisfactory amount of water is always provided for the minimum required cooling flow for the pump 303. The cooling tower cools the water passed therethrough, the water being passed from the water collection basin through a cooling tower water supply loop 308.

The anticipated uses of the water passed through the cooling tower water supply loop include any desired number of downstream cold water users 311, which users may return the now "waste" water to the cooling tower water supply loop. Any water not used downstream is passed back into and through the water cooling tower, the level control valve 306 drawing water from the pelletizer water distribution loop as needed to make up for lost water within the collection basin/reservoir 307.

The waste water passed back into the cooling tower water supply loop from the downstream users is passed back into and through the cooling tower 304, and evaporates therein. The evaporation of the water thus concentrates solids and/or contaminates within the water stream passed through the cooling tower water supply loop, so water is purged out of the loop through a water purge line 312, as necessary, to a water outfall (not illustrated) with a controller 314. The pump(s) 310 supply the force used to pass the cooled water therethrough to any and all water users.

The water supplied to the safety shower water storage tank 290 is controlled by a water level control 315, which device maintains the water level within the tank 290 at a suitable water level. Excess water from the safety shower water storage tank passes therefrom through the water line 291 and into the filter and water storage tank assembly 294 of the pelletizer water distribution loop 292, where the water is handled as described above. All water supplied to the pelletizer water distribution loop 292 and the cooling tower water loop 308 is supplied from a suitable water supply, as described above. This includes all water added to each system for all water lost through the downstream users 311 and the evaporation of water in the cutter/pelletizer station 300, as well as in the cooling tower 304.

Accordingly, the integrated plant water distribution system of this invention includes in a first embodiment a safety shower water storage tank in fluid communication with, and supplied by water from the water source, a first water distribution loop in fluid communication with the safety shower water storage tank and being supplied with water therefrom, a second water distribution loop in fluid communication with the first water distribution loop, and a control valve or valves for selectively drawing water from the first water distribution loop to supply water to the second water distribution loop. Aspects of this system include the safety shower water storage tank being in fluid communication with a separate safety shower and eye wash system; a water pipeline extending in sealed fluid communication from the safety shower water storage tank to the first water distribution loop, wherein the first water distribution loop is supplied with water from the safety shower water storage tank as the water overflows therefrom and is passed into the first water loop. The first water distribution loop comprises a pelletizer water loop constructed and arranged to supply water to a pelletizing station used to pelletize a melted plastic polymer; a filter and water storage tank; a pump constructed and arranged to pump the water from the water storage tank through the first water distribution loop; a heat exchanger; a filter; and a chemical additive station. The heat exchanger is positioned downstream of the pump, the filter is positioned downstream of the heat exchanger, the chemical additive station is positioned downstream of the filter, the pelletizing station is positioned downstream of the chemical additive station, and the filter and water storage tank is downstream of the pelletizing station.

Additional aspects of the integrated plant water distribution system include a water level control in fluid communication with the filter and water storage tank, and a control valve intermediate and in fluid communication with each of the water level control and the safety shower water storage tank. The water level control is constructed and arranged to selectively add make-up water to the filter and water storage tank directly from the water source. The water level control is also constructed and arranged to selectively control the supply of water to the safety shower water storage tank to maintain the water level therein at a predetermined water level.

The second water distribution loop comprises a cooling tower water loop which includes a cooling tower, a pump constructed and arranged to pump the water from the cooling tower through the second water distribution loop, and at least one cooling tower water user. The cooling tower further comprises a water collection basin formed as a part thereof for collecting the water passed therethrough. The pump of the cooling tower water loop is positioned downstream of the water collection basin, and the at least one cooling tower water user is positioned downstream of the pump and upstream of the cooling tower. The second water distribution loop further comprises a purge line in fluid communication therewith, and a control valve in fluid communication with the purge line for selectively passing water from the second water distribution loop. A second water pipeline extends in sealed fluid communication from the first water distribution loop to the second water distribution loop for providing water thereto.

One aspect of the means for selectively drawing water from the first water distribution loop to the second water distribution loop comprises a second pump in fluid communication with the second water pipeline, adapted to draw water from the first water distribution loop to the second water distribution loop therethrough. An additional aspect of the means for selectively drawing water is a water level control in fluid communication with the cooling tower water collection basin, and a control valve intermediate and in fluid communication with each of the second pump and the cooling tower water collection basin. The water level control for the cooling tower basin is constructed and arranged to selectively add make-up water to the cooling tower water collection basin from the second water pipeline, and is also constructed and arranged to establish a minimum water flow setting that will ensure that a satisfactory amount of water is always provided for the minimum required cooling flow of the second pump.

Another aspect of this invention is thus the method of distributing water through an integrated plant water distribution system, the aspects of the method including supplying water to a safety shower water storage tank, passing the water from the safety shower water storage tank into the first water distribution loop, and selectively passing water from the first water distribution loop to the second water distribution loop. The method features the additional aspects of selectively adding water to the first water distribution loop directly from the water source; passing the water in the first water distribution loop through the molten polymer pelletizing station; passing the water in the second water distribution loop through the water cooling tower; selectively passing water from the second water distribution loop through the water purge line in sealed fluid communication with the second loop; and selectively passing water from the first water distribution loop into the cooling tower water collection basin forming a part of the second water distribution loop.

A preferred embodiment of an integrated vacuum system for use with the described process/process plant is illustrated in FIG. 23. By using the integrated vacuum system illustrated, the number of EG jets may be reduced, the chilled water system may be minimized, if not eliminated in some instances, and the number of components required for obtaining two stages of vacuum in the last polycondensation reactor is also minimized.

As illustrated in FIGS. 17a and 17b, respectively, polycondensation normally has three stages of vacuum. Here the unique design of this invention integrates these last two stages of vacuum, the medium pressure and the low pressure vacuum stages. The third vacuum stage cannot be integrated because the pressure in this stage is too high and would not otherwise allow the EG vapor jet to have the proper differential pressure for operation. Putting a valve in the vapor line has led to plugging problems and is not a reliable solution. Nevertheless, two stages of vacuum can be effectively coupled.

Referring now to FIG. 23, a suitable and otherwise conventional vacuum pump 320 pulls a vacuum on an interstage condenser 321 used to condense components such as EG and other condensables. A first EG vapor jet 322 is installed between a spray condenser 324 and the interstage condenser, and which vapor jet will usually have a compression ratio of between 6 to 8. The liquid discharge of the interstage condenser goes to a liquid seal vessel 325, also referred to as an immersion vessel. The discharge from the vacuum pump, as well as the liquid discharge from the spray condenser can also be passed on to this seal vessel, or to any other type of desired vessel. The liquid from the immersion vessel is then pumped through a filter 326, a cooler 328, and either (a) returned to interstage condensor 321 or spray condenser 324, or (b) is discharged from this system at line 33 to, for example, the water column (not shown). Depending on the product being processed, the temperature of the system should be increased or decreased to control the vacuum as well as to control the buildup of low and intermediate boiling components, as known.

The vacuum pump of the integrated vacuum system of this invention pulls the vacuum from the polycondensation medium pressure vacuum stage or zone P2 into a top portion or region of the spray condenser through a line 244, as schematically illustrated. This medium pressure vacuum/vapor stream from the top of the final polycondensation reactor is connected to the spray condenser below the liquid cooling nozzles (not illustrated) within the top zone of the condenser. As shown, the vacuum connection extending from the spray condenser to the first EG jet is also at the top of the spray condenser, which allows the polycondensation vapors to be condensed before going to the EG jet. This has the desirable effect of increasing the capability of the jet.

The polycondensation low pressure vacuum stage or zone P3 of the final polycondensation reactor is connected by a line 245 to a second EG jet 330, and extends from there to a bottom portion or region of the spray condenser. The vapors from this second EG jet thus enter the spray condenser 324 at a point below the bottom liquid cooling nozzles (not illustrated) thereof. This allows the polycondensation vapors from the second EG jet, and the low polycondensation pressure vacuum from the bottom of the final reactor to condense without otherwise impairing or diminishing the vacuum of the top of the polycondensation reactor.

Still referring to FIG. 23, the integrated vacuum system of the invention also includes the necessary components for drawing a vacuum through the polycondensation high pressure vacuum stage or zone PI using the vacuum pump 320. Accordingly, the high pressure vacuum zone is piped into a condenser 335 through a vacuum line 243. The vapors from the high pressure stage are cooled in the condenser 335, in known fashion. The liquid/liquid condensate collected within the condenser is passed into a second seal vessel 336 in fluid communication with the condenser.

This second seal vessel is in fluid communication with a pump 337 which draws the liquid/liquid condensate therefrom and passes it through a downstream filter 339. Thereafter, the liquid is chilled within a chiller 340 in fluid communication with the filter, and the liquid passed back into the condenser 335 for re-use, or passed to other users within the plant, as desired. A vacuum line 334 extends from the top of the condenser 335, and is in fluid communication with the vacuum pump 320 through a control valve 343.

This design therefore eliminates one EG jet train, one spray condenser and pumping system, and only has two total EG jets rather than three per train. By putting all of the seal legs for the medium and low pressure vacuum zones to the same seal vessel, the number of seal vessels has also been cut to less than half. For example a dual system would have five seal tanks, whereas a single system would normally have three seal tanks. This construction thus eliminates unnecessary equipment, instruments, and also reduces energy consumption otherwise needed to operate a larger vacuum system.

As described, therefore, the integrated vacuum system of the invention includes a spray condenser in fluid communication with each of the medium and low pressure vacuum zones, respectively, of the polycondensation reactor, an interstage condenser in fluid communication with the spray condenser; and a vacuum pump in fluid communication with the interstage condenser. Additional aspect of the system include a seal vessel in fluid communication with each of the spray condenser, the interstage condenser, and the vacuum pump, respectively; and a liquid distribution system constructed and arranged to collect, filter, chill, and distribute liquid from the spray condenser and the interstage condenser, respectively, to each of the spray condenser and the interstage condenser, respectively. Other aspects includes the liquid distribution system being constructed and arranged to collect liquid from the vacuum pump; the liquid distribution system being comprised of a single seal vessel constructed and arranged to collect liquid from each of the spray condenser and the interstage condenser, respectively; and a control valve in fluid communication with the liquid distribution system and being constructed and arranged to selectively pass the chilled liquid to other users thereof, as desired.

Still other aspects of the system include the fluid from the low pressure vacuum zone entering a bottom portion of the spray condenser, and the fluid from the medium pressure vacuum zone entering a spaced top portion of the spray condenser; a second spray condenser in fluid communication with the high pressure vacuum zone of the polycondensation reactor, the second spray condenser also being in fluid communication with the vacuum pump; a control valve disposed intermediate of and in fluid communication with each the second spray condenser and the vacuum pump; and a second liquid distribution system constructed and arranged to collect, filter, chill, and distribute liquid passed from the second spray condenser to at least the second spray condenser.

Yet another aspect of the integrated vacuum system of the invention includes a spray condenser in fluid communication with each of the medium and low pressure vacuum zones, respectively, of the polycondensation reactor, a first EG jet in fluid communication with the spray condenser, an interstage condenser in fluid communication with the first EG jet, a vacuum pump in fluid communication with the interstage condenser, and a second EG jet in fluid communication with the low pressure vacuum zone and the spray condenser, respectively. Additional aspect of this embodiment of the invention include the fluid from the low pressure vacuum zone entering a bottom portion of the spray condenser, and the fluid from the medium pressure vacuum zone entering a spaced top portion of the spray condenser; the first EG jet extending from the top portion of the spray condenser; the second EG jet being in fluid communication with the low pressure vacuum zone and the bottom portion of the spray condenser; and a seal vessel in fluid communication with the spray condenser, the interstage condenser, and the vacuum pump, respectively, the seal vessel being constructed and arranged to collect liquid and liquid condensate therein. More aspects include a pump in fluid communication with the seal vessel for pumping the collected liquid therefrom; a filter in fluid communication with the pump; a chiller in fluid communication with the filter and being constructed and arranged to chill the liquid passed therethrough, the chiller being in fluid communication with each of the spray condenser and the interstage condenser, respectively, and wherein the liquid chilled by the chiller is passed to the spray condenser and the interstage condenser, respectively; a control valve in fluid communication with the chiller and being constructed and arranged to selectively pass chilled liquid to other users thereof, as desired; a liquid collection and chilling system constructed and arranged to collect, filter, and chill liquid and liquid condensate from the spray condenser, the interstage condenser, and the vacuum pump, respectively, and to redistribute the chilled liquid to the spray condenser and the interstage condenser, respectively. The method of collecting fluid from the final polycondensation reactor therefore includes passing the fluid from at least the medium pressure polycondensation vacuum zone and the low pressure polycondensation vacuum zone of the reactor into a single spray condenser in sealed fluid communication with each of the medium and low pressure vacuum zones, respectively, and drawing the fluid through an interstage condenser in fluid communication with the spray condenser with a vacuum pump in fluid communication with the interstage condenser. Additional aspect of the method include passing the fluid from the low pressure polycondensation vacuum zone into a bottom portion of the spray condenser, and passing the fluid of the medium pressure polycondensation vacuum zone into a spaced top portion of the spray condenser; passing the fluid from the top portion of the spray condenser to the interstage condenser; passing the fluid from the top portion of the spray condenser through a first EG jet in fluid communication with the spray condenser and the interstage condenser; passing the fluid from the low pressure polycondensation vacuum zone through a second EG jet in fluid communication with the low pressure polycondensation vacuum zone and the spray condenser, respectively; collecting liquid and liquid condensate from the spray condenser and the interstage condenser in a seal vessel in fluid communication with each of the spray condenser and the interstage condenser; filtering and chilling the liquid collected in the seal vessel, and passing the chilled liquid back to the spray condenser and the interstage condenser, respectively; selectively passing at least a portion of the chilled liquid through at least one control valve in fluid communication therewith for use elsewhere, as desired; and passing the fluid from the high pressure vacuum zone into a second spray condenser in sealed fluid communication with the vacuum pump.

Adsorber System

In some embodiments, it may be desirable to replace the distillation columns with adsorbers. The adsorbers can use hot, inert gas for desorption. Inert gas is any gas, which does not react with reactants under the conditions there present. Hot gas desorption produces glycols with very low concentrations of water, which will improve the ester exchange or esterification conversion. In one aspect, at least one reactant is a diol compound, and wherein at least a portion of the diol compound is removed from the process as a vapor, a liquid, or as both a vapor and a liquid, and is subjected to an adsorption system to selectively recover the diol compound.

As shown in FIG. 19, the fluids from the process are fed to the first adsorber 182. The process fluids sent to the first adsorber 182 typically comprise vapors, liquids or a mixture thereof This process fluid normally comes from a vapor stream off of the esterification process, and the liquids come from the polycondensation and other streams, such as pump purges, pump seals, vacuum pumps, evaporator purges, intercondensers, etc. The process fluid stream continues to the second adsorber until a component that is desired for recovery breaks through the bed. All previous process vapor fluids leaving the adsorber are sent to the HTM furnace for incineration via line 184. At this point, the bed is saturated.

The use of adsorption reduces columns, equipment, tanks, agitators, pumps, etc. and replaces them in one embodiment, with a few simple large pipes or tanks, a compressor, and two heat exchangers. Adsorbtion saves energy since no reflex is required like a distillation column, which typically has a reflux rate equal to the product draw-off rate. Another advantage of absorption over distillation is that the diol will be more pure, which leads to less by-product in the product, such as lowered DEG and less coloration. Also, the by-product is reduced in the ester exchange or esterification reactor, such as water in the esterification reactor. Water can have a significant impact on the reactor, and so, the esterificiation reactors can be smaller.

Process fluids enter adsorber bed 181 as stream 189 and exits in stream 190. Stream 190 has a continuous monitoring instrument (such as an FTIR, but a single wavelength would be appropriate with experience, and the switching could be done with a timer after experience, and monitoring can be accomplished with manual grab samples) that indicates when a component to be saved is exiting the bed. Until a desired component exits, all other components are sent via stream 190 to stream 184. Stream 184 goes to a thermal destruction device such as the Heat Transfer media furnace, a thermal oxidizer, a catalytic oxidizer, etc. Once bed 181 is loaded and a desired component is exiting stream 190, the process fluids are sent into the next absorber bed.

In order to use the same drawing, bed 181 is now shown as the partially loaded bed that is being loaded via stream 189 from the reactors. Bed 182 is the fully loaded bed described in the preceding paragraph. Bed 183 is a fully desorbed bed. Bed 181 is being loaded as described in the first paragraph. Bed 182 has a hot stream of inert gas, such as nitrogen, carbon dioxide, argon, etc. supplied to it via stream 191 coming from heat exchanger 188 which is heating the stream. Any convenient source of heat may be used such as steam, electricity, hot gas or vapor, hot liquids such as heat transfer, media, etc. Heat may also be exchanged between condenser streams 187, 191, 192, 193 and stream 199. Conventional air to air heat exchangers as wells as solid bed exchangers may be used. The motive force for the inert gas stream comes from compressor or blower 186 although an eductor device may be used with inert makeup stream 197. The pressure on the inlet of component 186 is maintained by the addition of inert 197 and recirculation stream 195.

The hot inert gas coming into bed 182 desorbs the components from the bed. Alternately, steam or other hot condensable vapor may be used, but this detracts from the purity of the exiting stream and also requires additional separation equipment for the stream. Those skilled in the art will control the flow and temperature of stream 191 to accurately desorb bed 182 separating the desorbed components into high purity, discrete pulses. These pulses in stream 192 are monitored by a similar device used in stream 190. When a non-desired component is removed from bed 182 into stream 192, a 3-way valve or multiple 2-way valves are switched and stream 192 is sent via stream 198 to the thermal oxidation device via stream 184. Alternately, stream 192 could pass through a non-cooled condenser 185 and proceed to stream 184 for thermal oxidation. When a desired component is removed from bed 182 into stream 192, the valves are switched and stream 192 proceeds to stream 199 and into condenser 185. Condenser 185 can be cooled with air, refrigerated water, refrigerated gas, by expansive cooling, or other appropriate means. The cooled stream 199 will fall below the saturation temperature and the desired component will condense from the stream as a liquid. The liquid in stream 187 is directed to the appropriate storage container for that product. Once stream 192 contains a non-desired component again, the valves are again switched so that stream 192 goes to the thermal oxidation device. This switching process between desired and non-desired components continues until bed 182 is totally desorbed. Bed 182 then goes to standby.

Gas from condenser 185 in stream 193 will contain the desired component to be recovered, but is below the saturation temperature of condenser 185. So, stream 193 is sent to the fully desorbed bed 183. Bed 183 adsorbs the desired components cleaning stream 193. Stream 193 exits bed 183 as stream 194. Stream 194 is directed back to blower or compressor 186 as stream 195. Stream 197 adds makeup inert gas to maintain a constant inlet pressure to compressor 186.

Once bed 181 is saturated and bed 182 has been previously desorbed, the bed functions cycle. Bed 181 takes the place of bed 182 in the cycle. Bed 182 takes the place of bed 183. Bed 183 takes the place of Bed 181. During the second phase Bed 181 will be desorbed, Bed 182 will catch the desired components from condenser 185. Bed 183 will be saturated with reactor vapors. Once bed 181 is desorbed and bed 183 is saturated, the next phase will begin.

Further enhancements may be necessary based on system sizes and products being produced. Multiple adsorber beds may be required for each function as well as multiple cooler, compressors, heater, and heat exchangers. The stream 189 from the reactors may be cooled before entering bed 181 to improve the adsorption capacity of the bed.

Elimination of Gear Pump(s)

Most polyester plants have a gear pump between the prepolymer reactor and the finisher reactor. The pump overcomes the pressure drop between the two reactors since the pressure difference is not great enough to provide the required flow. The pump is also used as a metering device to provide a uniform flow to the finisher allowing stable operation. Some processes have been constructed with the prepolymer reactor at a higher elevation than the finisher to provide the necessary pressure difference. These plants forego the uniform flow to the finisher.

The pipe reactor system does not require a pump in the polycondensation system since the design of the piping inherently provides the pressure required to move the material to the next section of the plant. In addition, the pipe reactor has no level or pressure control systems to provide upsets to the system that would be dampened by the gear pump. The pipe reactor dampens inlet perturbations. Since the pipe system provides a uniform flow without additional dampening and provides the head pressure necessary to provide the flow between reactor sections, it does not need a gear pump in the polycondensation section.

Combined Esterification Pipe Reactor and Polycondensation Pipe Reactor

The individual sections recited above regarding the processes and apparatuses for esterification and polycondensation apply to, and can be used in, the combination and retrofit embodiments recited below.

As shown in FIGS. 6, 17A, and 17B, the two main pipe reactor stages of the present invention can be combined into an integral unit. FIG. 17A shows one embodiment of the present invention. The esterification reactor and polycondensation reactor are both pipe reactors. Reactive material is stored and fed from tank 221. In a preferred embodiment, it is solid PTA feed directly to recirculation line 224. The reactive material proceeds to solid metering device 222 from tank 221, which is on weigh cells 223. The solid PTA enters the recirculation line 224 where it is mixed with the reactive monomer from the esterification reactor 227, which has been recycled through line 230. The mixture enters the heat exchanger 226 where it is heated. The mixture is then fed to pipe reactor 227. Part of the reaction mixture is recycled back to line 230 to the influent of pump 225. Additional liquid additives, such as reactants, can be fed through line 240 into preferably the influent of pump 225. The effluent of pump 225 is fed through a pressure reducing device 246 to facilitate the solid feeding of the PTA from tank 221. The esterification reactor can be vented at lines 231 and 232. The vapor is preferably sent to refining. FIG. 17B differs from FIG. 17A, in that an additional vent line 229 is present. Vent line 229 in one aspect is located just prior to the recirculation tee as shown in FIG. 17B, to, in certain aspects, remove water from the process. The other portion of the reactive mixture flows through the additional pipe reactor esterification process 228. The effluent from the esterification process is then optionally mixed with additional liquid additives at 234, is fed through heat exchangers 233, and is then fed to the polycondensation reactors 235, 236, and 237. The effluent, or completed polyester or polymer, is fed through gear pump 238 and exits the system at 239. Pressure, specifically vacuum, in PET and PETG processes can be controlled using vent or vacuum headers 243, 244, and 245. The vent or vacuum headers 243–245 can be fed to an oxidizer, such as an HTM furnace, an incinerator, or a thermal oxidizer. Pressure differential between the esterification sections or zones (E1/E2) and polycondensation sections or zones (P1/P2/P3) can be controlled using a pressure differential device, such as a seal leg 247, and the pressure between each of the polycondensation stages 235, 236, and 237, can be controlled using a pressure differential device, such as a seal leg at each of 241 and 242. In an alternative embodiment, instead of the recycle influent coming from the esterification process, the recycle influent can come from the polycondensation process, for example, as a slip stream off of effluent 239 (not shown in figure). This can increase the liquid polymer uniformity.

One skilled in the art will also appreciate that the reactors of the present invention can be used to construct new plants, as well as to enhance or improve existing plants or to increase capacity. The pipe reactors can be used to replace or can be inserted within a section or multiple sections of an existing plant that is causing a technical or capacity limitation. In one aspect, an esterification, polycondensation, or both pipe reactor apparatus(es) is constructed and arranged to be placed in fluid communication with a conventional reactor for making a polyester monomer or polymer. For example, FIG. 5 shows possible configurations where the second esterification reactor 212 does not have enough volume to feed the polycondensation reactor 213 at its full capacity. In this situation, a pipe reactor 21 may be added between the first and second esterification reactors (211 and 212 respectively). If additional residence time is required in the first polycondensation reactor 213, the pipe reactor 215 can be installed above the top of the first polycondensation reactor. Similarly, jacketed pipe can be added to increase disengagement surface area to reduce liquid entrainment. Vapor removed from the system is withdrawn via lines 216 and 217. Additional pipe could be added to increase the heat transfer area. These piping modifications can be installed with the plant running (the pipe can even be routed to an outside wall to have enough room for the installation) except for the two end tie-ins. Then during a short shutdown, the tie-ins can be made, effectively adding capacity or performance enhancement. These pipe reactor retrofits can be in series or in parallel to the existing facility CSTR or other type conventional reactor(s). When the pipe reactor retrofit is in parallel to the conventional reactor, each of the respective pipe reactor and conventional reactor can be selectively operated, such that either only one of the reactors is operating at one time, or both of the reactors can be operated simultaneously.

Alternatively, the pipe reactor retrofit can replace the existing reactor(s). In one embodiment, there is provided a polyester production system, comprising the pipe reactor of the present invention retrofitted to a conventional polyester process comprising a conventional polyester reactor, wherein the conventional reactor has been disabled from the production system. In another aspect, there is provided a method of retrofitting a pipe reactor to a conventional polyester process comprising (a) retrofitting the pipe reactor of the present invention in a conventional polyester process comprising a conventional polyester reactor; and (b) disabling the conventional reactor from the process. As used herein, disabling with respect to the conventional process refers to preventing the fluid from flowing to the conventional process, by, for example, providing a valve upstream of the inlet and downstream of the outlet to the conventional reactor and valving the conventional process off or disconnecting the inlet and outlet of the conventional reactor from the process system.

In the processes and apparatuses described herein, there can be greater than one esterification stage or zone and/or greater than one polycondensation stage or zone. These multiple reactors can be placed in series or in parallel.

Previous sections described the parameters for designing the pipe reactor systems of the present invention. For large plants, it may not be possible to acquire large enough pipe diameter to construct the reactor and meet the parameters. For such plants, a plurality of pipe reactors can be operated in parallel. Multiple parallel pipe reactors can be installed and combined at various locations within or between the zones. To minimize cost, the initial starting section of the reactor can be mixed before splitting. This will eliminate the purchase of additional feed systems. The vapor lines can all go to the same vacuum train. The polycondensation reactors can share the same vacuum and condenser systems. Thus, the only additional equipment, and cost incurred, is the additional piping required.

In another embodiment, one single pipe reactor produces the polyester polymer from initial pre-monomer reactants. In this pipe reactor, reactants to make the monomer are fed in at one end and polyester polymer product is output at the other end. This is especially applicable for polyester processes that do not have separate esterification and polycondensation steps. In this embodiment, the above aspects with respect to the separate esterification and polycondensation reactors and processes are applicable to this single pipe reactor process, such as the use of a weir, vapor removal and liquid disengagement, geometrical orientation of the pipe reactor, etc.

Accordingly, in one aspect, the pipe reactor divides into a plurality of substantially parallel flow conduits extending between the inlet and the outlet thereof, and wherein the reactant flowing through the pipe reactor passes through one of the plurality of flow conduits while flowing through the reactor. In another aspect, at least two separate esterification pipe reactors are provided, each of which produces the same or a different polyester monomer, and wherein the fluid polyester monomer exiting the respective esterification pipe reactors is directed into the first end of the polycondensation pipe reactor. In another aspect, at least two separate polycondensation pipe reactors are provided, each of which produces the same or a different polyester polymer, and wherein each fluid polyester monomer exiting the respective esterification pipe reactors is directed to the first end of at least one of the respective polycondensation pipe reactors. In another aspect, the esterification pipe reactor comprises a plurality of esterification reactors positioned in parallel to one another with a common inlet. In another aspect, the polycondensation pipe reactor comprises a plurality of polycondensation reactors positioned in parallel to one another with a common first end. In this embodiment, a co-reactant can be added to at least one of the plurality of polycondensation reactors but not to all of the polycondensation reactors to thereby produce at least two different polyester products.

Some Advantages of the Present Invention

One benefit of the present invention is that the design allows the reactor to be constructed in areas that contain interferences. The pipe can be fabricated around columns, beams, other pipes, other reactors, distillation columns, etc.

Also, embodiments of the present invention do not require pressure or level control. The pressure at the bottom of the esterification or ester exchange reactor is controlled by the pressure losses due to friction, the static head from the reactor liquid contents, and the back pressure on the vapor lines leaving the reactor. Since the goal is to reduce the pressure in the reactor in a prescribed pressure profile, the reactor piping is configured to produce the profile. This eliminates the need for pressure control with valves. But it is possible to control the distillation or vapor exhaust pressure and add this delta pressure to the entire esterification or ester exchange reactor.

Nearly every aspect of the polymerization train is greatly simplified by the pipe reactor of the present invention. The instrumentation, valves and control loops required are greatly reduced, and pumps, reactor agitators, reactor screws, and associated seal systems are eliminated. Except for a pump, if one is used for a recirculation group, the pipe reactor systems of the present invention have little or even no moving parts. The reduction and removal of these components from the plant greatly reduces the amount of computer and control equipment required, capital costs, maintenance costs and utility consumption. The pipe reactor can be welded without gaskets, which reduces emissions out of the reactor and air leakage into the reactor, thereby improving product quality. The substantial reductions in equipment and control systems also provide decreased operating costs.

The pipe reactors of the present invention can be constructed and installed in less time than reactor vessels. The piping can be shop or field prefabricated. The pipe reactor sizes can be designed to allow the reactor sections to be shipped by standard trucks, shipping containers, lorries, etc. without obtaining costly and slow oversize or overweight shipping permits. The prefabrication allows modular plant designs where the piping can be constructed, pressure tested, and insulated in the shop, reducing field construction time and at a lower cost.

The liquid volume required for polyester pipe reactor design of the invention is substantially less than a conventional polyester process. Additionally, the amount of particular by-products produced can be greatly reduced by utilizing a pipe reactor design of the instant invention. In one aspect of the instant invention, wherein PET is produced, the instant invention can achieve a level of DEG impurity in the final produce of less than 1.2 weight percent, in another aspect less than or equal to 1.0 weight percent, in another aspect 0.74–1.0 weight percent. This is to be contrasted with a typical conventional process for making PET, wherein the typical range for DEG impurity level is from 1.2 weight percent to 2.0 weight percent. In fact, this reduced amount of DEG impurity in the final product can be achieved simultaneously with a drastic liquid volume reduction achievable with the polyester pipe reactor design of the instant invention.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

ASPEN modeling was used for the data below. Where ASPEN modeling is referenced in the examples, it is ASPEN 10.2, service patch 1, with Polymers Plus, and ASPEN's PET Technology.

Example 1

Using ASPEN modeling, exemplary pipe lengths and heat exchange areas were calculated for a pipe reactor system for each of PET and PETG. The results are shown in Table 1 below.

TABLE 1

| | | Esterification | Polycondensation | | |
|---|---|---|---|---|---|
| Pipe Diameter | in | 14 | 12 | 14 | 16 |
| PET Plant Pipe Length | ft | 733 | | 1775 Stage 1 | 1905 Stage 2 |
| PET Plant Heat Exchanger Area | ft$^2$ | 2200 | | 2000 | |
| PETG Plant Pipe Length | ft | 79 | 75 Stage 1 | 255 Stage 2 | 680 Stage 3 |
| PETG Plant Heat Exchanger Area | ft$^2$ | 2200 | | 1900 | |

Example 2

The liquid volume required for a polyester pipe reactor design is substantially less than a conventional polyester process. For example, ASPEN modeling was run to compare to a 300 million pounds per year PET bottle plant. The results are set forth in Table 2 below.

TABLE 2

| Esterification | |
|---|---|
| Standard Plant | 100 m$^3$ |
| Pipe Reactor | 8.4 m$^3$ |
| % Reduction | 92% |
| Polycondensation | |
| Standard Plant | 35.6 m$^3$ |
| Pipe Reactor | 14.2 m$^3$ |
| % Reduction | 60% |
| Total Plant | |
| Standard | 135.6 m$^3$ |
| Pipe Reactor | 22.6 m$^3$ |
| % Reduction | 83% |

Examples 3–7

Various ASPEN modeling was run to determine operating conditions and performance results for various polyesters of the invention. The modeling was based upon an apparatus of the invention of either FIG. 17a or 17b as noted in the Tables below. The inherent viscosity (I.V.) is measured by dissolving of 0.25 g of polymer in 50 mL in the solvent, which consists of 60% phenol and 40% 1,1,2,2-tetracholorethane by weight. The measurement is made at 25 deg C. using either a Viscotek Differential or Modified Differential Viscometer using ASTM D 5225, "Standard Test Method for Making Solution Viscosity of Polymers with a Different Viscometer." The results for Examples 3–7 are set forth below in Tables 3–7,respectively.

TABLE 3

HOMO PET - Bottle Polymer

| | |
|---|---|
| Recycle Rate | 5 parts monomer to 1 part PTA by weight |
| Production Rate | 300 million pounds/year |
| EG to PTA feed mole ratio | 1.6 |

| Reactor (See FIG. 17A) | Esterification | Polycondensation zone 1 | Polycondensation zone 2 | Polycondensation zone 3 |
|---|---|---|---|---|
| Temperature (C.) | 296 | 296 | 296 | 296 |
| Pressure (psig) | 10 down to 2 | | | |
| Pressure (torr abs) | | 61 | 10 | 0.5 |
| Liquid volume (m3) | 16.2 | 3.7 | 3.3 | 9.9 |

| | E1 | P1 | P2 | P3 |
|---|---|---|---|---|
| 12 in pipe (ft) | 632    253 | | | |
| 14 in pipe (ft) | | 935 | 830 | |
| 16 in pipe (ft) | | | | 1875 |
| heat exchanger (ft2) | 2200 | 2200 | | |

Finished Product

| | |
|---|---|
| IV | 0.60 dL/g |
| DEG | 0.78 wt % |
| Acid Ends | 33 mole eqivalent per 1 million grams |
| Vinyl Ends | 1.5 mole eqivalent per 1 million grams |

TABLE 4

PETG Copolyester (20.5 wt % CHDM)

| | |
|---|---|
| Recycle Rate | 10 parts monomer to 1 part PTA by weight |
| Production Rate | 95 million pounds/year |
| EG to PTA feed mole ratio | 3.5 |

| Reactor (See FIG. 17A) | Esterification | Polycondensation zone 1 | Polycondensation zone 2 | Polycondensation zone 3 |
|---|---|---|---|---|
| Temperature (C.) | 255 | 255 | 275 | 275 |
| Pressure (psig) | 47 down to 25 | | | |
| Pressure (torr abs) | | 120 | 5 | 0.5 |
| Liquid volume (m3) | 4.6 | 4.0 | 5.0 | 3.2 |

| | E1 | P1 | P2 | P3 |
|---|---|---|---|---|
| 12 in pipe (ft) | 213    85 | | | |
| 14 in pipe (ft) | | 201 | 254 | |
| 16 in pipe (ft) | | | | 680 |
| heat exchanger (ft2) | 2000 | 2000 | | |

Finished Product

| | |
|---|---|
| IV | 0.75 dL/g |

TABLE 5

HOMO PET - Bottle Polymer

| | |
|---|---|
| Recycle Rate | 5 parts monomer to 1 part PTA by weight |
| Production Rate | 300 million pounds/year |
| EG to PTA feed mole ratio | 1.6 |

TABLE 5-continued

HOMO PET - Bottle Polymer

| Reactor (See FIG. 17B) | Esterification | Polycondensation zone 1 | Polycondensation zone 2 | Polycondensation zone 3 |
|---|---|---|---|---|
| Temperature (C.) | 296 | 296 | 296 | 296 |
| Pressure (psig) | 10 down to 2 | | | |
| Pressure (torr abs) | | 11 | 10 | 0.5 |
| Liquid volume (m3) | 84 | 1.7 | 2.7 | 9.8 |

| | E1 | E2 | P1 | P2 | P3 |
|---|---|---|---|---|---|
| 12 in pipe (ft) | 318 | 127 | | | |
| 14 in pipe (ft) | | | 630 | 1005 | |
| 16 in pipe (ft) | | | | | 1875 |
| heat exchanger (ft2) | 2000 | | 2000 | | |

Finished Product

| | |
|---|---|
| IV | 0.60 dL/g |
| DEG | 0.94 wt % |
| Acid Ends | 35 mole eqivalent per 1 million grams |
| Vinyl Ends | 1.5 mole eqivalent per 1 million grams |

TABLE 6

HOMO PET - Fiber Polymer

| | |
|---|---|
| Recycle Rate | 5 parts monomer to 1 part PTA by weight |
| Production Rate | 300 million pounds/year |
| EG to PTA feed mole ratio | 1.6 |

| Reactor (See FIG. 17B) | Esterification | Polycondensation zone 1 | Polycondensation zone 2 | Polycondensation zone 3 |
|---|---|---|---|---|
| Temperature (C.) | 296 | 296 | 296 | 296 |
| Pressure (psig) | 10 down to 2 | | | |
| Pressure (torr abs) | | 11 | 10 | 0.5 |
| Liquid volume (m3) | 8.4 | 1.9 | 2.4 | 7.7 |

| | E1 | E2 | P1 | P2 | P3 |
|---|---|---|---|---|---|
| 12 in pipe (ft) | 313 | 125 | | | |
| 14 in pipe (ft) | | | 704 | 893 | |
| 16 in pipe (ft) | | | | | 1473 |
| heat exchanger (ft2) | 2000 | | 2000 | | |

Finished Product

| | |
|---|---|
| IV | 0.55 dL/g |
| DEG | 0.94 wt % |

TABLE 7

PETG Copoleyster (20.5 wt % CHDM)

| | |
|---|---|
| Recycle Rate | 10 parts monomer to 1 part PTA by weight |
| Production Rate | 95 million pounds/year |
| EG to PTA feed mole ratio | 3.5 |

| Reactor (See FIG. 17B) | Esterification | Polycondensation zone Zone 1 | Polycondensation zone Zone 2 | Polycondensation zone Zone 3 |
|---|---|---|---|---|
| Temperature (C.) | 255 | 255 | 275 | 275 |
| Pressure (psig) | 47 down to 25 | | | |
| Pressure (torr abs) | | 120 | 5 | 0.5 |
| Liquid volume (m3) | 2.3 | 2.5 | 5.0 | 3.2 |

TABLE 7-continued

| | PETG Copoleyster (20.5 wt % CHDM) | | | |
|---|---|---|---|---|
| | E1 | P1 | P2 | P3 |
| 12 in pipe (ft) | 106 | 43 | | |
| 14 in pipe (ft) | | 125 | 254 | |
| 16 in pipe (ft) | | | | 680 |
| heat exchanger (ft2) | 2000 | 2000 | | |
| IV | 0.75 dL/g | | | |

In comparing Table 3 to Table 5, the following can be observed. With no vapor disengagement in the verification process (Table 3 data), the DEG by-product is 0.78 weight percent, versus Table 5 data, which does have the vapor disengagement in the esterification section of the reaction and produces a DEG by-product of 0.94 weight percent. However, with the vapor disengagement in esterification system, the liquid volume is reduced from 16.2 m³ down to 8.4 m³ (compare Table 5 with Table 3). Removing water during the esterification process, as shown in Table 5, drives the reaction to produce monomer but also drives the reaction to produce additional DEG. However, the liquid volume of the reactor is drastically reduced. In this case, for PET, the volume reduction supercedes the increased rate of DEG production and provides a final product with slightly higher DEG but with the liquid volume of the reactor reduced by almost 50%. This results in a substantial capital investment savings and operating expense savings for PET production.

Additionally, both Tables 3 and 5 show that the DEG by-product of 0.78 weight percent and 0.94 weight percent respectively, are lower than that typically found using a conventional CSTR process, which is from 1.2 to 2.0 weight percent.

Additionally, as noted in Tables 3–6, the reactors are run hotter than conventional CSTR reactors. In the embodiment shown in Tables 3–6, the reactors were run at 296° C., as contrasted to conventional CSTR reactors, which are typically run at about 262° C. Surprisingly, the pipe reactors able to be run hotter than a CSTR without the negative side effects of increased DEG production, as shown in the final product data in Tables 3–6. It is theorized that this is due to the smaller residence time in the pipe reactor as compared to a CSTR reactor. The hotter reaction temperature also enhances the process by allowing the increased vaporization of water off of and out of the process.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for making an ester from a plurality of reactants comprising:
   (a) providiiig an esterification pipe reactor having a first inlet and a first outlet;
   (b) adding the reactants under esterification reaction conditions into the esterification pipe reactor proximal to the first inlet and forming a two phase flow so the reactants form a liquid phase and vapor phase through the esterification pipe reactor, wherein the estenfication pipe reactor is operated in at least one flow regime selected from the group consisting of bubble flow, plug flow, stratified flow, wavy flow, slug flow, dispersed flow and froth flow and wherein at least a portion of the reactants form an ester monomer.

2. The process of claim 1 wherein at least a portion of the ester monomer is reacted in the esterification pipe reactor to form an ester oligomer.

3. The process of claim 2 further comprising:
   (c) reacting the ester oligomer under polycondensation reaction conditions in a polycondensation pipe reactor wherein at least a portion of the oligomer forms a polyester.

4. The process of claim 1 further comprising:
   (c) reacting the ester monomer under polycondensation reaction conditions in a polycondensation pipe reactor wherein at least a portion of the ester monomer forms an ester oligomer.

5. The process of claim 4 further comprising:
   (d) reacting the ester oligomer under polycondensation reaction conditions in the polycondensation pipe reactor wherein at least a portion of the oligomer forms a polyester.

6. The process of claim 1 wherein said reactants comprise a diacid or diacid generator and a diol or diol generator.

7. The process of claim 6 wherein said diacid or diacid generator is selected from the group consisting of aromatic dicarboxylic acids having 8 to 14 carbon atoms, aliphatic dicarboxylic acids having 4 to 12 carbon atoms, and cycloaliphatic dicarboxylic acids having 8 to 12 carbon atoms and esters of these diacids; and wherein said diol or diol generator is selected from the group consisting cycloaliphatic diols having 6 to 20 carbon atoms and aliphatic diols having 3 to 20 carbon atoms.

8. The process of claim 6 wherein said diacid or diacid generator and said diol or diol generator are selected from the group consisting of terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, dipheny-3,4'-dicarboxylic acid, 2,2,-dimethyl-1,3-propandiol, dicarboxylic acid, succinic acid, glutaric acid, adipic acid, azelaic acid, sebacic acid, dirnethyl terephthalate, ethylene glycol, diethylene glycol, triethylene glycol, 1,4-cyclohexane-dimethanol, prapane-1,3-diol, pentane-1,5-diol, hexane-1,6-diol, neopentyiglycol, 3-methylpentanediol-(2,4), 2-methylpentanediol-(1,4), 2,2,4-trimethylpentane-diol-(1, 3), 2-ethylhexanediol-(1,3), 2,2-diethylpropane-diol-(1,3), hexanediol-(1,3), 1,4-di-(hydroxyethoxy)-benzene, 2,2-bis- (4-hydroxycyclohexyl)-propane, 2,4-dihydroxy-1,1,3,3-tetramethyl-cyclobutane, 2,2,4,4 tetramethylcyclobutanediol, 2,2-bis-(3-hydroxyethoxyphenyl)-propane, 2,2-bis-(4-hydroxypropoxyphenyl)-propane, isosorbide, hydroquinone, BDS-(2,2-(sulfonylbis)4,1-phenyleneoxy)) bis(ethanol), and mixtures thereof.

9. The process of any one of claims 3 to 8 wherein said ester is poly(ethylene terephthalate).

10. The process of claim 6, 7 or 8 wherein said diacid or diacid generator are selected from the group consisting of terephthalic acid and dimethyl terephthalate, and said diol is ethylene glycol.

11. The process of any one of claims 1 to 5 wherein at least one of the pipe reactors has a means for recycling a portion of the process fluid, and the process comprises recycling a portion of the process fluid to the esterification pipe reactor.

12. The process of any one of claims 3 to 5 wherein at least one of the pipe reactors has a means for recycling a portion of the process fluid, and the process comprises recycling a portion of the process fluid to the polycondensation pipe reactor.

13. The process of claim 11 further comprising adding at least one reactant into the recycled process fluid.

14. The process of any one of claims 3, 4, or 5 wherein the polycondensation pipe reactor has a plurality of zones or stages and the process comprises operating at least two of the zones or stages at a pressure differential.

15. The process of any one of claims 1 to 5 further comprising removing a portion of the vapor from at least one of the pipe reactors.

16. The process of claim 15 comprising operating the esterification pipe reactor in a bubble or froth regime.

17. The process of claim 14 comprising operating the polycondensation pipe reactor in a stratified flow regime.

18. The process of claim 1 further including adding to the pipe reactor at least one material selected from the groun consisting of a catalytic material, colorant, toner, pigment, carbon black, glass fiber, filler, impact modifier, antioxidant, stabilizer, flame retardant, reheat aid, acetaldehyde reducing compound, oxygen scavenging compound, UV absorbing compound, barrier improving additive, black iron oxide and mixtures thereof.

19. The process of claims 1 to 5, 16, or 17 wherein the pipe reactor is a substantially empty pipe.

20. The process of any one of claims 1 to 5 wherein the esterification pipe reactor is operated with a pressure profile between the first inlet and the first outlet and wherein the pressure at the first inlet is greater than the pressure at the first outlet.

21. The process of claim 20 wherein the pressure profile is established by a hydrostatic pressure inside the esterification pipe reactor.

22. The process of any one of claims 3 to 5 further comprising controlling the pressure between the esterification process and polycondensation process using a seal leg in fluid communication with and positioned between the esterification pipe reactor and the polycondensation pipe reactor.

23. The process of claim 22 further comprising heating the fluid in said seal leg.

24. The process of claim 23 wherein the fluid in the seal leg is heated to a boiling temperature.

25. The process of claim 15 further comprising recovering reactants from the removed vapor to form a reactant lean overhead product and a reactant rich bottom product.

26. The process of claim 15 further comprising oxidizing the removed vapor in an oxidizer selected from a heat transfer media furnace, an incinerator or a thermal oxidizer.

27. The process of claim 25 further comprising oxidizing the reactant lean overhead product in an oxidizer selected from a heat transfer media furnace, an incinerator or a thermal oxidizer.

28. The process of claim 25 further comprising recycling the reactant rich bottom product to the esterification pipe reactor.

29. The process of any one of claims 25 to 28 wherein at least one of said reactants is glycol.

30. The process of any one of claims 1 to 5 further comprising retrofitting said pipe reactor to a conventional polyester process having at least one continuous stirred tank reactor.

31. A process for making a polyester from a plurality of reactants comprising:
    (a) providing an esterification pipe reactor having a first inlet and a first outlet;
    (b) adding the reactants under esterification reaction conditions into the esterification pipe reactor proximal to the first inlet and forming a two phase flow so the reactants form a liquid phase and vapor phase flow through the esterification pipe reactor, wherein the esterification pipe reactor is operated in at least one flow regime selected from the group consisting of bubble flow, plug flow, stratified flow, wavy flow, slug flow, dispersed flow and froth flow and wherein at least a portion of the reactants form an ester monomer;
    (c) reacting the monomer under polycondensation reaction conditions in a polycondensation pipe reactor wherein at least a portion of the ester monomer forms an oligomer; and
    (d) reacting the oligomer under polycondensation reaction conditions in the polycondensation pipe reactor wherein at least a portion of the oligomer forms a polyester.

32. An apparatus for preparing at least one ester monomer, ester oligomer or polyester comprising a pipe reactor having an inlet, an outlet and an interior through which reactants of at least one ester monomer, ester oligomer or polyester are passed wherein said reactants are reacted in at least one flow regime selected from the group consisting of bubble flow, plug flow, stratified flow, wavy flow, slug flow, dispersed flow and froth flow.

33. The apparatus of claim 32 wherein the pipe reactor is an esterification pipe reactor having a first inlet, a first outlet, a first inner surface and a first interior for passing reactants through.

34. The apparatus of claim 32 wherein the pipe reactor is a polycondensation pipe reactor having a second inlet, a second outlet, a second inner surface and a second interior for passing reactants through.

35. The apparatus of claim 32 wherein the pipe reactor comprises:
    (a) an esterification pipe reactor having a first inlet, a first outlet, a first inner surface and a first interior for passing reactants through; and
    (b) a polycondensation pipe reactor having a second inlet, a second outlet, a second inner surface and a second interior for passing reactants through.

36. The apparatus of any one of claims 33 to 35 further comprising a fluid restricting means affixed to at least one of the inner surfaces.

37. The apparatus of claim 36 wherein the fluid restricting means comprises a weir for partially blocking the flow of the fluids.

38. The apparatus of claim 35 wherein the second inlet and the first outlet are in fluid communication.

39. The apparatus of claim 33 or 35 wherein the first outlet is elevationally above the first inlet.

40. The apparatus of any one of claims 33 to 35 further comprising a means for recirculating at least a portion of fluid materials in at least one of the pipe reactors.

41. The apparatus of claim 33 or 35 further comprising a means for recirculating at least a portion of fluid materials, wherein the recirculating means comprises an influent and an effluent, and wherein the effluent is in fluid communication with the esterification pipe reactor.

42. The apparatus of claim 41 wherein the recirculating means effluent is located proximate to the first inlet of the esterification pipe reactor.

43. The apparatus of claims 32 to 35 or 37 further comprising a means for venting, degassing or removing vapors from at least a portion of the interior.

44. The apparatus of claim 43 wherein the venting or degassing means comprises at least one of:
   (a) a linear stand pipe;
   (b) a linear stand pipe having a liquid entrainment separator in-line with the vapor path;
   (c) a non-linear stand pipe disposed vertically above the pipe reactor and formed of three contiguous sections each in fluid communication with the adjacent section, a substantially vertical first section in fluid communication with the pipe reactor, a second section coupled to the first section and oriented at an angle relative to the first section in plan view, and a third section coupled to the second section and oriented at a complimentary angle relative to the second section that the third section is oriented substantially horizontally such that the non-linearity causes all or most of the liquid droplets in the vapor to impinge on some surface of the vent piping; or
   (d) a pressure decreasing device selected from an eductor, a siphon, an exhauster, a venturi nozzle, or a jet.

45. The apparatus of claims 34, 35 or 37 wherein the polycondensation reactor has a plurality of zones, stages or sections wherein a zone is defined by a relative pressure differential and wherein a seal leg is positioned between and in fluid communication with each zone, stage or section for controlling the pressure between reactor sections.

46. The apparatus of claim 37 wherein at least one pipe reactor comprises a flow inverter.

47. The apparatus of 46 wherein the flow inverter is proximate to and downstream of the weir.

48. The apparatus of claim 32 wherein the pipe reactor relative to a length has alternating linear and non-linear sections between the inlet and outlet thereof.

49. The apparatus of any one of claims 32 to 34 having a means for heating the reactants in the pipe reactor.

50. The apparatus of claim 49 wherein the heating means comprises at least one of:
   (a) a jacket around an exterior surface of the pipe reactor which defines an annular space through which a heat transfer medium is circulated;
   (b) a plurality of electrical heating components wrapped about the exterior surface of the pipe reactor; or
   (c) a heat exchanger along at least a portion of the pipe reactor whereby the reactants are passed to bring the temperature back up as the by-product vaporizes.

51. The apparatus of claim 50 wherein the heat transfer medium is selected from oil, water, vapor, or mixtures thereof.

52. The apparatus of any one of claims 32 to 34 wherein the pipe reactor is divided into a plurality of substantially parallel flow conduits extending between the inlet and the outlet thereof, and wherein the reactants flowing through the pipe reactor pass through at least one of the plurality of flow conduits while flowing through the reactor.

53. The apparatus of claim 50 wherein the heating means further comprises a heat transfer media control system having a supply heat transfer media loop through which a first stream of a heat transfer media is passed and a return heat transfer media loop through which a second stream of the heat transfer media is passed, the temperature of the first heat transfer media stream being greater than the temperature of the second heat transfer media stream, the heat transfer media control system including:
   (a) a first heat transfer media header through which the first heat transfer media stream is passed;
   (b) a second heat transfer media header through which the second heat transfer media stream is passed;
   (c) a first heat transfer media sub-loop, through which the heat transfer media may be passed, from the first to the second headers, respectively;
   (d) a control valve in fluid communication with a selected one of the headers and the first sub-loop;
   wherein the pressure of the first heat transfer media stream within the first header being greater than the pressure of the second heat transfer media stream within the second header and the control valve is used to selectively direct at least a portion of the first heat transfer media stream into the first sub-loop using the pressure of the first heat transfer media stream to pass the heat transfer media, and to also control the temperature and pressure of the heat transfer media stream being passed through the first sub-loop.

54. The apparatus of claim 53 further comprising:
   (a) a second heat transfer media sub-loop formed separately of the first sub-loop and in fluid communication therewith; and
   (b) a second control valve in fluid communication with the second sub-loop;
   wherein the second control valve selectively directs at least a portion of the first heat transfer media stream into the second sub-loop to control the temperature and the pressure of the heat transfer media being passed through the second sub-loop.

55. The apparatus of any one of claims 32 to 35, 44, 48, 50 or 51 wherein said pipe reactor is a substantially empty pipe.

56. The apparatus of claim 38 further comprising a seal leg in fluid communication with and positioned between the esterification pipe reactor and the polycondensation pipe reactor for controlling the pressure between the esterification process and polycondensation process.

57. The apparatus of claim 56 wherein the seal leg comprises a means for heating fluid in the seal leg.

58. The apparatus of claim 57 wherein said heating means is a heat exchanger positioned adjacent to the seal leg.

59. The apparatus of claim 57 wherein said heating means is a heat exchanger positioned in line with the seal leg.

60. The apparatus of claim 43 further comprising a means for recovering reactants from the removed vapor to form a reactant lean overhead product and a reactant rich bottom product.

61. The apparatus of claim 60 wherein said recovery means comprises at least one of a water column, a stripper column or a mixed glycol and monomer column.

62. The apparatus of claim 60 further comprising a means for oxidizing reactant lean overhead product wherein the oxidizer is selected from a heat transfer media furnace, an incinerator or a thermal oxidizer.

63. The apparatus of claim 43 further comprising means for oxidizing reactant lean overhead product wherein the oxidizer is selected from a heat transfer media furnace, an incinerator or a thermal oxidizer.

64. The apparatus of any one of claims 32 to 35, 38, 44, 46, 53, 56 or 60 wherein said pipe reactor is retrofitted to a conventional polyester process having at least one continuous stirred tank reactor.

65. The process of claim 1 wherein said esterification pipe reactor is operated in the plug flow regime.

66. The process of claim 15 wherein said esterification pipe reactor is operated in the stratified flow regime.

67. The process of claim 14 wherein said polycondensation pipe reactor is operated in the plug flow regime.

* * * * *

UNITED STATES PATENT AND TRADEMARK OFFICE
CERTIFICATE OF CORRECTION

PATENT NO. : 6,861,494 B2
DATED : March 1, 2005
INVENTOR(S) : Debruin

It is certified that error appears in the above-identified patent and that said Letters Patent is hereby corrected as shown below:

Column 81,
Line 66, "providiiig" should read -- providing --.

Column 82,
Line 18, "estenfication" should read -- esterification --;
Line 61, "dirnethyl" should read -- dimethyl --;
Line 63, "propane" should read -- propane --;
Line 64, "neopentyiglycol" should read -- neopentylglycol --.

Column 83,
Line 2, "cyclobutanc" should read -- cyclobutane --.

Signed and Sealed this

Twenty-eighth Day of February, 2006

JON W. DUDAS
*Director of the United States Patent and Trademark Office*